(12) United States Patent
Allen

(10) Patent No.: US 11,299,901 B2
(45) Date of Patent: Apr. 12, 2022

(54) CONTROL STRUCTURE

(71) Applicant: John Damian Allen, Auckland (NZ)

(72) Inventor: John Damian Allen, Auckland (NZ)

(73) Assignee: John Damian Allen, Auckland (NZ)

( * ) Notice: Subject to any disclaimer, the term of this patent is extended or adjusted under 35 U.S.C. 154(b) by 0 days.

(21) Appl. No.: 16/486,582

(22) PCT Filed: Oct. 5, 2017

(86) PCT No.: PCT/IB2017/056137
§ 371 (c)(1),
(2) Date: Aug. 16, 2019

(87) PCT Pub. No.: WO2018/150235
PCT Pub. Date: Aug. 23, 2018

(65) Prior Publication Data
US 2020/0232240 A1    Jul. 23, 2020

(30) Foreign Application Priority Data

Feb. 16, 2017 (NZ) ........................................ 729195
Feb. 16, 2017 (NZ) ........................................ 729197

(51) Int. Cl.
*E04H 9/02*    (2006.01)
*A47B 91/04*    (2006.01)
(Continued)

(52) U.S. Cl.
CPC .............. *E04H 9/021* (2013.01); *A47B 91/04* (2013.01); *A47B 96/00* (2013.01); *B65G 1/02* (2013.01);
(Continued)

(58) Field of Classification Search
CPC ...... E04B 1/36; E04B 1/98; F16F 7/12; F16F 13/00; A47B 91/04; E02D 5/80; E04H 9/021; F16M 2200/08
See application file for complete search history.

(56) References Cited

U.S. PATENT DOCUMENTS 4,187,573 A    2/1980    Fyfe et al.
5,161,655 A    11/1992    Shimoda
(Continued)

FOREIGN PATENT DOCUMENTS

JP    3140573 A    6/1991
JP    7285623    10/1995
(Continued)

OTHER PUBLICATIONS

Allen, J.D. et al, "Limit Analysis of Plates and Isoperimetric Inequalities," School of Engineering, University of Auckland, Auckland, New Zealand; The Royal Society Great Britain 1994; Excerpt from p. 113.
(Continued)

*Primary Examiner* — Patrick J Maestri
(74) *Attorney, Agent, or Firm* — Avyno Law P.C.

(57) ABSTRACT

A control structure device for racks or buildings. The device is able to limit forces developed within itself or a structure (e.g. building or storage rack) it connects with and is seismically supportive of as it endures ground or base motion input from a seismic event. The control structure may comprise a relatively inflexible rocker frame which is pivotably connected to a foundation. Rotation of the rocker frame causes a flexural member to flexurally displace to limit force and energy in the system.

41 Claims, 77 Drawing Sheets

(51) Int. Cl.
*E02D 5/80* (2006.01)
*E04B 1/98* (2006.01)
*F16F 1/02* (2006.01)
*F16F 13/00* (2006.01)
*F16M 13/02* (2006.01)
*A47B 96/00* (2006.01)
*B65G 1/02* (2006.01)
*E04B 1/36* (2006.01)
*F16F 7/12* (2006.01)

(52) U.S. Cl.
CPC ............... *E02D 5/80* (2013.01); *E04B 1/36* (2013.01); *E04B 1/98* (2013.01); *F16F 1/027* (2013.01); *F16F 7/12* (2013.01); *F16F 13/00* (2013.01); *F16M 13/02* (2013.01); *A47B 2220/0027* (2013.01); *A47B 2220/0061* (2013.01); *F16F 2224/0208* (2013.01); *F16M 2200/08* (2013.01)

(56) References Cited

U.S. PATENT DOCUMENTS

| | | | |
|---|---|---|---|
| 5,509,238 | A | 4/1996 | Scalfati |
| 6,324,795 | B1 | 12/2001 | Stiles et al. |
| 7,249,442 | B2 | 7/2007 | Pellegrino et al. |
| 7,263,806 | B2 | 9/2007 | Pellegrino et al. |
| 11,002,032 | B2 | 5/2021 | Campillay et al. |
| 2001/0005961 | A1 | 7/2001 | Fukuta et al. |
| 2010/0251637 | A1 | 10/2010 | Nishimoto et al. |
| 2010/0293873 | A1 | 11/2010 | Mualla |
| 2012/0038091 | A1 | 2/2012 | Tagawa |
| 2012/0304587 | A1* | 12/2012 | Kenho ............... F16F 15/073 52/699 |
| 2014/0115979 | A1 | 5/2014 | Kenho |
| 2014/0174002 | A1* | 6/2014 | Mualla ............... E04H 9/0215 52/167.8 |
| 2014/0374974 | A1* | 12/2014 | Goold ............... F16F 9/52 267/140.13 |
| 2015/0101269 | A1* | 4/2015 | Moreno ............... E04B 1/98 52/167.5 |
| 2016/0115703 | A1 | 4/2016 | Katayama et al. |
| 2016/0237681 | A1 | 8/2016 | Tanaka et al. |
| 2017/0081845 | A1* | 3/2017 | Kinoshita ............... E04C 3/30 |
| 2017/0107734 | A1* | 4/2017 | Gray ............... F16F 7/128 |
| 2017/0145686 | A1* | 5/2017 | Lee ............... E04B 1/98 |
| 2017/0276204 | A1* | 9/2017 | Uno ............... F16F 1/40 |
| 2018/0216687 | A1* | 8/2018 | Thompson ............... F16F 15/085 |
| 2020/0318373 | A1 | 10/2020 | Campillay et al. |

FOREIGN PATENT DOCUMENTS

| | | |
|---|---|---|
| JP | 2002338018 A | 11/2002 |
| JP | 200492096 A | 5/2004 |
| WO | 2009124985 A2 | 10/2009 |
| WO | 2015025821 A1 | 2/2015 |
| WO | 2018150235 A1 | 8/2018 |

OTHER PUBLICATIONS

Lowe P.G., "Classical Theory of Structures Based on the Differential Equation," Cambridge at the University Press; 1971; Excerpts from pp. 2,3,6,7,146,147.

Raney, Joshua Michael et al, "Influence of Boundary Conditions on Building Behavior," American Society for Engineering Education, 2015; 122nd ASEE Annual Conference and Exposition Jun. 14-17, 2015, Seattle, WA; pp. 26.959.1-26.959.9.

* cited by examiner a)

b)

a)

b)

CONTROL STRUCTURE

The present invention relates to a force limiting and energy dissipating system. More particularly, but not exclusively, it relates to an energy absorbing system to reduce the impact of earthquake induced sway or raking motion of storage racks and buildings.

BACKGROUND

Commercial and industrial storage rack systems are designed to hold various quantities of items and goods. While storage rack systems may withstand the vibrations caused by low levels of seismic forces, increased levels of seismic forces can both damage the racks and cause goods to fall off the racks.

Although they may vary in structure, a storage rack typically consists of a plurality of upright column pairs that are ordered in a rectilinear fashion to form two rows of upright columns. Usually a front row that is adjacent the passage way where forklifts may drive or automated systems operate, and a back row that may be adjacent a wall or a parallel passage. Between the columns are multiple horizontal shelves. The array of such shelves extends upwards to the top of the upright columns. Shelving or pallets installed across pairs of beams normally hold the items or materials being stored. The columns bear the weight of the items or materials and transfer that weight to the bottom of each column to the foundation on which the columns are installed. The racks in plan view are typically rectangular with lengths over 100 m possible, and typical widths of between 0.9 m and 3 m.

Swaying of the racks in the lengthwise direction can occur during an earthquake. This is due to the foundation moving in one direction and the inertial resistance of the masses (pallets) supported by a flexible structure resulting in a motion lag swaying of the rack. This movement can be described as racking. Lengthwise racking can result in very high forces being developed in the rack structure.

Typical ways to reduce the effect of lengthwise racking is to use diagonal ties. The ties may be tensioned cables that are generally anchored at one end to an upper region of the rack and at the other end to the foundation. Multiple ties may be used that form a zig zag pattern along the lengthwise direction of rack. The ties help brace and reduce movement in the lengthwise direction relative to the bottom of the racks. They can make the rack very rigid. This is not ideal as it may result in very high peak loads being experienced by the ties and/or the racks. This may result in catastrophic failure.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

It is an object of the present invention to provide an energy absorbing system which overcomes, or at least partially ameliorates some of the abovementioned disadvantages or which at least provides the public with a useful choice.

STATEMENTS OF INVENTION

In a first aspect the present invention may be said to be a device or mechanism or more preferably a control structure which is able to limit forces developed within itself or a structure (e.g. building or storage rack) it connects with and is seismically supportive of as it endures ground or base motion input from a seismic event.

The control structure may be comprised of a (preferably relatively inflexible) rocker frame which is pivotably connected to a structural base or structural member. Rotation of the rocker frame about its pivot(s) causes a pivotably anchored flexural member(s) (e.g. preferably plate) which is directly or indirectly connected to the rocker frame, but distal to the rocker frame pivot, to flexurally displace (preferably deform by for example bending). The flexural member(s) (plate(s)), which is a part of the control structure, is configured with free translational or free translational and free rotational boundary conditions to allow it to flex and yield about its minor bending axis to high elasto-plastic displacements (deformation) while maintaining a constant resistive yield force.

The stable constant resistive yield force produced by the flexing plate(s) enables the pivotable control structure to form a stable elasto-plastic mechanism which is able to flow and cycle to high elasto-plastic displacements with a constant resistive force while internal forces within it, or within any adjacent structure it is connected with and seismically supportive of, are maintained and limited to maximum values which are a function of the yield force produced by the flexing yield plate(s) which are part of it.

By flowing as a stable, high displacement capable, elasto-plastic mechanism, with constant resistive yield force, the control structure is limiting the magnitude of accelerations and dynamic forces that can develop within its members or the members of another structure it may be seismically supportive of, as it endures the ground motion (displacement, velocity, acceleration) input of a seismic event.

In one embodiment a rocker frame comprises a vertical (e.g. a tower) aspect and is pivotably connected to a horizontal structural base or foundation. The rocker frame connects by a double pin link or push rod to a flexure member (plate(s)) which is distal to the rocker frames pivot. In one embodiment the flexure member has translatable and rotational boundary conditions and connects to the structural base or foundation with anchor rods. In another embodiment the flexure member (plate(s)) has translational or translational and rotational boundary conditions and is set within a motion controlled rocker which is pivotably connected to the foundation base and maintains a preferably orthogonal connection between the flexure member(s) (plate(s)) and the double pin push rods which link the flexure plate(s) to the rocker frame.

In a further embodiment the rocker frame has two pivots and connects in a similar way to both a horizontal base or foundation and a relatively inflexible overhead structure member.

In a further embodiment the rocker frame has a horizontal (spanning truss) aspect and is pivotably connected at each end to vertical chords or towers which are pivotably connected to a horizontal base or foundation. The flexure member(s) (plate(s)) are preferably similarly distal to the rocker frame pivots and preferably connect to the rocker frame through a double pin link or push rod and to the vertical chords or towers by a pivotably connected rocker within which they are supported. The pivotable horizontally orientated rocker frame(s), preferably double pin links, flexure plate(s), plate rocker connectors, and pivotable columns or towers all parts of the control structure.

In a further embodiment a rocker frame comprises a vertical (tower) aspect and is pivotably connected to a horizontal base or foundation. The vertical chord(s) of the rocker frame are parallel with another set of adjacent exterior chords pivotably connected to the structural base of foundation. These exterior chords may connect first to the pivot inclusive centreline of the rocker frame with horizontal relatively inflexible pin ended ties. The flexure members (plates) which have translational or translational and rotational boundary conditions at one end and are fixed against all degrees of movement at their opposite end, are again distal to the rocker frame pivots, and are connected between and distributed along the rocker frame and the opposite face of the adjacent pivotable exterior chords. The pivotable vertically orientated (tower aspect) rocker frame, flexure plates, pin ended exterior chord to rocker frame ties and exterior chord(s) with pivotable base connections, all parts of the control structure.

In a further embodiment the rocker frame(s) may have a horizontal (spanning truss) aspect and is preferably pivotably connected at each end to the vertical chords or towers which are pivotably connected to a horizontal base or foundation. The horizontal exterior chords parallel with the horizontal chords of the rocker frame are similarly pivotably connected to the vertical chords or towers. The flexure members (plates) distal to the rocker frame pivots are preferably located between and along the horizontal chords of the rocker frame and the opposite face of the parallel exterior chords. Vertically orientated pin ended ties may link the exterior chords with the pivot included centreline of the rocker frames. The pivotable horizontally orientated (spanning truss aspect) rocker frames, horizontal exterior chords pivotably connected to the vertical chords or towers with pivotable structural base or foundation connections, the flexure plates and vertical ties connections horizontal exterior chords to centrelines of rocker frame all parts of the control structure.

In one embodiment, the flexural member is composed of steel.

In one embodiment, the elongate member is composed of metal plate.

In one embodiment, the flexural member is replaceable.

In one embodiment, the flexural member undergoes plastic deformation at a yield zone intermediate the first anchor and second anchor during a seismic event as a result of relative oscillatory movement between the rocker frame and the primary structure or base.

In one embodiment, the primary structure is or is part of a warehouse rack, building and/or large civil structure.

In one embodiment, the first anchor or second anchor rigidly constrains the first region so received at the anchor, in 6 degrees of freedom.

In one embodiment, there are a plurality of connector intermediate said rocker frame and said structure or base.

In a second aspect the present invention may be said to be a rocking tie anchor for anchoring at least one diagonal tie of or for a seismically supported structure to a foundation, the anchor having an upstand distally connected with an elongate flexure member to engage, or adapted to engage, the at least one tie; the flexure member having spaced zones or anchor regions to be held to and/or proximate to an underlying support of the structure,
  wherein at least one anchor region is configured to move in a lateral direction towards and away from the other anchor region, and
  wherein at least two anchor regions are configured to rotate about a rotational axis perpendicular to said lateral direction and parallel with the plane of the foundation.

In a third aspect the present invention may be said to be a racking constraining system having at least one diagonal tie to resist racking of a structure mounted on a foundation or base; wherein the at least one tie attaches from the rack to a tiltable tie anchor, the tie anchor being a rocker frame connected to an elongate flexure member (plates) held at spaced zones or anchor regions directly or indirectly to the foundation or base Preferably the elongate flexure member (plates) is held at the spaced zones or anchor regions to the foundation or secondary flexure member base without compromise, or substantial compromise, of the flexure member's resilient and/or plastic flexure uplift responsive to rack racking and/or load inputs via the at least one tie.

In one embodiment, the seismically supported structure is either a rack or a building.

In one embodiment, there are 2 ties connected to the anchor.

In one embodiment, the ties are connected to an uppermost region of the seismically supported rack.

In one embodiment, the 2 ties are connected to either side of the anchor.

In one embodiment, the ties are subjected to tensile loads during seismic activity in operation.

In one embodiment, the rocker frame extends centrally from the flexure member(s).

In an alternative embodiment, the rocker frame is located with only one flexure member.

In one embodiment, the tie anchor comprises a hold down anchor at each anchor region of a secondary flexure member, (which underlies and supports the primary flexure members) where the rocker frame is centrally located between both hold down anchors.

In one embodiment, at least one hold down anchor is configured to allow its respective anchor region to move in a lateral translational direction towards and away from the other anchor.

In one embodiment, both hold down anchors are configured to allow the respective anchor region of the secondary flexure member to rotate about a rotational axis, located at the respective end region, perpendicular to said elongate direction of the secondary flexure member and parallel to the foundation or base during flexural uplift of the primary flexure member.

In one embodiment, the central pivotal connection is formed in a central hold down anchor intermediate the 2 end hold down anchors of the secondary flexure member.

In one embodiment, the secondary flexure member is over 1 m long.

In one embodiment, the secondary flexure member is 2 m long.

In one embodiment, the rocker frame upstand is over 500 mm tall.

In one embodiment, the rocker frame upstand is 1 m tall.

In one embodiment, the rocker frame upstand is significantly stiff enough to resist substantial elastic deformation so as to transfer the tie forces into the flexure member.

In one embodiment, the primary flexure member is highly flexible relative the upstand.

In one embodiment, the primary flexure member is highly ductile relative the upstand.

In one embodiment, the secondary flexure member which underlies the primary flexure member (plates), substantially forms a curved shape of a standing second order harmonic wave during to deformation.

In one embodiment, the secondary flexure member substantially forms a sideways S shape during deformation.

In one embodiment, the secondary flexure member substantially forms a positive lobe to one side of the upstand and a negative lobe to the other side of the upstand.

In one embodiment, the curved shape of the secondary flexure member has a point coincident with the pivot point of the central anchor that does not translate in any direction.

In one embodiment, the secondary flexure member is divided into two wings, a first wing located at a first side of the central anchor and a second wing located at a second of the central anchor.

In one embodiment, the tie anchor comprises primary elongate flexure members located and connected above each of the first wing and second wing.

In one embodiment, the rocker frame is connected to an intermediate location on each primary flexure member.

In one embodiment, the upstand is a rocking member.

In one embodiment, the upstand is able to rock laterally with respect to the central hold down anchor.

In one embodiment, the upstand is part of the rocker.

In one embodiment, the rocker rocks laterally relative to the central hold down anchor.

In one embodiment, the primary flexure member and secondary flexure member act substantially in series.

In one embodiment, each primary and secondary flexure member has respective primary and secondary end regions.

In one embodiment, each primary and secondary end region has a primary and secondary end anchor.

In one embodiment the primary and secondary end regions of the primary and secondary flexure members are configured to pivot.

In one embodiment, at least one end region of each primary and secondary flexure member is configured to translate with respect to secondary in anchors.

In a further aspect the present invention may be said to be an anchored storage rack assembly, the use of diagonal ties from the rack into a tiltable upstand from a triple anchored damping plate capable of absorbing or dissipating energy provided in the upstand via the ties during a seismic or high force load event.

Preferably the triple anchoring of the plate allows a single curvature flexure upwardly on one side of the upstand and a single curvature flexure downwardly on the other side of the upstand under any racking of the rack relative to the underlying support for the anchors.

In a further aspect the present invention may be said to an energy absorbing structure assembly, the spaced anchoring from an underlying support of an energy absorbing flexure member attached directly or indirectly (e.g. via bolts, ties, ties via an upstand, or the like) to the rack to anchor the rack, the anchoring allowing a symmetric and/or asymmetric arc like movement of the flexure member without endwise cantilevering from its ends from its resilient extent into plastic deformation.

In one embodiment, both ends of the flexure member each allow a rotation about a single axis.

In one embodiment, at least one end of the flexure member allows lateral translation in one direction.

In one embodiment, the lateral translation is towards the other end.

In one embodiment, at least one end is a pinned slot constraint allowing rotation about a single axis and a lateral translation towards the other end.

In a further aspect the present invention may be said to consist in a bracing anchor that is able to substantially convert lateral tensile forces from a structure (preferably of a racking type) into substantially vertical forces in operation, so as to absorb the vertical forces by means of elastic and plastic yielding on one or more elongate flexure members that are dependent (directly or indirectly) from a foundation for the structure.

In one embodiment, the vertical forces are transmitted to the flexure member that absorbs energy, received from the tensile forces, in a controlled manner.

In one embodiment, the structure is held rigidly to the foundation in the absence of seismic activity.

In one embodiment, upon seismic activity the structure has its energy damped via the rocker.

In one embodiment, the flexure members are held rigidly to the foundation in all degrees of freedom with the absence of seismic activity, upon seismic activity and yielding of the flexure members, there is a relative ease of lateral translation along the elongate direction at at least one end region of the flexure member, and relative ease of rotation about a rotational axis, perpendicular to the elongate axis and parallel to the foundation at both end regions of a flexure member.

In one embodiment, there are 2 flexure members.

In one embodiment, there are 3 flexure members.

In one embodiment, at least 2 primary flexure members are supported by a secondary flexure member.

In one embodiment, the relative ease of lateral translation and relative ease of rotation at the end regions limits yielding to a central yield zone.

In a further aspect the present invention may be said to an assembly for absorbing energy from a structure, mounted to a foundation, that will rock in a lateral plane from a seismic event, the assembly comprising a stiff elongate body configured to rock, during said seismic event, about a pivotable anchor located at a first end of the body, the pivotable anchor having a pivot axis perpendicular to the lateral plane and parallel to the foundation, a deformable yield member dependent from the body and spaced apart from the pivotable anchor in at least a direction perpendicular to said pivot axis, the deformable yield member connecting the body to a first member of one selected from;

said foundation, a vertical chord connected (preferably pivotally) in operation to said foundation, a horizontal chord pivotally connected to a vertical chord connected (preferably pivotally) in operation to said foundation, the pivotable anchor configured and located so that the body during rocking causes relative movement between the body and the first member and wherein one or more selected from the body, and vertical chord, are configured to engage, or are integral, with the structure in operation so the movement of the structure is transferred to the one or more selected from the body, and vertical chord.

In one embodiment, the relative movement causes plastic deformation of the deformable member.

In one embodiment, the body is a column.

In one embodiment, the body is a truss.

In one embodiment, one or both of the chords are columns.

In one embodiment, one or both of the chords are trusses.

In one embodiment, the deformable yield member is plate like.

In one embodiment, the deformable yield member is a steel plate.

In one embodiment, the deformable yield member is a damper comprising a spring or rubber element.

In one embodiment, the deformable member bends about its minor axis.

In one embodiment, the body and chords are substantially stiff compared to the yield member(s).

In one embodiment, the body is pivotally fixed to the structure two thirds up the height of the structure.

In one embodiment, the vertical chord is pivotally fixed to the structure two thirds up the height of the structure.

In one embodiment, the pivotable anchor is configured to pivotally engage the body with the foundation.

In one embodiment, the deformable member is engaged between the body and the foundation.

In one embodiment, the body comprises a pivotable anchors located at each end of the body, a first pivotable anchor and a second pivotable anchor.

In one embodiment, the second pivotable anchor is attached to an upper region such as an upper floor, ceiling or other upper region of said structure.

In one embodiment, further deformable members are engaged between the body and the upper region.

in one embodiment, the stiff elongate body is substantially horizontal.

In one embodiment, there are two vertical chords, a first vertical chord and a 2nd vertical chord, pivotally connected in operation to said foundation, at each end of the elongate body.

In one embodiment, the first pivotable anchor is attached to the said first vertical chord and the 2nd pivotable anchor is attached to the 2nd vertical chord.

In one embodiment, both vertical chords are configured to pivotally attach to the foundation.

In one embodiment, both vertical chords are configured to pivotally attach to an upper region.

In one embodiment, the body is further engaged to each vertical chord by spaced apart deformable members.

In one embodiment, there are multiple bodies and associated deformable members along the height of the vertical chords.

In one embodiment, the deformable members are substantially plate like members intermediate the body and the vertical chord.

In one embodiment, the deformable members act in a shear like motion between the vertical chord and the body.

In an alternative embodiment, the deformable member has at least two end regions, one first end region constrained relative the body, and the vertical chord is configured to act at the second end region opposite the first end region to deform the deformable member during relative movement.

In one embodiment, the body is substantially elongate in a horizontal direction and pivotally engaged intermediate 2 vertical chords.

In one embodiment, there is least one horizontal chord pivotally engaged intermediate two vertical chords.

In one embodiment, there are two chords pivotally engaged intermediate the two vertical chords.

In one embodiment, the deformable members are intermediate the body and the horizontal chord/s.

In one embodiment, during movement structure or assembly from a seismic event, there is relative movement between the stiff elongate body and the horizontal chord to cause deformation of the deformable members.

In one embodiment, the foundation is one of a ground, a floor, a ceiling, a beam, and a truss.

In one embodiment, at least one end region of the deformable member has a sliding engagement with either the body or the first member.

In one embodiment, there is a tie system to tie the vertical chords and/or body together.

In one embodiment there is a tie system to tie the horizontal chords and/or body together.

In a further aspect the present invention may be said to consist in an energy absorbing system for a structure mounted to a foundation, to constrain lateral movement of an upper region of said structure during a seismic event with respect to the foundation, wherein the system comprises;

a rocker rigidly connected at a first end of a stiff body engaged to said structure and configured to transfer lateral movement of said upper region about the body, the rocker comprising
    a pivot anchor that is configured to pivot the body about
        a pivot axis perpendicular to said lateral movement and parallel said foundation, and
    at least two spaced apart anchors, one anchor each side of the pivot axis, each anchor dependent from, and intermediate, said foundation and the body, each anchor comprising at least one deformable member configured to plastically deform during said lateral movement, and
wherein a second end of the body opposite the rocker is constrained to one selected from the upper region, and a second rocker.

In one embodiment, said structure is a rack, ceiling, and/or building.

In one embodiment, the foundation is one of a ground, a floor, a ceiling, a beam, and a truss.

In one embodiment, the deformable member is dependent from the foundation.

In one embodiment, the deformable member is dependent from an vertical chord engaged to said structure.

In one embodiment, the vertical chord is substantially stiff compared to the deformable member.

In one embodiment, the vertical chord is pivotally dependent from the foundation on via a vertical chord pivot anchor comprising a vertical chord pivot axis parallel to the pivot anchor pivot axis.

In one embodiment, there are two vertical chords, each with their own respective vertical chord pivot anchor and spaced apart anchors, the anchors and central pivot anchor rigidly joined together by the body.

In one embodiment, the body is a truss.

In one embodiment, the body is substantially rigid compared relative to the deformable members.

In one embodiment, the upper region of the vertical chords are engaged to the structure.

In one embodiment, the vertical chords are engaged to the structure two thirds up the height of the structure.

In a further aspect the present invention may be said to an energy absorbing system for a structure mounted to a foundation to absorb lateral movement of said structure during earthquake, the upper region of the structure moving laterally during a seismic event, wherein the system comprises a body comprising a top region laterally constrained in operation to the upper region of said structure and a base opposite the top region comprising
    a pivot that is configured to pivotally depend from said foundation about an axis perpendicular to the lateral movement and parallel the foundation, the pivot allowing the body to rock back and forth about the axis and
    at least two spaced apart yield connectors, one yield connector on each side of the pivot, each spaced apart yield connector dependent from said foundation and body, and comprising one or more deformable members configured to plastically deform during rocking.

In one embodiment, the upper region of the system is constrained two thirds up the height of the structure.

In one embodiment, the height of the structure is more than 30 metres.

In one embodiment, the top region of the body is constrained with the upper region via cables.

In one embodiment, in operation one yield connector will deform in a clockwise direction and the opposite yield connector will deform in a counter clockwise direction when the body is rocked about the pivot.

In one embodiment, there are two ties connected to the upper region.

In one embodiment, the two ties are connected to the structure either side of the body.

In one embodiment, the ties are subjected to tensile loads during seismic activity in operation.

In one embodiment, the body is substantially stiff so as to allow minimal elastic deformation, and no plastic yielding, during lateral movement of the structure.

In one embodiment, the body may be a multimember truss system.

In one embodiment, the yield connectors are intermediate the body, and one selected from a vertical chord, horizontal chord, and foundation.

In one embodiment, the system comprises cables retaining the body to the vertical and/or or horizontal chord.

In one embodiment, the top region of the body is constrained to the structure from a substantially single point.

In an alternative embodiment, the top region of the body is constrained to the structure from laterally spaced apart regions.

In one embodiment, the deformable member has at least two spaced apart anchor regions.

In one embodiment, a seismic event creates relative movement between the foundation and body, which creates relative movement between the deformable member anchor regions.

In one embodiment, the anchors are configured to allow
  at least one anchor region to move in a lateral direction towards and away from the other anchor region, and
  at least one anchor region to rotate about a rotational axis perpendicular to said lateral direction and parallel with the plane of the foundation.

In one embodiment, the deflection of the deformable member caused by plastic yielding is far greater than the deflection caused by elastic deflection.

In one embodiment, the deformable member is highly flexible and/or ductile relative the truss.

In a further aspect a secondary flexural member is located intermediate of the rocker frame(s) inclusive of primary flexural members (plates), and a horizontal (e.g. foundation) or vertical (e.g. columns) structural base.

The invention relates to a control structure which helps direct and control the motion of connected force limiting and energy dissipating structural members (preferably a plate or plates), which are capable of stable cycling high displacement elasto-plastic flexure about their minor bending axis.

The plates enable the control structure to form a stable cycling high displacement elasto-plastic mechanism in resistive response to a seismic ground (base) motion input. The flexural yielding action of the plates in turn, limits the magnitude of forces that can develop within the control structure and within adjacent structures that the control structure may also be seismically supportive of.

That is, the control structure directs and controls the motion of the yielding plates; while the plates, yielding at a constant resistive force, limit the forces generated within the structure(s).

The present invention incorporates a rocker as part of a substantially stiff control structure that incorporates at least one yield connector to
  (a) transfer movement induced forces from the upper region of a storage rack or building structure to the foundation, and
  (b) intermediate of the foundation and the upper region through plastic yielding of the yield members (plates) of the control structure, limit forces that could develop both within the control structure and any adjacent structure it is seismically supportive of (rack or building).

In a further aspect the present invention may utilise a yield connector for absorbing energy during oscillatory movement between two structure members, the connector comprises:
  a first anchor secured directly or indirectly to and to move with one of two structure members
  second anchor secured to and to move with the other of said structure members,
  a flexural member having a first region (preferably an end region of the flexural member) supported at the first anchor and a second region (preferably an end region of the flexural member) spaced from the first region and supported at the second anchor in a simply supported manner.

In a further aspect the shear type control structure (alpha2 type) may be combined with the direct axial type control structure (alpha1 type) to form a composite alpha1/alpha2 control structure.

This is to preferably allow the flexural member to yield in a bending mode as the first and second anchors move relative each other in a direction (and reverse) that is normal to the plane of the flexural member.

Preferably at one of the first and second regions, the flexural member is able to rotate and translate relative to its respective anchors and at the other of the first and second regions the flexural member is pinned or cantilever to its respective anchor.

In a further aspect the present invention may be said to a control structure which is able to dissipate energy and limit forces developed within itself or a structure (e.g. building or storage rack) it connects with and is seismically supportive as it endures ground or base motion input from a seismic event, the control structure is comprised of a rocker frame which is pivotably connected to a structural base or structural member, wherein rotation of the rocker frame about its pivot causes a pivotably anchored elongate flexural member (s) which is directly or indirectly connected to the rocker frame, but distal to the rocker frame pivot, to flexurally displace, the flexural member(s) is configured with (i) free translational or (ii) free translational and free rotational boundary conditions to allow it to flex and yield about its minor bending axis to high elasto-plastic displacements (deformation) while maintaining a constant resistive yield force.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification [and claims] means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

As used herein the term 'diagonal' and its derivatives refers to any angle(s) obliquely of the vertical and the horizontal directions.

'Single curvature' means without forming a plural lobed arch form. It includes a symmetric form on either side of its intended attachment to the structure or rack from its anchoring, encumbered, fettered or like adaptions or zones.

As described herein the term plastic or ductile can be interchangeable and relate to material deformation past elastic deformation. When a stress is sufficient to permanently deform a material (such as a flexure member), it is called plastic or ductile deformation.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

FIGURE DESCRIPTIONS

The invention will now be described by way of example only and with reference to the drawings in which:

FIG. 1: shows a schematic front view of a control structure with inclined tension bracing.

FIG. 1A: shows a schematic front view of a control structure with inclined and horizontaltension bracing.

FIG. 2: shows a schematic front view of a control structure connecting to plan bracing.

FIG. 3: shows a schematic front view of a control structure similar to that of FIG. 2 but with frame in tower form with vertical chords.

FIG. 4A: shows control structures of FIG.s 1-3 within a rack structure or general building structure to which the control structure is seismically supportive.

FIG. 4B: shows an end view of FIG. 4A showing location of control structures of FIG.s 1-3 located intermediate of two storage racks.

FIG. 5A: shows a schematic front view of control structure with frame horizontally oriented and located between two vertical chords.

FIG. 5B: shows displaced form of control structure of FIG. 5A in sway mode.

FIG. 6A: shows a schematic front view of a simply spanning yield connector.

FIG. 6B: shows a schematic front view of FIG. 6A with displaced form of flexing yield plate.

FIG. 6C-6C-1: shows a simply supported plate/beam/

FIG. 6D-6D-1: shows a cantilevered simply supported plated/beam.

FIG. 7A: shows rocker frame pivot anchor to vertical chord connection. FIG. 7B: shows plan cross sectional view of FIG. 7A.

FIG. 8A: shows a schematic front view of control structure of FIG. 3 with yield connectors set within sleeve guide motion-controlled rocker and pin ended push rods connecting yield plates to main rocker frame.

FIG. 8B: shows control structure of FIG. 8A in sway mode.

FIG. 8C: shows control structure of FIG. 3 with yield connectors set within stay motion-controlled rocker and pin ended push rods connecting yield plates to rocker frame.

FIG. 8D: shows control structure of FIG. 8C in sway mode.

FIG. 8E: shows schematic detail of yield plate rocker of FIG. 8A with multipleplates.

FIG. 9A: shows schematic front view of control structure of FIG. 5A with yieldplates set within sleeve guide motion-controlled rockers and pin ended push rods connecting yield plates to main rocker frame.

FIG. 9B: shows control structure of FIG. 9A in sway mode.

FIG. 10A: shows a schematic front view of control structure of FIG. 9A in towerform.

FIG. 10B: shows a schematic detail of sleeve guide motion-controlled yield platerocker of FIG. 10A.

FIG. 10C: shows schematic detail of yield plate rocker of FIG. 10B but with rotation limiter blocks.

FIG. 11A: shows a schematic front view of control structure with two pivot rockerframes located between top and bottom beam with anchor ties.

FIG. 11B: shows a schematic front view of two framing control structures located between top and bottom beam.

FIG. 11C: shows schematic end view of control structure :located at end of racks.

FIG. 12A: shows a schematic view of control structure with inter-lamina shear yield connectors.

FIG. 12B: shows control structure of FIG. 12A in sway mode.

FIG. 13A: shows a front schematic view of the control structure of FIG. 12A horizontally orientated and located between two vertical chords.

FIG. 13B: shows control structure of FIG. 13A in sway mode.

FIG. 14A: shows a simple shear type plate for the control structures of FIGS. 12A and 13A fixed at the frame side and with rotatable and translatable connection to exterior chord at opposite end.

FIG. 14B: shows shear plate of FIG. 14A in displaced form when control structure in sway mode.

FIG. 15A-1: shows a continuous shear type plate fixed at frame side and with tworotatable and translatable supports at opposite connection to exteriorchord.

FIG. 15B-1: shows shear plate of FIG. 14A in displaced form when control structure in sway mode.

FIG. 16A: shows a rotationally restrained shear type plate fixed at frame side and with rotational restraint by rollers but free translation at opposite end connected to exterior chord.

FIG. 16B: shows shear plate of FIG. 16A in displaced form when control structure in sway mode.

FIG. 17: shows shear type connector of FIG. 14A with multiple plates.

FIG. 18A: shows schematic front view of control structure of FIG. 12A inclusive of motion control ties.

FIG. 18B: shows control structure of FIG. 18A in sway mode, inclusive of motioncontrol ties.

FIG. 18C: shows control structure of FIG. 13B inclusive of motion control ties.

FIG. 19A: shows schematic front view of control structure of FIG. 5A with secondary flexure member.

FIG. 19B: shows schematic detail of rocker of FIG. 19A connected to secondaryflexure member.

FIG. 19C: shows schematic detail of control structure in sway mode with inflexible secondary member.

FIG. 19D: shows schematic detail of FIG. 19C with flexing secondary member.

FIG. 19E: shows the force-displacement graph of a bilinear elastic stiffening system.

FIG. 19F: shows a schematic detail of a rocker connected to a secondary flexural member.

FIG. 20A: shows a side view of control structure within rack structure.

FIG. 20B: shows plan view of FIG. 20A.

FIG. 21A: shows a schematic view of control structure of finite dimensions withtension bracing yield connectors of FIG. 6A and base member.

FIG. 21B: shows displaced form of FIG. 21A under action of bracing tension forceswith inflexible base.

FIG. 21C: shows FIG. 21B type displacement with flexible base.

FIG. 21D: shoes schematic view of control structure of finite dimensions with tension bracing and sleeve guided motion-controlled yield connector rockers.

FIG. 21E: shows displaced form of FIG. 21D under action of bracing tensionforces.

FIG. 21F: shows FIG. 21E type displacement with flexible base.

FIG. 21G: shows schematic front view of control structure of FIG. 21D withrocker frame pivot elevated and supported by A-frame.

FIG. 21H: shows displaced form of control structure of FIG. 21G with rigid basemember under action of bracing tension forces.

FIG. 21I: shows FIG. 21H type displacement with flexible base.

FIG. 21J: shows schematic front view of lamina shear type control structure of finite dimensions with tension bracing.

FIG. 21K: shows displaced form of control structure of FIG. 21J under action ofbracing tension forces.

FIG. 21L: shows FIG. 21K type displacement with flexible base.

FIG. 22: shows control structure with tension bracing and hydraulic dampers.

FIG. 23: shows single tension brace to control structure of FIG. 22.

FIG. 24A: shows control structure of FIG. 8A with planar concrete rocker frame.

FIG. 24B: shows shear type control structure of FIG. 12A with planar concrete rocker frame.

Alpha1 Rocker Frame

FIG. 25: Alpha1 Frame Elevation with beta1 yield plate rocker with eccentricpivot.

FIG. 26: Alpha1 Frame sway mode (beta1 rocker/eccentric pivot).

FIG. 27: Alpha1 Frame Elevation with beta1 yield plate rocker with concentricpivot.

FIG. 28: Alpha1 Frame sway mode (beta1 rocker/concentric pivot).

FIG. 29: Alpha1 Frame Elevation with beta2 yield plate rocker with eccentricpivot.

FIG. 30: Alpha1 Frame sway mode (beta2 rocker/leccentric pivot).

FIG. 31: Alpha1 Frame Elevation with beta2 yield plate rocker with concentricpivot.

FIG. 32: Alpha1 Frame sway mode (beta2 rocker/concentric pivot).

FIG. 33: Beta2 yield plate rocker elevation with motion control sleeve guide, multiple plates and concentric pivot.

FIG. 34: elevation of FIG. 33.

FIG. 35: Plan of rocker sleeve (beta2 rocker), plan of yield plate.

FIG. 36: Beta2 yield plate rocker section.

FIG. 37: Beta2 yield plate rocker elevation with motion control sleeve guide, and multiple yield plates and eccentric pivot.

FIG. 38: Part Elevation of alpha1 Frame with beta2 yield plate rocker and eccentric pivot.

FIG. 39: Plan of beta1, beta2 yield plate rocker with eccentric pivot and delta1 yield plate.

FIG. 40: Beta2 yield plate rocker, with concentric pivot and flexing/yielding plate.

FIG. 41: Plan of beta1, beta2 yield plate rocker with concentric pivot and delta1 yield plate.

FIG. 42: Delta1 yield plates; simply spanning, no rotational or translationa restraints each end.

FIG. 43: Delta2 yield plates; continuous with variable stiffness rotational restraint at each end. No translational restraints.

FIG. 44: Delta3 yield plates; full rotational restraints and each end. No translational restraints.

FIG. 45: Elevation of delta1 yield plate within beta1, beta2 rocker with eccentricpivot.

FIG. 46: Elevation of delta2 yield plate within beta1 rocker with motion control stays and eccentric pivot.

FIG. 47: Elevation of delta2 yield plate within beta1, beta2 rocker with eccentricpivot.

FIG. 48: Plan of delta2 yield plate.

FIG. 49: Elevation of beta1, beta2 rocker with slots for delta2 yield plate.

FIG. 50: Elevation of delta3 yield plate within beta1, beta2 rocker with eccentricpivot.

FIG. 51: Elevation of beta1 rocker with motion control stays, multiple plates and eccentric pivot.

FIG. 52: Elevation of beta1 rocker ith motion control stays, multiple plates and concentric pivot.

FIG. 53: Elevation of delta1 yield plate within beta1, beta2 rocker with concentricpivot.

FIG. 54: Elevation of delta2 yield plate within beta1, beta2 rocker with concentricpivot.

FIG. 55: Elevation of beta1 beta2 rocker with slots for delta2 yield plate.

FIG. 56: Elevation of delta3 yield plate within beta1, BETA2 rocker with concentric pivot.

FIG. 57: Part elevation of alpha11 Frame to column connection.

FIG. 58: Plan of FIG. 57.

FIG. 59: Part Elevation of alpha1 Frame base Pivot.

FIG. 60: Plan of FIG. 59.

FIG. 61-79: Various arrangements of alpha1 Frame.

FIG. 80: Elevation of alpha1 Frame within two tier ductile system.

FIG. 81: Detail of FIG. 80.

FIG. 82: Two tier system sway mode.

FIG. 83: Two tier system sway mode with yield plates at flexural limit and secondtier member flexing and yielding.

FIG. 84: Plan of edge supported circular yield plate within beta1, beta2 rocker.

FIG. 85: Elevation of FIG. 84.

Alpha2 Rocker Frame

FIG. 86: Alpha2 Frame Elevation.

FIG. 87: Alpha2 Frame in sway mode.

FIGS. 88 & 89: Motion control stays in sway mode.

FIGS. 90 & 91: Delta4 yield plate; simple. No rotational or translational restraint one end; fixed opposite end.

FIG. 92: Slot in connection plate for delta4 yield plate.

FIG. 93: Delta4 yield plate; flexing / yielding in frame sway mode.

FIG. 94: Delta5 yield plate; continuous variable stiffness rotational restraint with no translationalpha1 restraint one end; fixed opposite end.

FIG. 95: Delta5 yield plate; flexing/yielding in frame sway mode.

FIG. 96: Slots in connection plate for delta5 yield plate.

FIG. 97: Delta6 yield plate; full rotationalpha1 restraints at each end. Notranslational restraints at one end.

FIG. 98: Delta6 yield plate, flexing/yielding in frame sway mode.

FIG. 99: Plan of delta6 yield plate.

FIG. 100: Elevation of multiple delta4 yield plates (similar for delta5, delta6).

FIG. 101: Plan of delta4 yield plate.

FIG. 102: Elevation of motion control tie connection to exterior chord.

FIG. 103: Plan of motion control tie between exterior chord and rocker frame centre line.

FIG. 104: Elevation of motion control tie between exterior chord and rocker frame centre line.

FIG. 105: Alpha2 Frame; Vertical Orientation (motion control ties excluded forclarity).

FIG. 106: Alpha2 Frame; Vertical orientation in sway mode (motion control ties excluded for clarity).

FIG. 107: Alpha2 Frame; Horizontal Orientation (motion control ties excluded for clarity).

FIG. 108: Alpha2 Frame; Horizontal Orientation in sway mode (motion control ties excluded for clarity).

FIG. 109: Alpha2 Frame; Vertical Orientation (motion control ties included).

FIG. 110: Alpha2 Frame; Vertical Orientation in sway mode (motion control ties included).

FIG. 111: Alpha2 Frame; Horizontal Orientation (motion control ties included).

FIG. 112: Alpha2 Frame; Horizontal Orientation in sway mode (motion control ties included).

DETAILED DESCRIPTION

The invention relates to a control structure which helps direct and control the motion of connected force limiting and energy dissipating structural members (preferably a plate or plates of a yield anchor), which are capable of stable cycling high displacement elasto-plastic flexure about their minor bending axis, or out of plane bending.

The invention comprises a device and mechanism, or more specifically a control structure with a pivoting rocker frame, which directs and governs the motion of a connected force limiting and energy dissipating structural plate(s) with connector (yielding connector or yield connector) which by its form is capable of producing a stable, constant resistive yield force while flexurally yielding about its minor (or out of plane) bending axis to high elasto-plastic displacements. The plate(s) action enables the control structure, it is a part of, to form a stable elasto-plastic mechanism which is able to flow and cycle to high elasto-plastic displacements with constant resistive force, in resistive response to ground (base) motion input, while internal forces within it or any adjacent structure it may also be seismically supportive of, are maintained and limited to maximum values which are a function of the yield force of the structural plates which are part of it.

The control structure by governing the motion of the yielding plates within it in a controlled manner is subsequently modifying its own natural response (displacement, velocity, acceleration) and response of masses or adjacent structures it may be directly or indirectly seismically supportive of.

By flowing as a stable, high displacement capable, elasto-plastic mechanism with constant resistive yield force; the control structure is limiting the magnitude of accelerations and dynamic forces that can develop within its members as it endures the ground motion (displacement, velocity, acceleration) input.

That is, the control structure directs and controls the motion of the yielding plates; while the plates, yielding at a constant resistive force, limit the forces generated within the structure(s).

The plates are effectively cushioning the control structures response to ground motion or base excitation.

Contingent on the plates to limit the forces within the control structure and any connected structure; is their ability to sustain potentially high cycling elasto-plastic displacements (deformation) in a stable manner while maintaining a constant resistive yield force.

The magnitude of the peak elasto-plastic displacement demand on the plates is a function of a number of variables including; ground motion (acceleration) input, mass seismically supported by structure and its distribution, elastic natural frequency of structure(s) (inclusive of plates) and yield strength of plate(s).

The ability of the plate(s) to sustain the cycling peak displacement demands on them, while maintaining a stable constant resistive yield force is further dependent on their material stress-strain characteristics, and structural form.

For convenience, reference will herein predominantly be made to an energy absorbing system 1000 control structure for use in or incorporated in a storage rack 3. It will be appreciated that other applications of the present invention exist. Such include but are not limited to high rise buildings.

During a seismic event, as described previously, storage racks can sway in a lengthwise and width-wise direction.

During a seismic event the equivalent force applied to the structure can be approximated to be acting at say around 70% the height of the storage rack 3 or load supporting structure. This does, depend on the weight distribution of goods supported on the rack 3.

The system of the current invention can be incorporated (and retrofitted) to a storage rack or structure to modify and control the displacement, velocity and acceleration response of both the structure and masses supported by it, to ground motion (earthquake acceleration) input and limit the forces generated within the members of the rack structure or building structure and the control structure seismically supportive of it during a seismic event.

The present invention utilises a system as part of or incorporated into a structure to restrain (but not prevent) the structure against movement during a seismic event and dissipate energy during movement. The present invention incorporates a rocker 2000 as part of a substantially stiff control structure that incorporates at least one yield connector to (c) transfer movement induced forces from the upper region of a storage rack or building structure to the foundation, and (d) intermediate of the foundation and the upper region through plastic yielding of the yield members (plates) of the control structure, limit forces that could develop both within the control structure and any adjacent structure it is seismically supportive of (rack or building).

The simple structural behaviour of the yield plate of the yield connector 230 allows for its performance to be both load tested and/or calculated accurately. Its design is such that its yield force and energy absorbing performance remains predictable during each movement cycle of the control structure and storage rack during a seismic event. The yield connector utilises a flexure member 100, that is able to deform. The flexure member 100 (also herein referred to as the plate) is designed or has its performance known for its intended purpose. As such the more accurate the analysis of it the more simplified the design of the overall structure can be and the more predictable the outcome will be during a seismic event. Further to this, it is important that the flexure member 100 (plate) is not able to develop tensile or compressive membrane forces within itself as it flexes to high transverse plastic displacements during yield. Membrane forces generated within a yielding member (plate) will both increase the (plate) stiffness and result in an increasing force resistance within the plate with increased deformation. This in turn will reduce its energy dissipating and force limiting ability, resulting in higher forces being developed in both the control structure and any adjacent structure the control structure may be seismically supportive of.

FIGS. 1 to 3 show a variety of energy absorbing systems 1000 (also herein referred to as control structures) that can be included or that can form part of a storage rack or general building structure. Their incorporation in a storage rack or building is shown in FIG. 4A. Each system comprises a rocker 2000 that includes a frame 280 and a pivot anchor 240. In the examples shown in FIGS. 1 to 3 the pivot anchor 240 may be directly connected to the foundation 4. In other embodiments herein after described, the pivot anchor 240 may be connected to other structures or other component.

The pivot anchor 240 provides a dedicated pivot for rotational movement of the frame 280 of the control structure it is part of. The movement is constrained at least in part by the yield connectors 230 that are disposed outwardly from each side of the pivot anchor 240 in the lengthwise direction. Preferably the pivot anchor 240 is located centrally and intermediate two spaced apart connectors 230A and 230B. Preferably the connectors 230A and 230B are the same.

In some embodiments, the rocker 2000 comprises a frame 280 which engages the two spaced apart yield connectors 230 and the pivot anchor 240. The frame 280 may be part of the storage rack or be incorporated therewith preferably to extend and be secured (directly or indirectly) to an upper region 27 of the storage rack 3 or to each floor of a general building structure. The upwardly extending parts of the frame 280 connecting to the storage rack allow for some or all of the forces from the swaying of the rack 3 or structure to be transferred to the pivot anchor 240 and the yield plates of the connector 230. The motion of the frame 280 being compatible with the motion of the rack 3 or structure. The connection between the control structure and any other adjacent structures it is seismically supportive of must be compatible with the motion of the control structure. For example a vertically slotted pinned connection at the centrelines of the frame pivot 240 or chord base pivots 315. The frame 280 may be short as shown in FIG. 1 or tall as shown in FIGS. 2 & 3. A short frame 280 may be joined to an upper region by ties, struts or cables 270 to provide the force transfer during swaying, as shown in FIG. 1. The short frame embodiment as shown in FIG. 1 may be utilised where lower rack heights are encountered. Where higher rack 3 heights are encountered, a tall frame embodiment may be desirable.

FIG. 1 shows an embodiment that may be best suited for a low storage rack height or where tie cables 270 may be used. Preferably the tie cables 270 do not exceed a 45 degree angle with the foundation. This helps them efficiently transfer lengthwise forces from the storage rack 3 to the rocker 2000 and yield connectors.

The energy absorbing system 1000 (control structure) may be joined to an upper region 27 of a storage rack 3. This may be two thirds up the height of the storage rack 3. This is a typical approximation of where the equivalent applied forces from seismic activity may be focused. It is envisaged that a person skilled in the art will realise that the energy absorbing system 1000 may be engaged at any height to a storage rack depending on the characteristics of stiffness required for the rack.

Preferably the energy absorbing system 1000 comprises a top attachment 250. The top attachment 250 is be configured to attach to a member such as bracing 26 (sometimes known in the industry as plan bracing) of the storage rack 3. If the bracing is a strut or other similar stiff member, preferably this top attachment can pivoted so it does not create any torque or moments in the frame 280 or rack 3.

The bracing 26 is merely a method of connecting the top of the frame 280 or top attachment 250 to the storage rack 3. Where two racks are provided back to back, bracing is typically located intermediate of the racks as shown in FIG. 4B. Plan bracing and connections can also be located at beam levels below the top of the structure.

The plan bracing 26 can span two or more racks. Intermediate the two racks is gap 23 where the energy absorbing system 1000 is located. In alternative embodiments the energy absorbing system 1000 is located at the front face of a storage rack or on both the front and back face.

The frame 280 is preferably a relatively stiff structure compared to the flexible nature of the flexure member 100 (yield plates). Preferably the frame 280 is of a truss type configuration. The truss may be of a multitude of designs and configurations as appropriate for the construction and required functional characteristics of the energy absorbing system 1000. In applications to general building structures a stiff planar reinforced concrete element could also be used for frame 280 (FIGS. 24).

As briefly described earlier, the energy absorbing system 1000 (control structure) is connected or able to be connected to the storage rack 3 or other structure at or near its upper region 27. It is retrofittable to the storage rack or other structure. Given that the stiff frame 280 has little internal displacement (distortion) under applied load, the stiff frame 280 gets rocked or rotated about the pivot anchor 240. The role of the frame 280 is to transfer forces during length wise movement from the upper region 27 to the pivot 240. The rocking movement about the pivot anchor 240 is transferred to the spaced apart yield connectors 230. The rocking movement is then at least partially absorbed by the flexure members 100 (yield plates) as these plastically flex. For example, as shown in FIGS. 1-3, a lengthwise movement of the storage rack 3 to the right cause clockwise rotation of the frame 280 about the pivot anchor 240. This will cause the flexure member 100 of the yield connector 230A to yield in an upwards manner and the flexure member 100 of the yield connectors 230B to move downwards. The lengthwise movement of the upper region 27 is transferred into substantially vertical movement (in one embodiment) into the yield connectors 230. The vertical displacement (motion) of the yield plates is directed and controlled by the control structure of which the yield plates are a part. The yield plates in deforming (flexing) beyond their yield deflection produce a constant resistive yield force which in turn limits the forces that could develop within the control structure and any adjacent structure it may be seismically supportive of.

FIGS. 5A & 5B show another embodiment of the energy absorbing system 1000. FIG. 5A shows a rack 3 in its non-displaced condition, and FIG. 5B shows a rack 3 in a displaced condition.

This embodiment is referenced by numerals 300. I.e. the frame 280, is referenced as the frame 280 and so forth. In this example, the energy absorbing system 1000 effectively comprises two pivot anchors connected by a frame 380. The frame 380 pivots about each pivot anchor 340 and also connects to yield plates which are set within their own rockers. The yield connectors 331-334 are comprised of yield plates supported within yield plate rockers.

The energy absorbing system 1000 locates a rocker 2000 intermediate of two substantially stiff vertical chords 310 (also known as vertical chords) that can sway relative to the ground. The vertical chords 310 are pivotally connected by pivot anchors 315 to the foundation 4. The vertical chords 310 are shown schematically in FIG. 5. The rocker 2000 comprises a frame 380 and two pivot anchors 340. The four yield connectors 331-334 are engaged to the respective vertical chords 310. The yield connectors 331-334 are comprised of yield plates set within their own pivoting rockers which connect to vertical chords 310.

The frame 380 is preferably a stiff truss like configuration, as described previously, to help transfer forces and movement between the two vertical chords 310. The functionality of the two pivot rocker 2000 is much the same as the rocker 2000 previously described. It comprises pivot anchors 240 that allow the frame to pivot relative the vertical chords 310. The yield connectors 331-334 and the frame pivots 240 in this embodiment are not anchoring the rocker 2000 or frame 380 directly to the foundation, but anchoring the frame 380 to each vertical chord 310 that in turn is pivotally anchored to the foundation 4. The foundation 4 is the floor of a structure, a foundation, or a beam or truss type system.

The pivot anchor 315 is engaged to the foundation 4 and defines a rotational axis parallel to the foundation 4 and perpendicular to the lengthwise direction of the storage rack 3. In the preferred embodiment the upper regions 312 of the stiff vertical chords 310 may or may not be connected/engaged with the upper region of the storage rack 3 or building structure.

In a preferred embodiment, there is a first upper yield connector 331 and a second upper yield connector 332 respectively connected to a first of said vertical chords 313 and a second of said vertical chords 314. Furthermore there is a lower first yield connector 333 and a lower second yield connector 334 connected to respective first vertical chord 313 and second vertical chord 314. The flexure members 100 (plates)of the upper yield connectors 331 and 332 deflect in the opposite direction of movement of the storage rack 3 during lengthwise movement of the storage rack 3, and the lower yield connectors 333 and 334 deflect in the direction of lateral movement of the storage rack 3 during seismic activity.

The frame 380 stays substantially horizontal during motion and together with the yield connectors 331-334 allows, yet resists, the racking movement of the energy absorbing structure.

One type of yield connector 230 that may be used for many embodiments (excluding FIGS. 5A and 5B) of the energy absorbing system 1000 herein described is shown in FIG. 6A-B.

As discussed previously, it is ideal that tensile or compressive membrane forces do not develop in the flexure member 100 (plate). Briefly, the connector should allow for the flexure members 100 end regions 231, 232 to translate freely without impediment or restriction, or being encumbered, fettered or the like with the foundation 4 during a yielding condition. The ability of the end regions 231, 232 to translate relatively freely during yielding or lifting of the flexure member is preferred to allow the flexure member 100 to be pulled and deformed/deflected into a curve. In other words the yield member 100 plates are free to flex simply without generating any tensile or compressive membrane forces in the end regions 231, 232 and hence within themselves and for the simply spanning plate, shown in FIG. 6, also be free to rotate at its end regions so as not to develop any unintended end moments.

In one embodiment the flexure member may be described as a simply supported beam. Where a simply supported beam is well known and defined in classical mechanics. A simply supported beam, in one embodiment has a pinned end end condition at one end of a beam or plate (herein the flexure member), and a translational and pinned end end condition at the other end of a beam plate as shown in FIG. 6C. The flexure plate described herein, alternatively may have a fixed/cantilever end condition instead of its pinned end as shown in FIG. 6D. 6C and 6D also show an example of a minor axis (or out of plane axis) 9 going into the page.

The yield connector must also allow for relatively easy lateral translation of a flexure member 100 end region during yielding. This lateral translation during yielding, allows the flexure member 100 to be drawn up with the rocker 2000 or rack during yielding without stretching, or generating membrane tension in the flexure member, or prying at the end regions. And subsequently the substantially lateral translation of an end region allows the flexure member 100 to be driven in the opposite direction, during its operational yielding in the opposite direction, without the flexure member 100 crumpling or kinking.

FIG. 6A shows the yield connector 230 in non-deflected condition stable condition, and FIG. 6B shows a yield connector 230, with the flexure members 100 are in an upwards deflected condition. FIGS. 6A and 6B utilise a pin 234 and slot 235 system to allow both translation and rotation at each end region 231, 232. There are many systems available that will allow both sliding, and/or translation.

FIG. 6C shows a further embodiment of a yield connector 230, with a flexure member 100 shown in a dashed deflected condition. The embodiment of FIG. 6C uses as a retaining slot 236 which allows both translation and rotation of the flexure member 100.

A detailed view of the pivot anchor 340 engaged to a vertical chord 310 as per the configuration of FIG. 5A is shown in a side view in FIG. 7A. A plan cross sectional view is shown in FIG. 7B. Preferably the pivot anchor 340 is pinned by a pin 342 to the vertical chord 310 through the centroid of the vertical chord. The pivot anchor 340 has a pivot axis 341, and the pin 342 allows the frame 280 to pivot about the pivot axis 341 on the vertical chord 310.

The connection of the yielding member (plate) to the horizontal base 4 shown in FIGS. 6A and 6B may be through anchor rods. With this connection the end regions of the flexing member are free to translate and rotate without generating tensile or compressive membrane forces within the plate.

A more ideal connection is shown schematically in FIGS. 5A and 5B. Here the yield plates (member) may be supported within a pivoting rocker. The rocker can be motion controlled through the use of sleeve guides or stays.

The rockers function is to help maintain an orthogonal loading to the yield plate(s) supported and contained within its casing while the yield plate(s); loaded by the pin ended tension/compression ties (push rods) of the rocker frame, undergo high transverse elasto-plastic displacements.

The rockers pivots may be either concentric with or eccentric to the yield plate(s) contained within it.

FIG. 8A schematically shows a sleeve guided rocker with its pivot eccentric to the yield plate.

In FIGS. 8A to 8E the rockers are fixed to a horizontal (foundation) structural base.

Figure 8A:
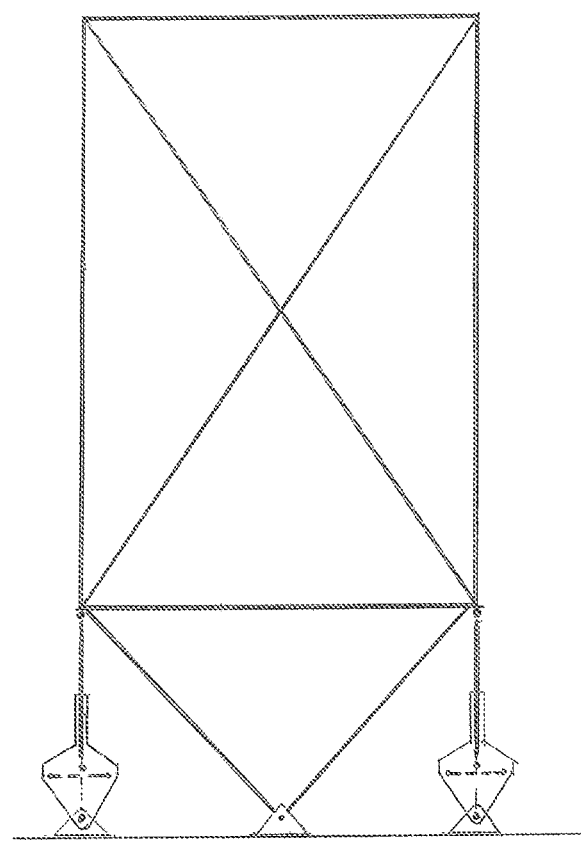
FIG. 8B shows the same rocker in frame sway mode.
FIG. 8C shows the same frame and similar yield plate rocker; but here the motion of the rocker is controlled by a stay.
FIG. 8D shows the rocker of FIG. 8C in frame sway mode.
FIG. 8E shows an extension of the principle to a sleeve guided rocker with multiple yield plates.
Figure 8B:
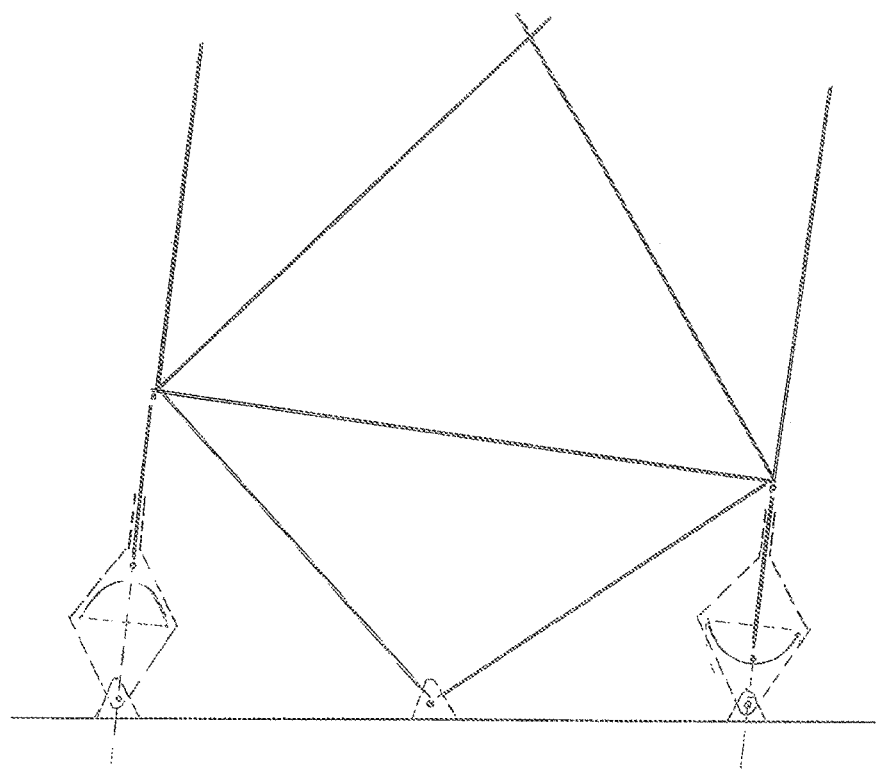
Figure 8C:
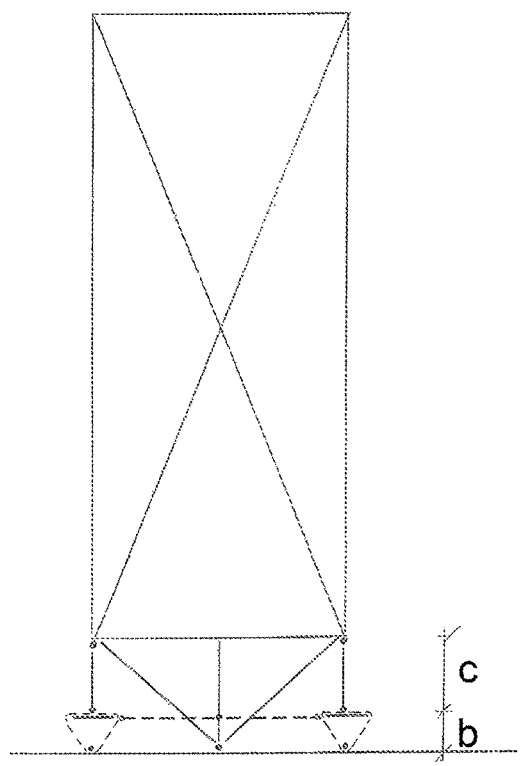
Figure 8D:
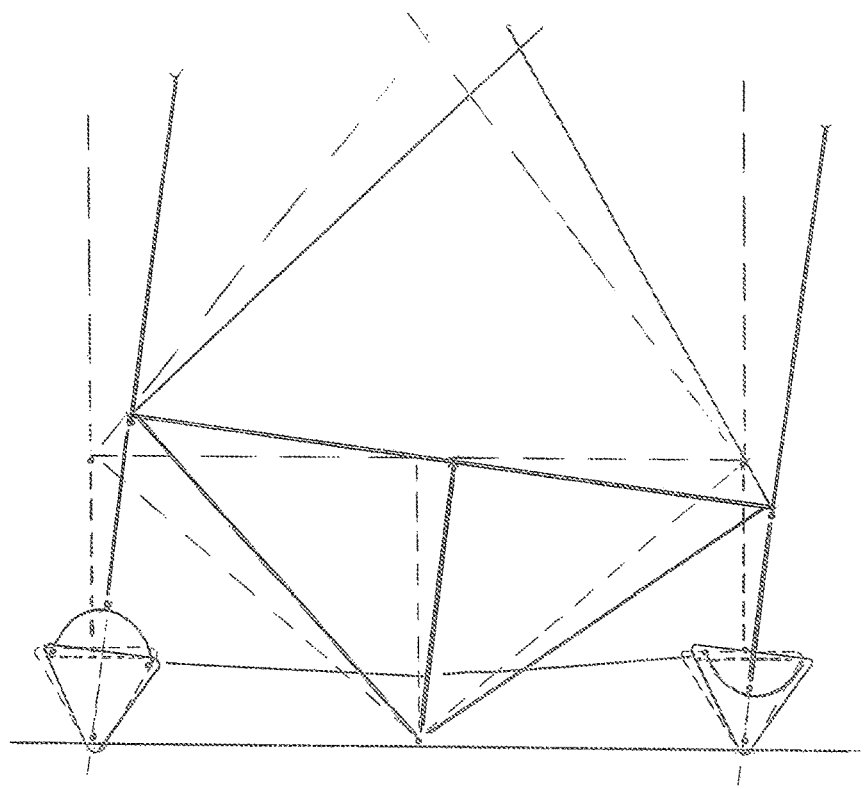
Figure 8E:
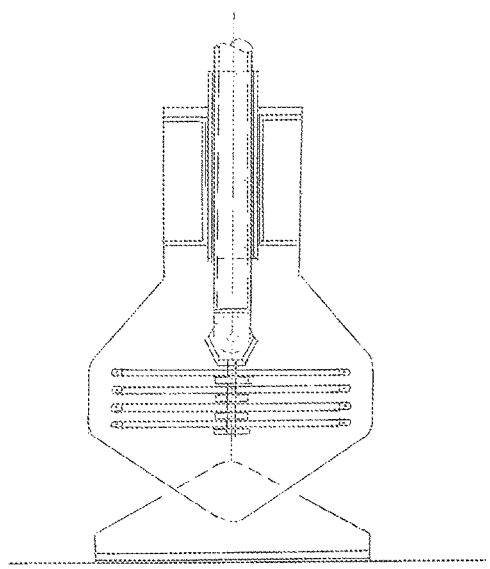
Figure 9A:
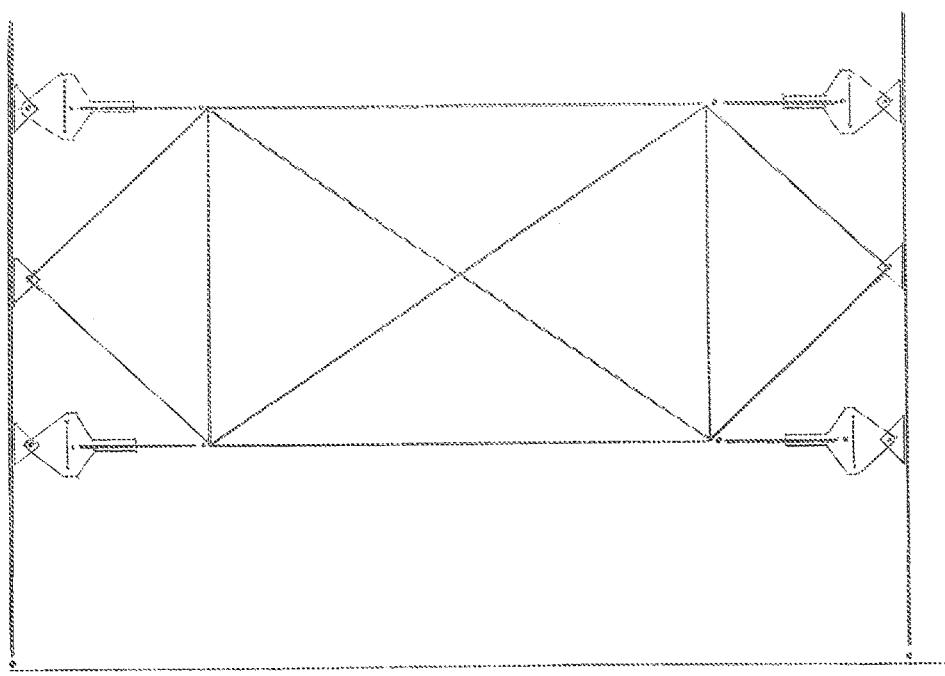

In FIG. 9A the system shown in FIG. 8A is located between two vertical structural chords.

Figure 9B:
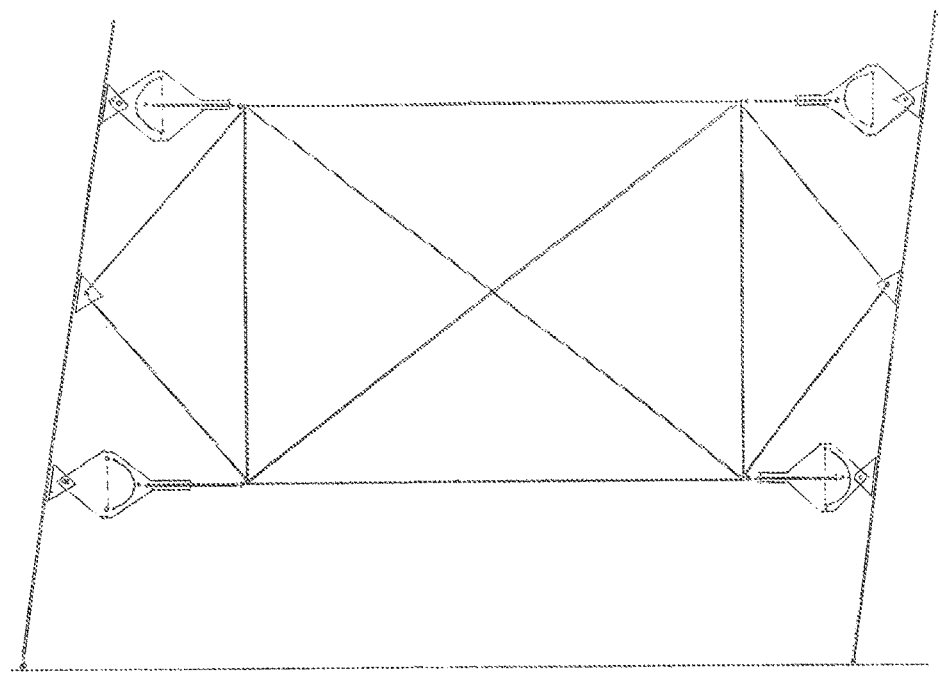

FIG. 9B shows the frame of FIG. 9A in sway mode.

Figure 10A:
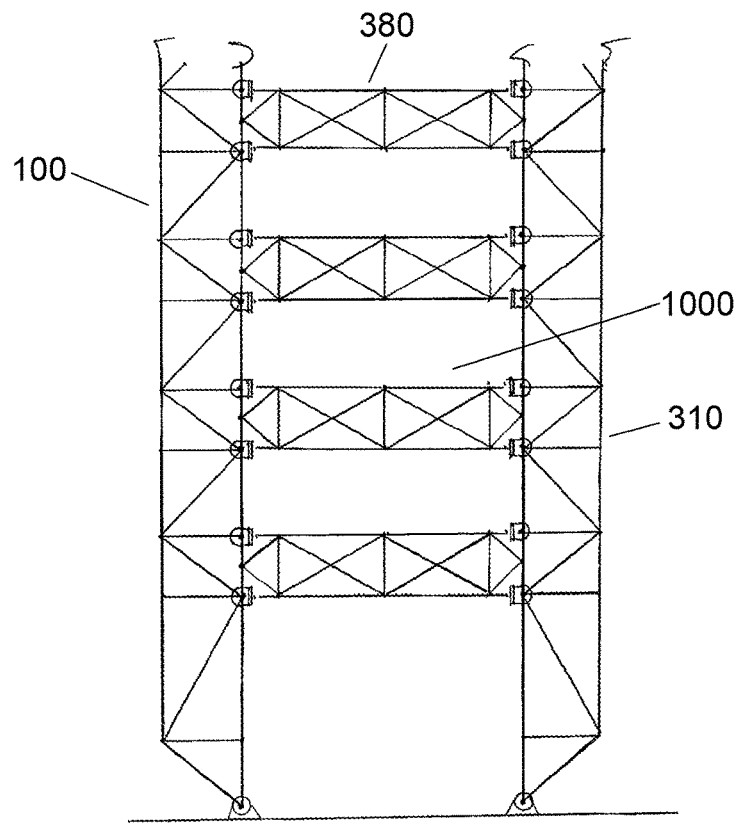

FIG. 10A schematically shows the horizontally orientated system of FIG. 9A within a tower frame.

Figure 10B:
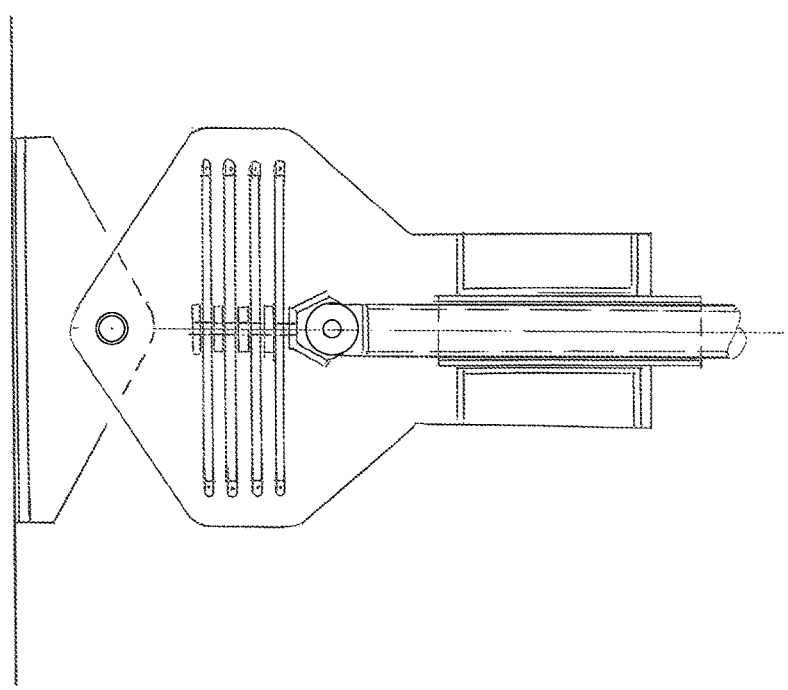

FIG. 10B shows the towers yield plate rocker within which multiple yield plates are supported. Here the rockers motion is sleeve guide controlled.

Figure 10C:
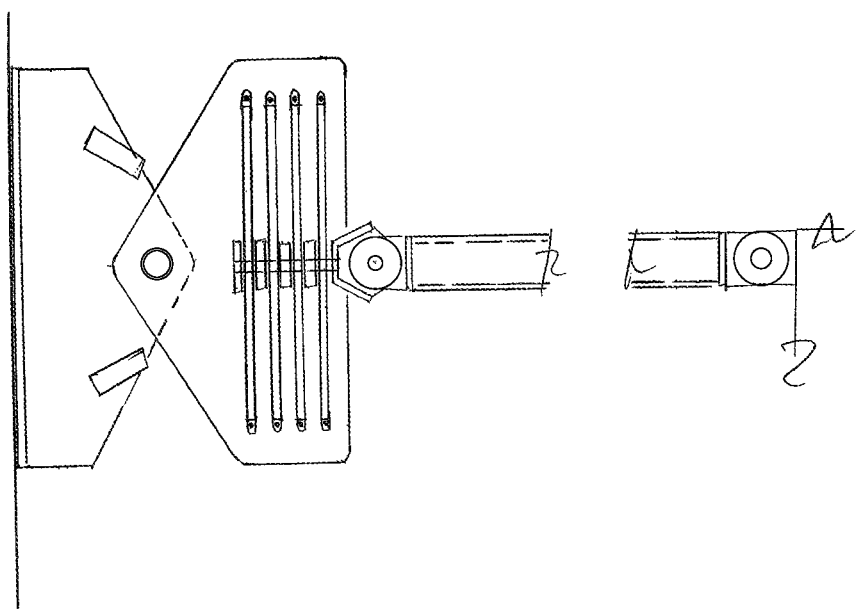

A similar but less ideal yield plate rocker is also shown in FIG. 10C. Here motion control guides or motion control stays are replaced with rocker rotation limiter blocks.

Further arrangements and combinations of rocker frames, yield plate rockers and non-tensioning yield plates are presented in figures subtitled alpha1 rocker frame and alpha1 rocker frame Here rocker frames (e.g. frame 280), yield plates (e.g. flexure member 100) and yield plate rockers (e.g. yield plate connectors 230) are more specifically categorised; respectively as alpha frames (types alpha1 and alpha2), delta plates (types $delta_1$ to $delta_6$) and beta rockers (types $beta_1$, $beta_2$).

Figure 11A:
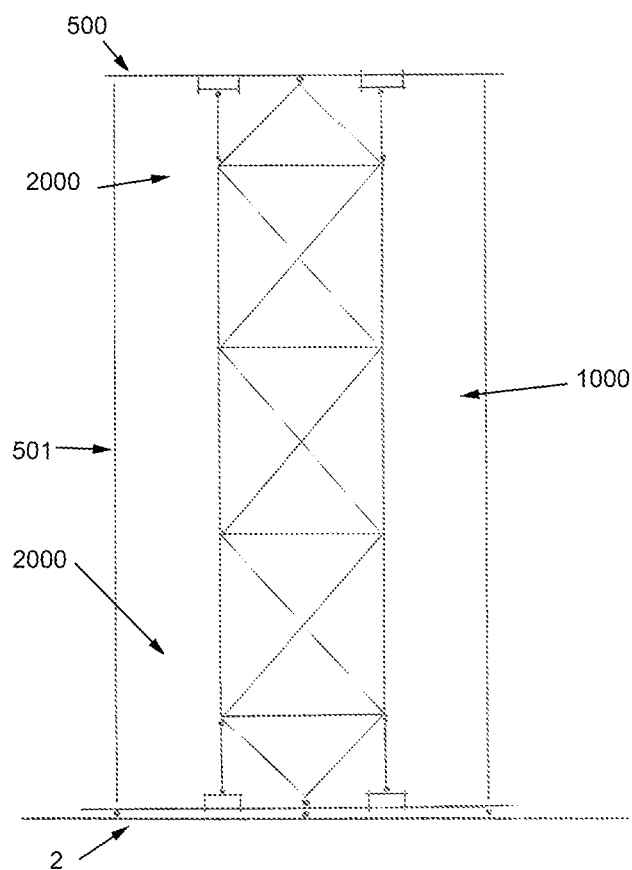
Figure 11B:
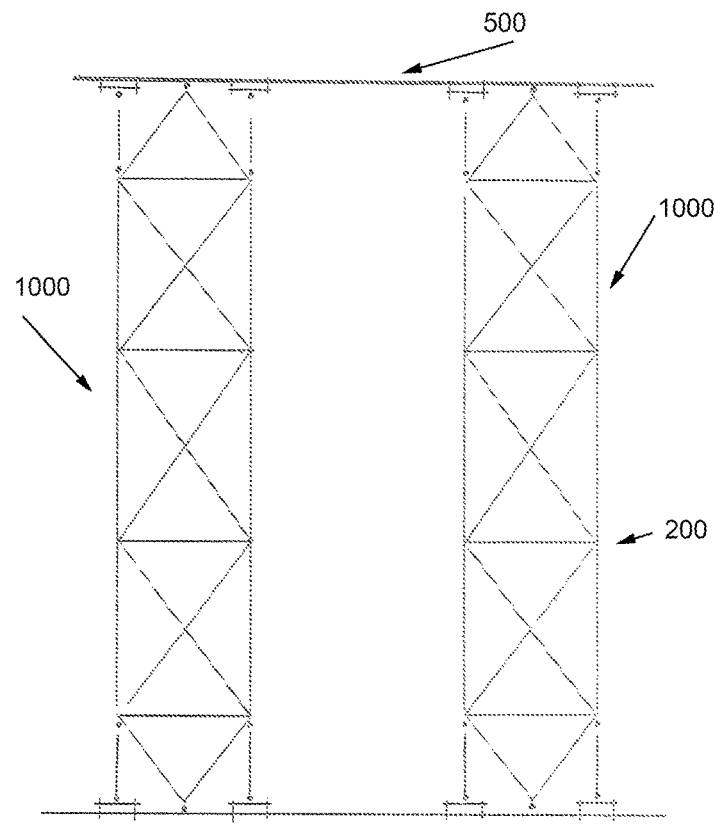

FIGS. 11A-B show two embodiments of the energy absorbing system 1000. The system 1000 comprises a two pivot rocker 2000 as previously described. Instead of the system 1000 being engaged intermediate two vertical chords, it is engaged between a base (like a foundation 4 or floor) and a beam, roof, ceiling or upper region of a rack 2.

Figure 11C:
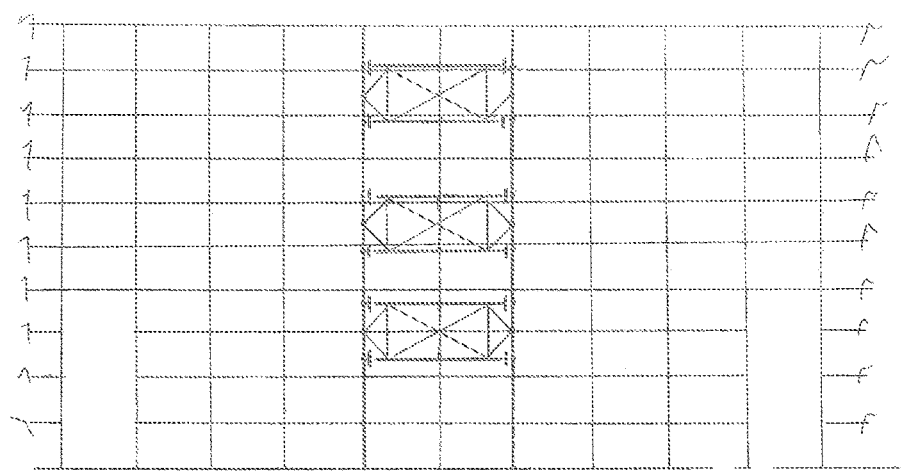

In a further embodiment as shown in FIG. 11C, there may be multiple energy absorbing structures 1000. For example a very tall (and/or heavy) storage rack 2 or structure may have four to twenty energy absorbing structures 1000 spaced apart along its height. In typical embodiments, each energy absorbing structures 1000 is preferably identically configured and of a kind herein described.

Figure 7A:
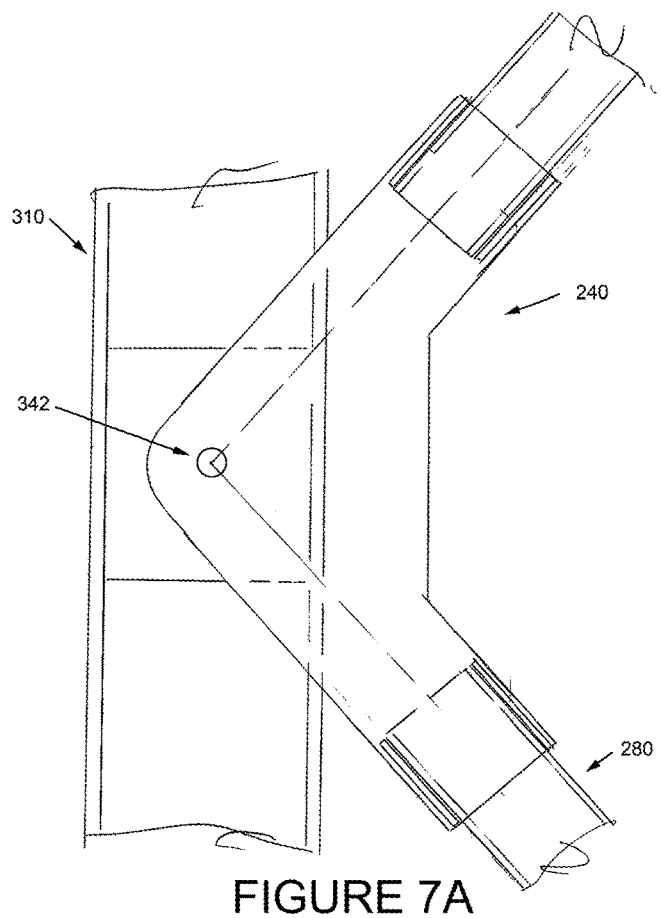
Figure 7B:
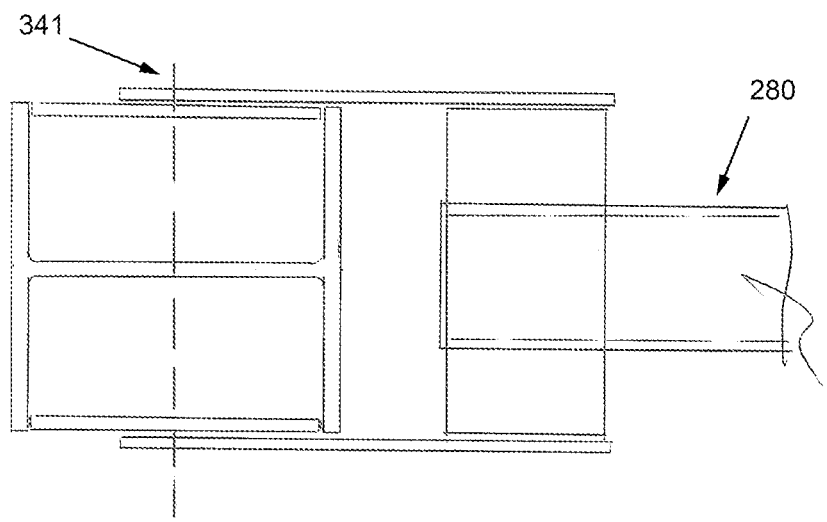

Alternatively the embodiment shown in FIGS. 11A and 11B may be used between a top hat 500, such as a stiff beam or truss, and a lower beam or foundation of a storage rack. In which case the top hat 500 may be connected to the plan bracing of the storage rack. The top hat 500 is connected to the upper pivot of rocker 2000. The top hat 500 both increases the elastic stiffness of the control structure, reducing its elasto-plastic displacement during a seismic event and increases the strength and energy absorbing capacity of the control structure. These lateral extensions of a system can be attached to plan bracing of a storage rack or structure and increases the amount of contact and leverage the energy absorbing structure 1000 has with the rack 2. Ties 501 may also be used where the system is used on the end of a storage rack, and not on the side of a rack. I.e. the system is used to prevent width-wise racking—one embodiment of this is shown in FIG. 7.

Figure 1:
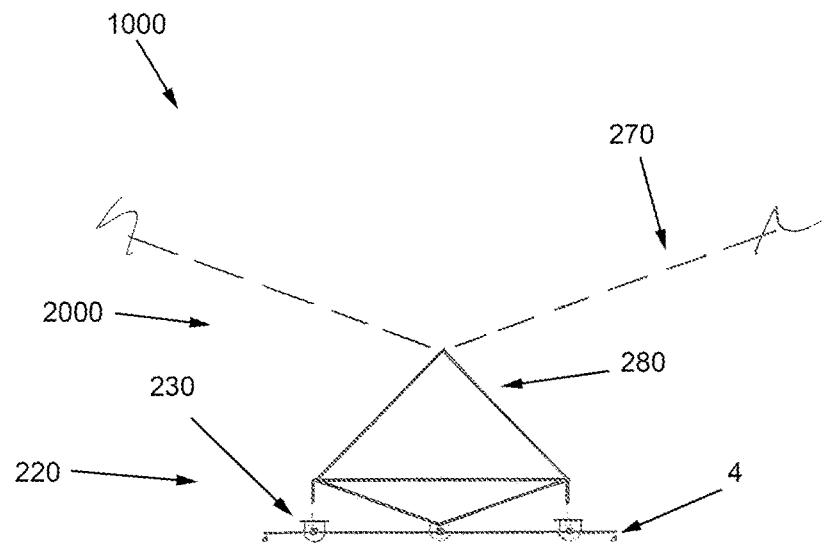
Figure 1A:
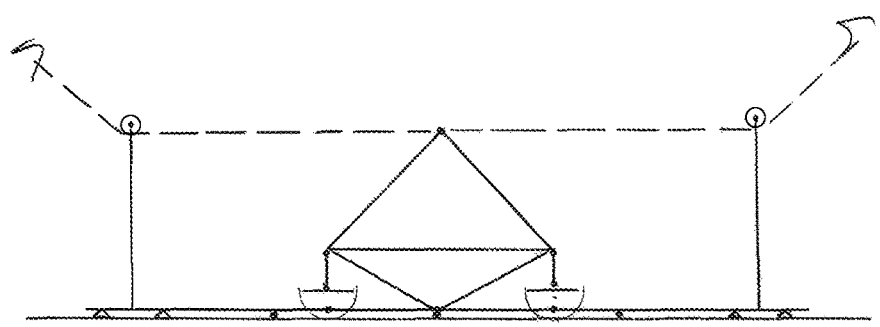
Figure 2:
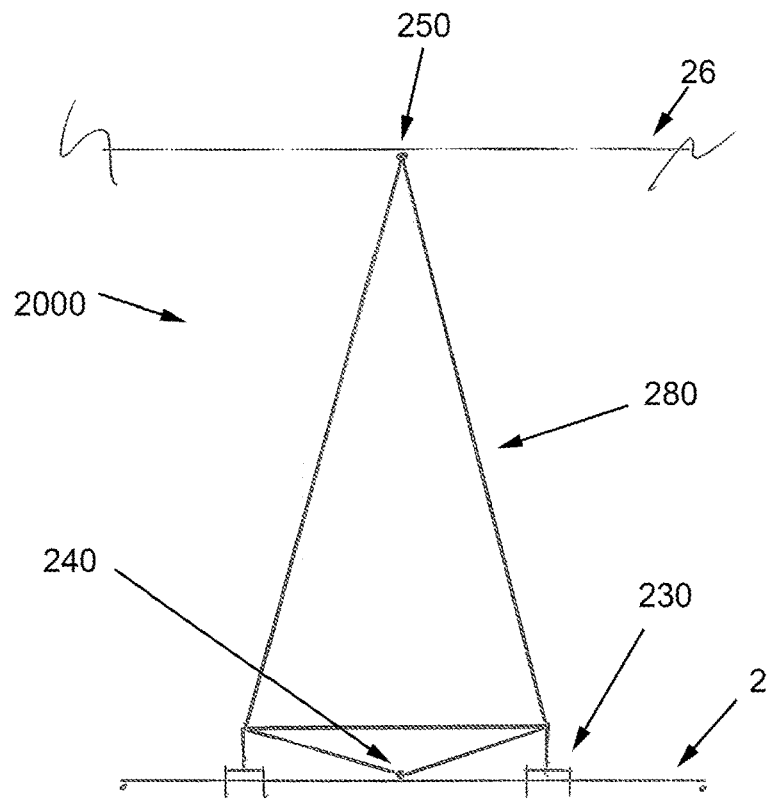
Figure 3:
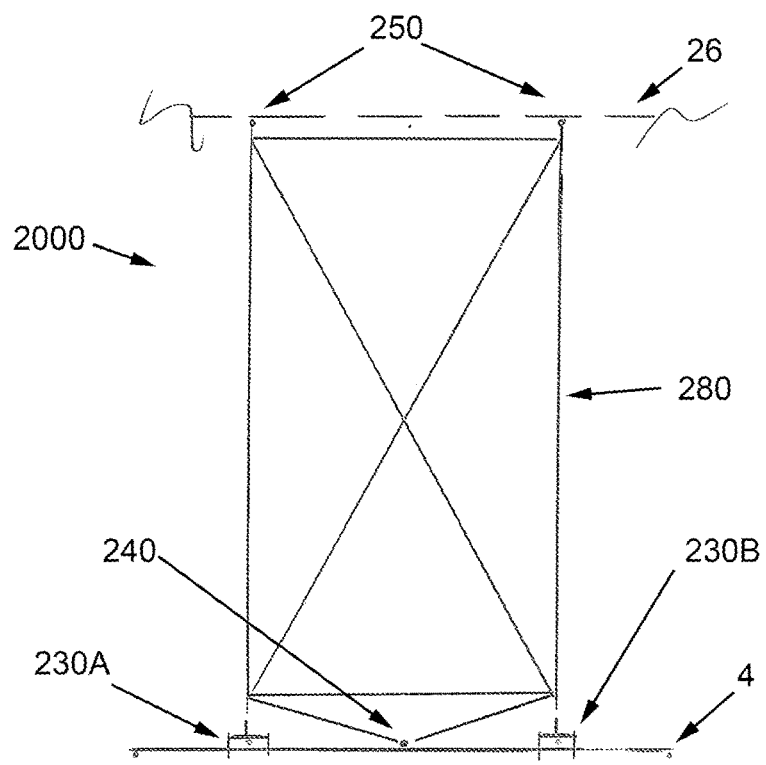
Figure 4A:
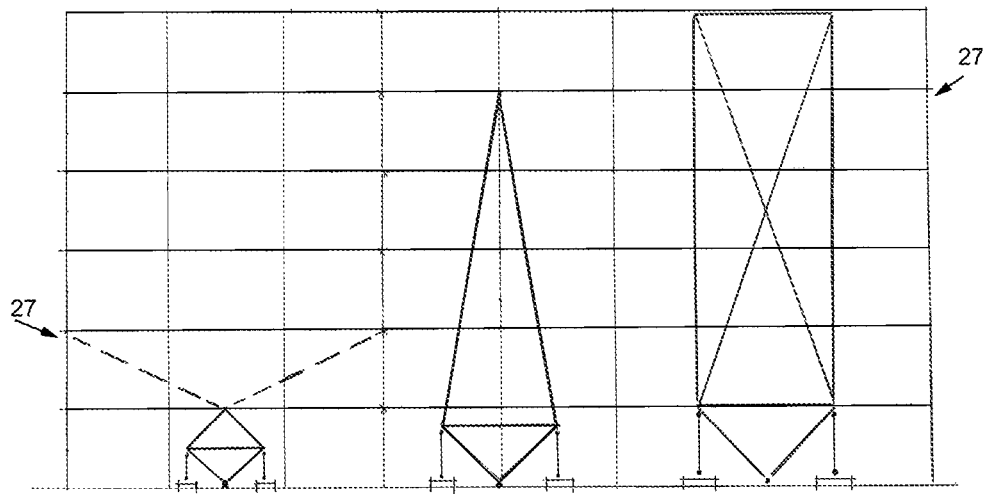
Figure 4B:
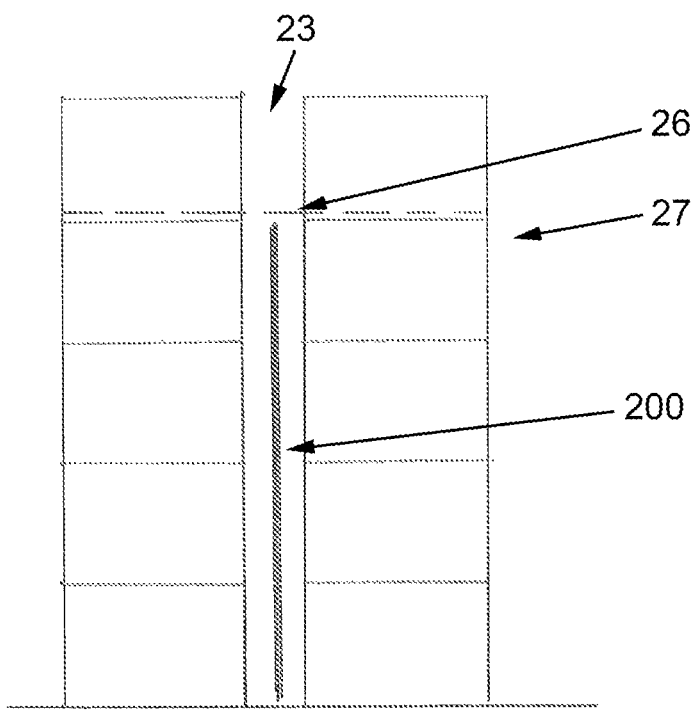
Figure 5A:
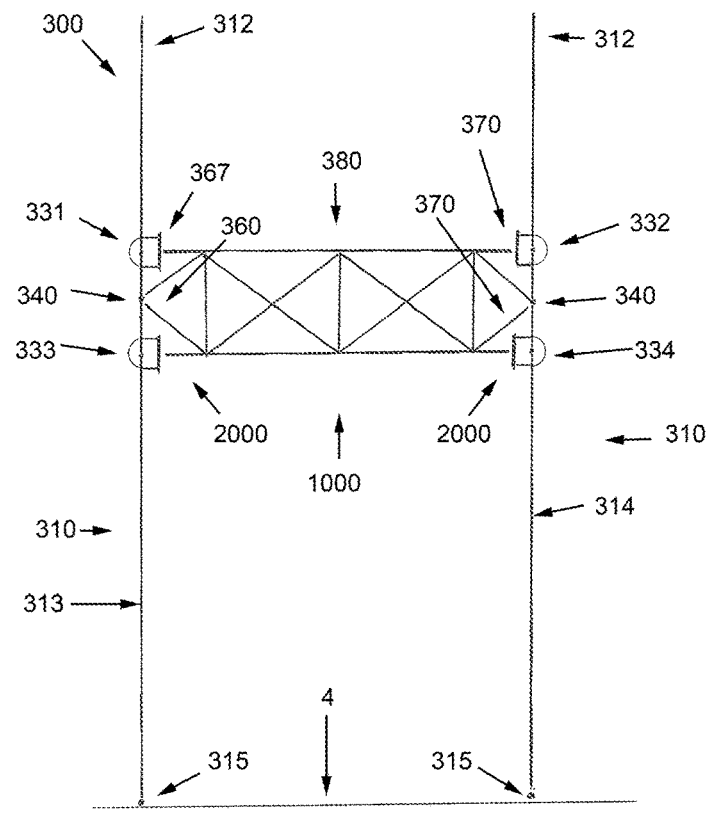
Figure 5B:
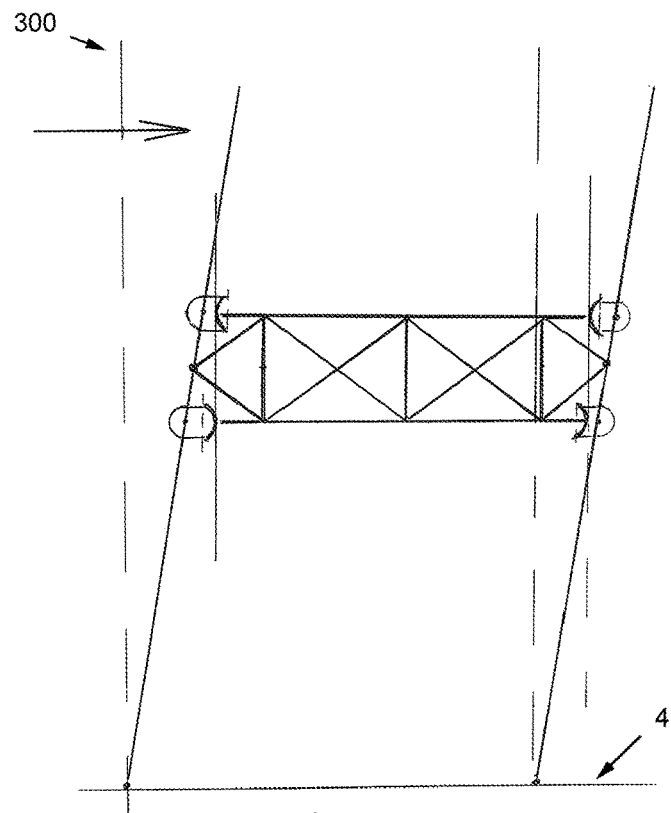
Figure 6A:
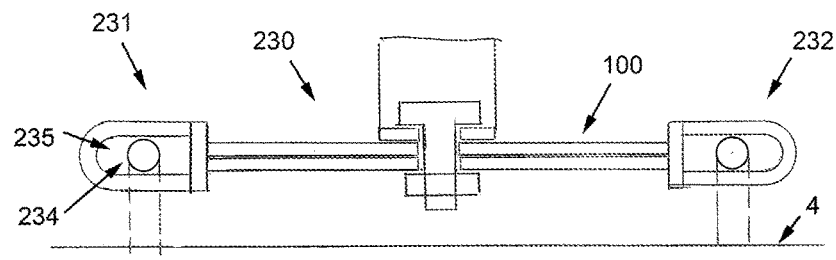
Figure 6B:
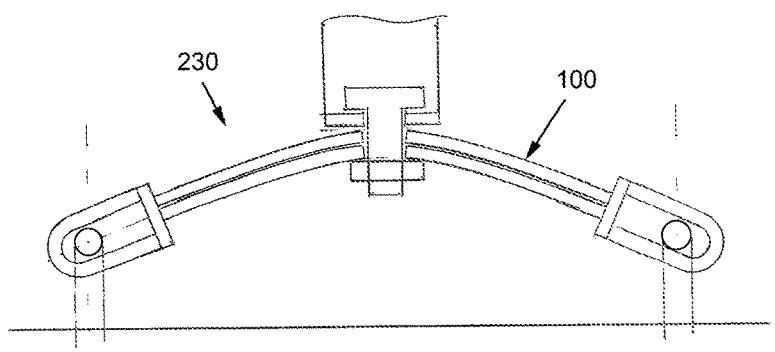
Figure 6C:
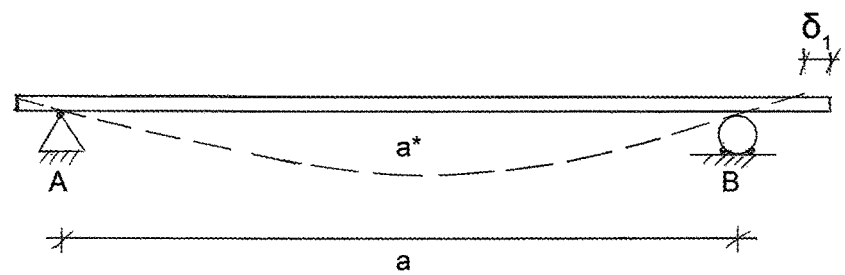
Figures 1, 6C:
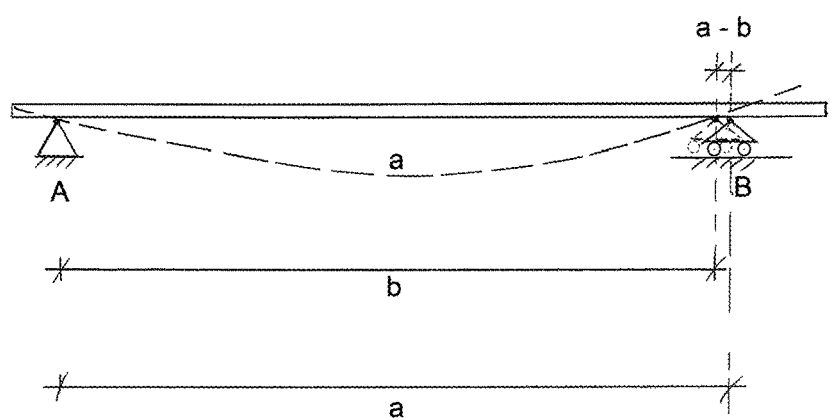
Figure 6D:
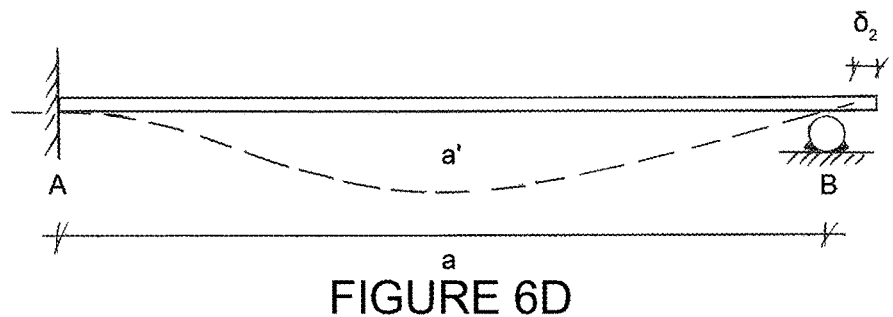
Figures 1, 6D:
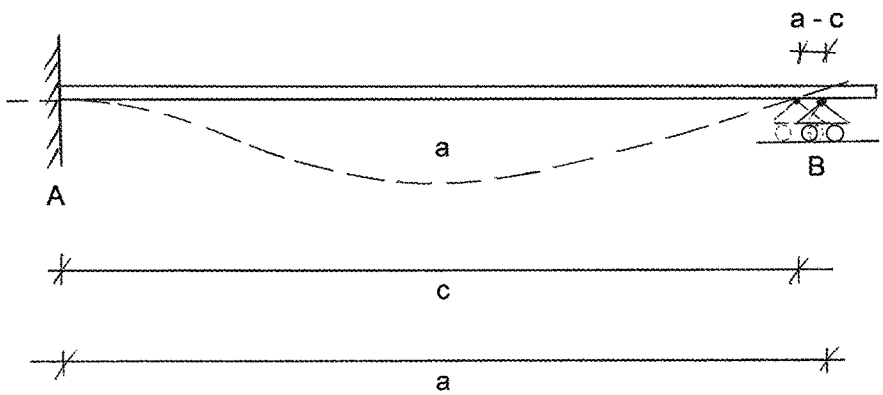

FIG. 11B shows a further embodiment where a top hat joins to energy absorbing structure 1000. The energy absorbing structures 1000 is engaged at their upper and bottom regions so the effects of any lateral movement will be moved through into each yield connectors much like as described in FIG. 5.

An example of an energy absorbing structure 1000 (control structure) in a general building structure form is shown in FIG. 10A where the stiff vertical chords are shown as trusses. A close-up view of the yield connectors 230, having multiple flexure members 100 (plates) joined to a frame 380, and the vertical chord 310 is shown in FIG. 10B. Flexural yielding in the plates is a co-reactive response to axial forces and displacements generated within the double pin links or push rods as the (alphas) control structure sways in response to ground motion input.

Figure 12A:
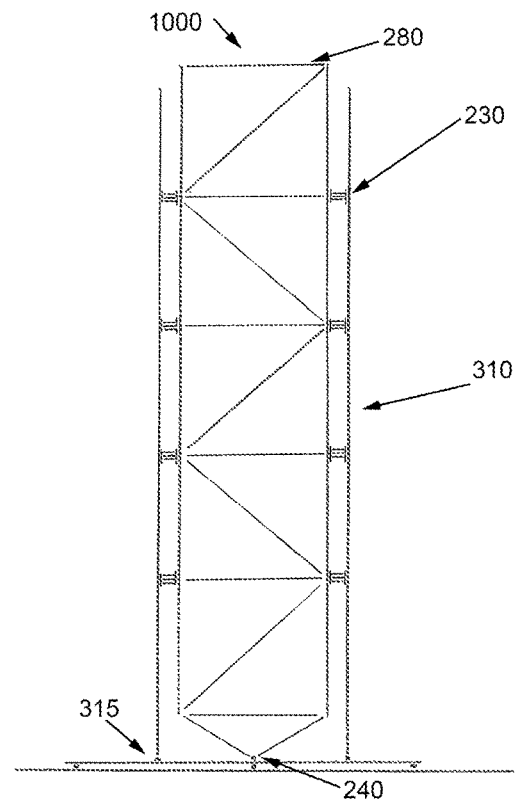
Figure 12B:
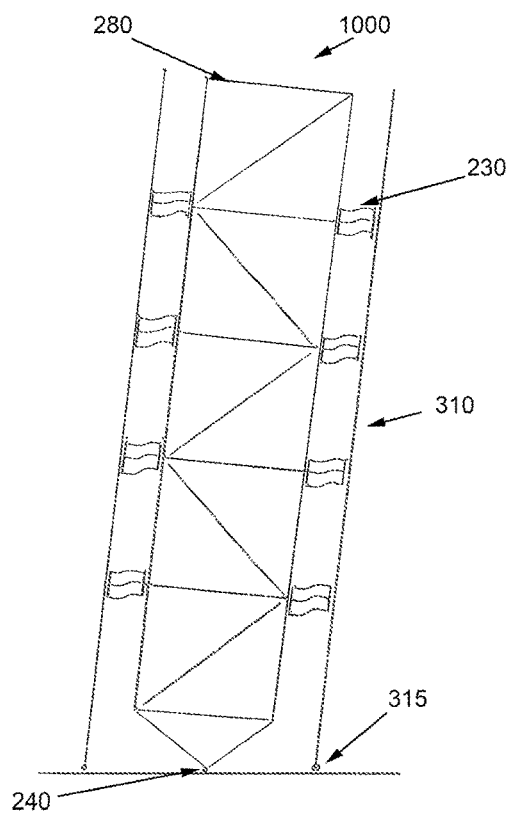
Figure 13A:
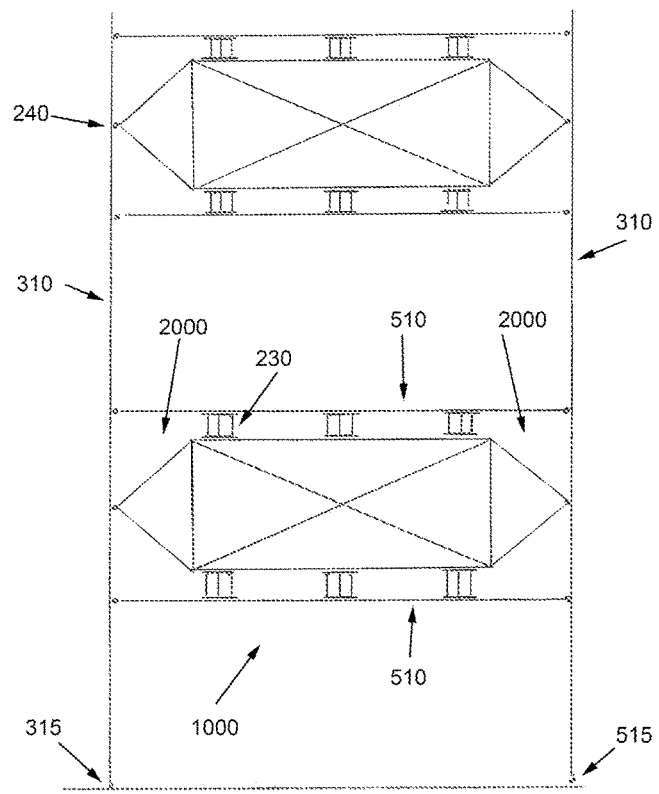
Figure 13B:
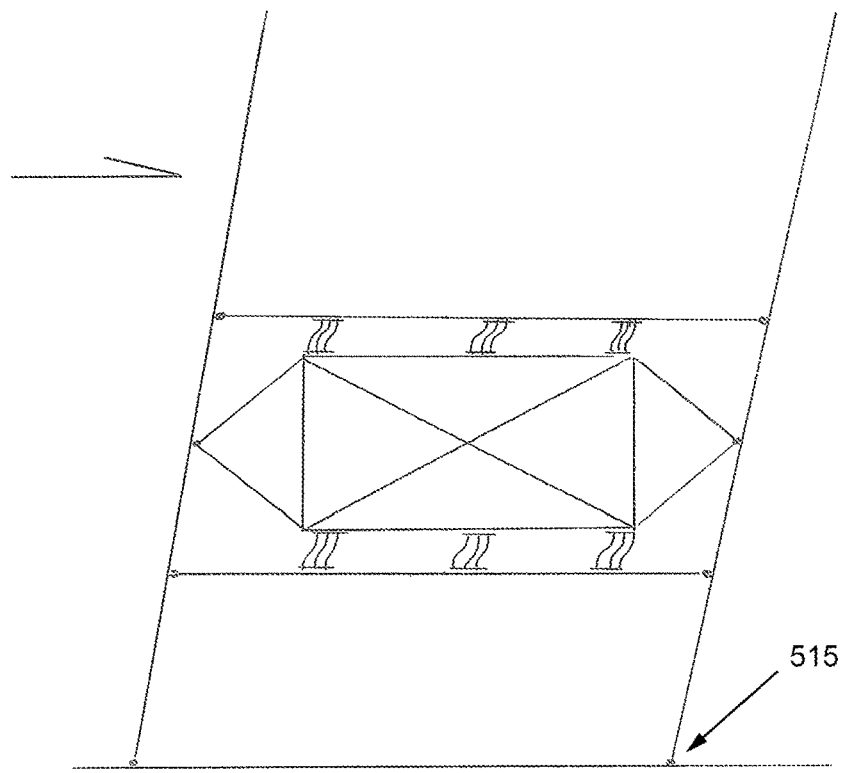

A further embodiment of an energy absorbing system 1000—'shear type' embodiment, with 'shear type' yield connectors 230, is shown in FIGS. 12 and 13.

Here flexural yielding in the plates is a co-reactive response to the inter-lamina shear forces and displacements generated between the exterior chord and interior frame chord as the ($alpha_2$) control structure sways in response to ground motion input.

FIG. 12 shows an energy absorbing system 1000 (control structure), having a frame 280 pivotable about a pivoting anchor 240. The frame 280, and pivot anchor 240 are as described previously. The yield connectors 230 are located on either side of the frame 280. Two stiff vertical chords 310 are located on either side of the frame 280, and are anchored to the foundation (or like, such as a floor or beam) preferably by a vertical chord pivot 315. Intermediate each vertical chord and the frame 280 are one or more yield connectors 430. In this embodiment the yield connectors 230 transfer inter-lamina shear force between the exterior chords 310 and the interior chords of the frame 280. This shear force produces flexing in the plates (flexure member 100). Their flexural yielding absorbs energy and limits forces within the control structure or any adjacent structure it may be seismically supportive of. The control structure produces a shearing motion between the frame 280 and a stiff vertical chord 310 when the system is rocked by an earthquake for example. This embodiment still shares the same concepts as the energy absorbing systems 1000 as previously described—where the rocker 2000, translates lateral movement from the upper region 27 about the pivot anchor 240, to thus influence the yield connectors 230 on each lateral side of the pivot anchor 240.

The vertical chords 310 are preferably either tied at their top or upper region to the same rack 2, or they are not constrained and the frame 280 is constrained to the rack 2 or plan bracing. Alternatively, both the chords and the rocker are directly engaged with the rack 2.

Examples of the shear transfer yield plates are shown in FIGS. 14-17, and described later.

In a further embodiment as shown in FIG. 13, the 'shear type' energy absorbing system 1000 (control structure) may also be utilised in a horizontal configuration. In this embodiment the energy absorbing system 1000 is rotated horizontally. The two pivot 240 rocker 2000 is placed intermediate two stiff horizontal chords 510.

Both the energy absorbing system 1000 and the horizontal chords 510 are retained and engaged intermediate two vertical chords 310 as previously described. In this embodiment, the energy absorbing system 1000 shares the same shear type yield connectors 230 as described earlier. The horizontal chords 510 are pivotally attached at each of their ends to the two spaced apart vertical chords 510.

The relative movement of the vertical chords 310 and the rocker 2000, creates relative movement at the yield connectors 230. This produces flexure and yielding in the yield plates (yield members 100).

Figure 14A:
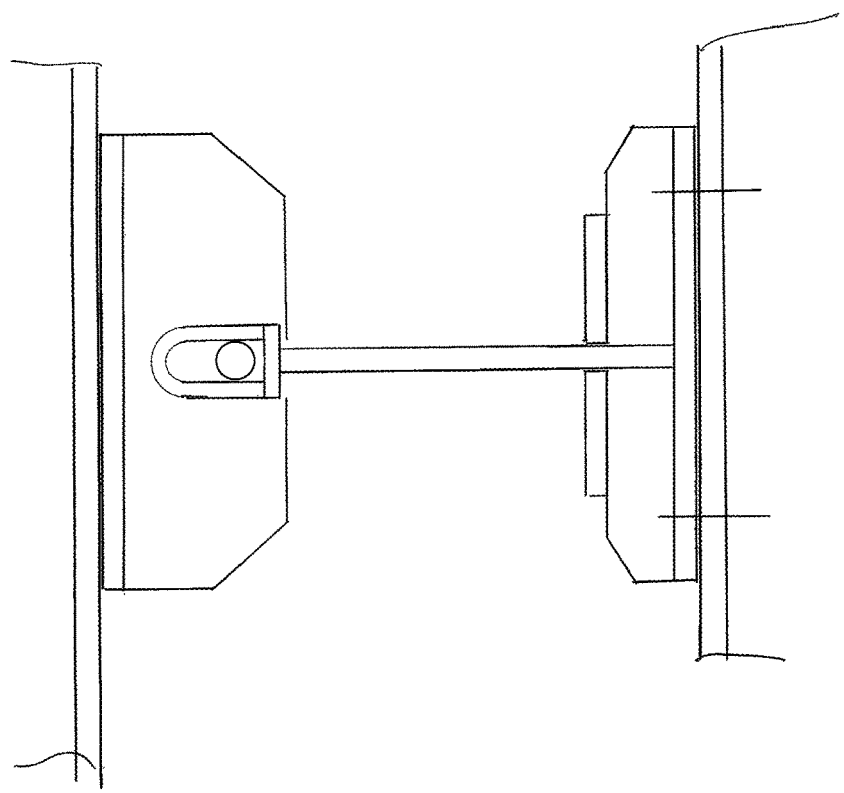
Figure 14B:
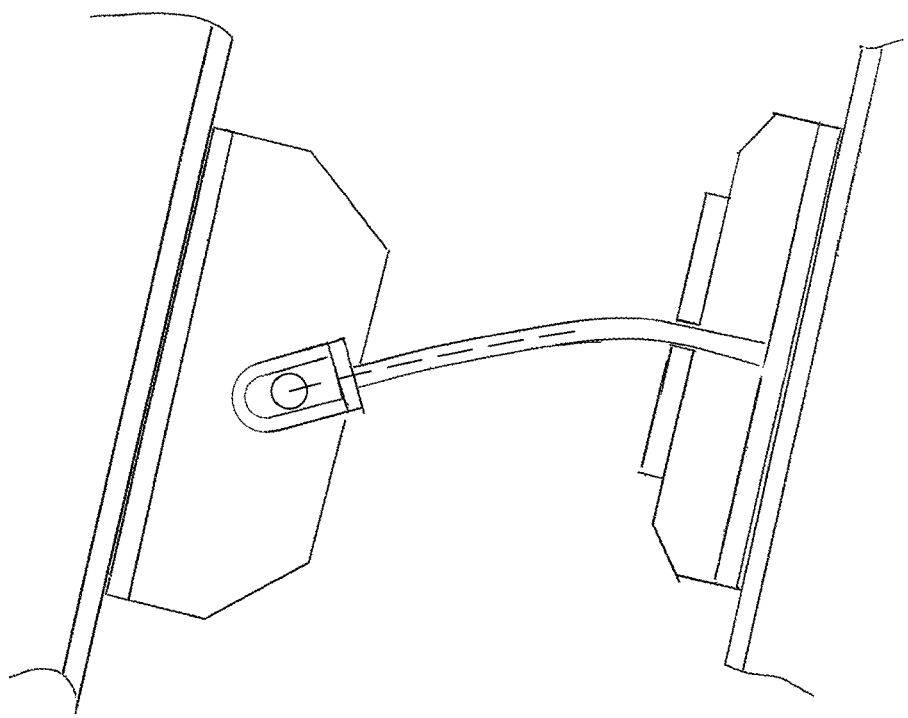
Figures 1, 15A:
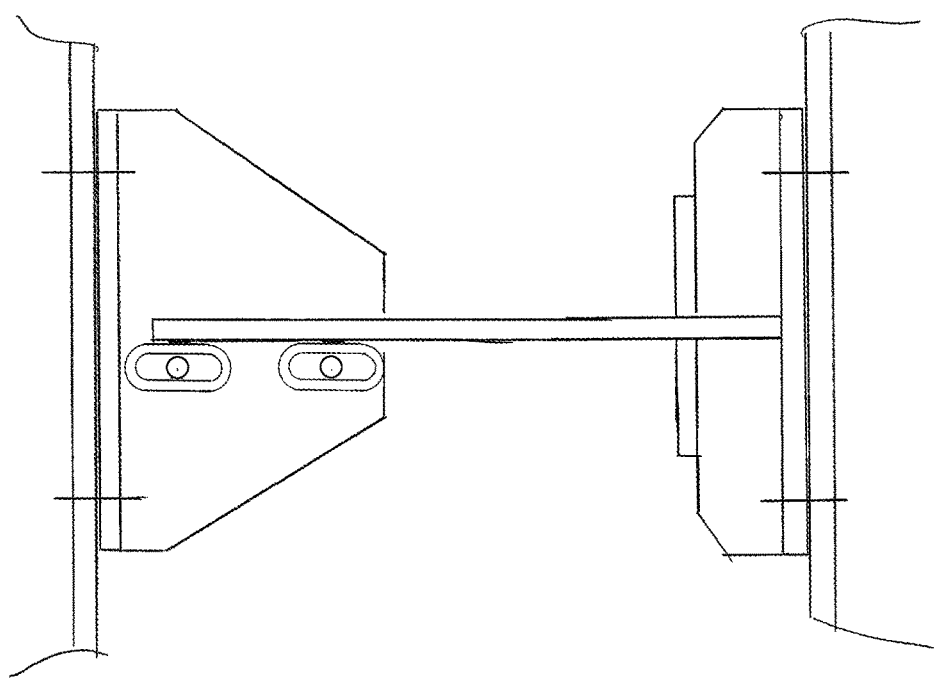
Figures 1, 15B:
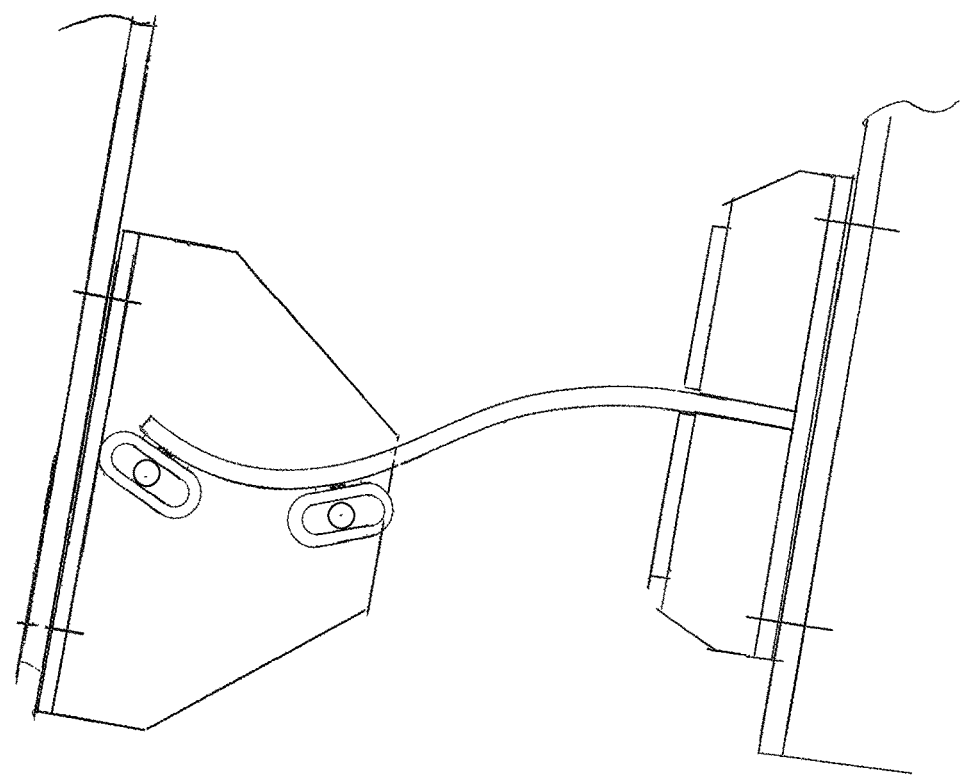
Figure 16A:
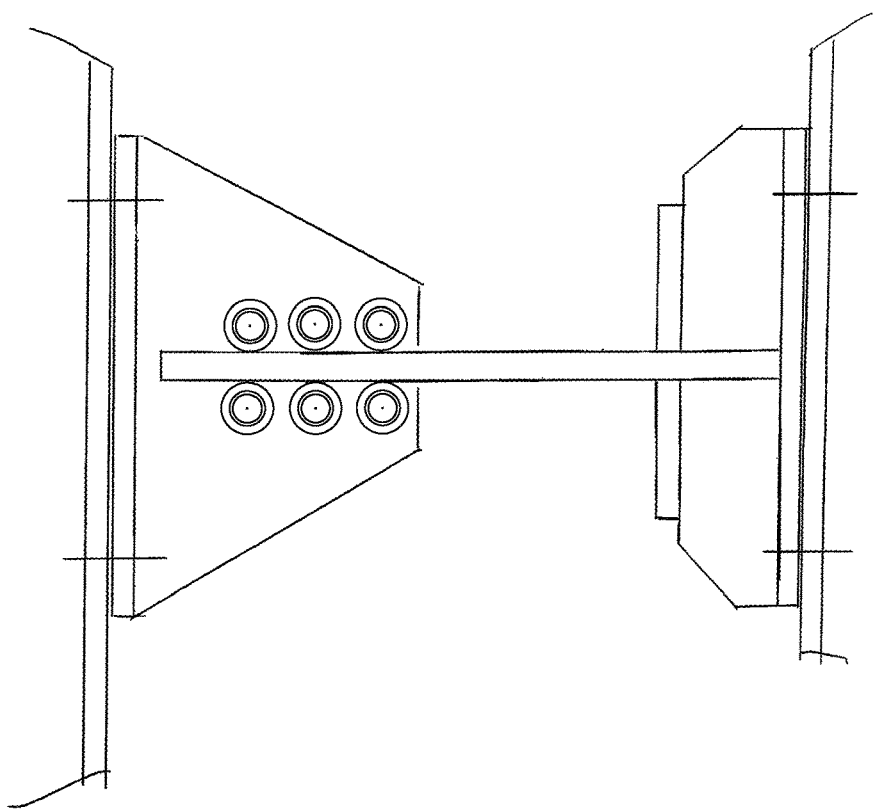
Figure 16B:
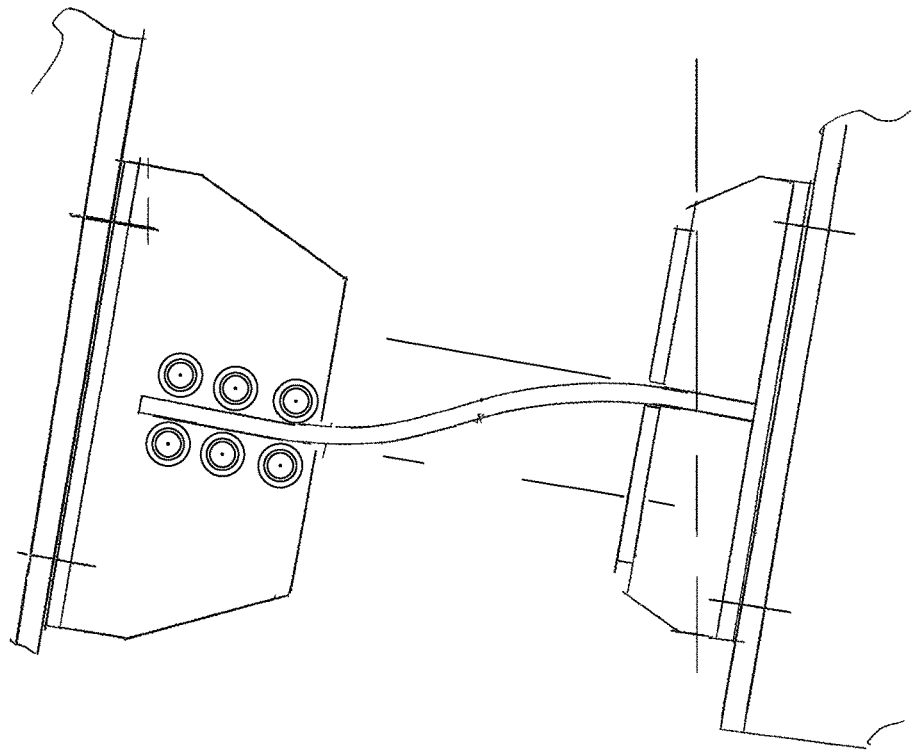
Figure 17:
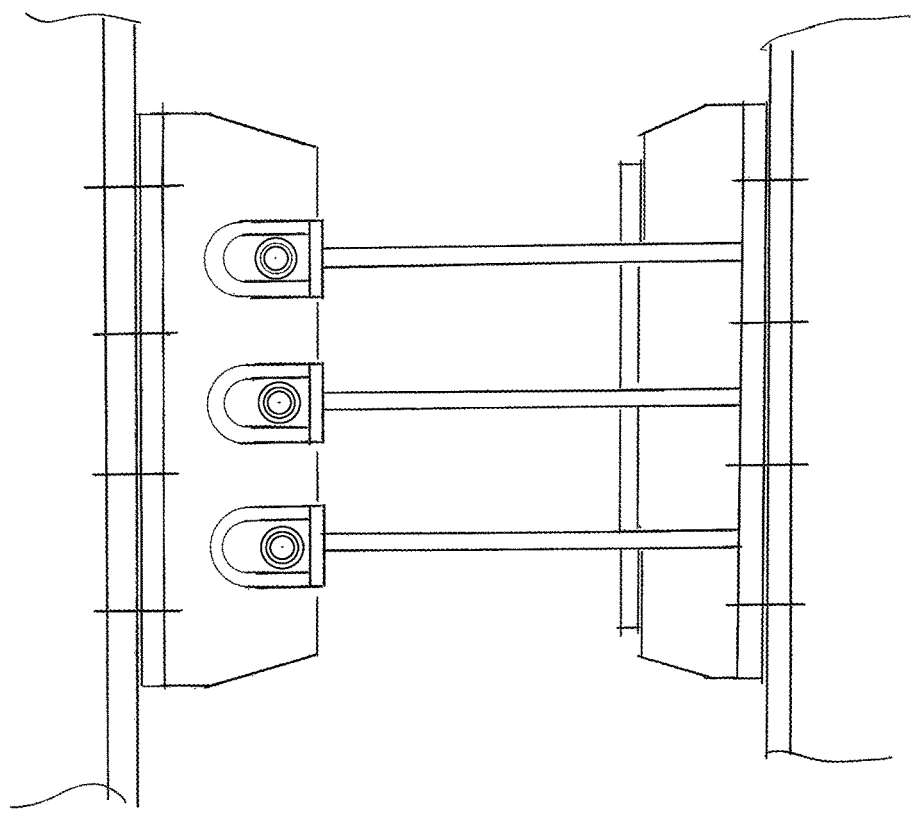

The shear type yield connectors 230 as used in the vertical or horizontal shear embodiment are shown in detail in FIG. 14A—a non-displaced condition, and FIG. 14B—a displaced condition. FIGS. 15 and 16 respectively show the cases of continuous and rotationally restrained lamina shear transfer plates. Non displaced and displaced conditions are shown. FIG. 14 shows a simple embodiment with only one flexure member 100. In other embodiments there are multiple flexure members stacked adjacent one another (FIG. 17).

As stated previously all yield plates within and part of a control structure (designated as delta plates in the figures) are detailed to be free to translate at, at least one end region so as to help avoid self-generate internal membrane forces when flexing to high elasto-plastic displacements.

The flexure member 100 is preferably connected at its end regions 231 and 232. The end regions of each flexure member 100 are connected to, or engage with, a stiffened or reinforced structure of the yield connector. The yield connector 230 is engaged intermediate or is integral with
a) the vertical chord 310 and rocker 2000, in the vertical embodiment, or
b) the horizontal chord 510 and rocker 2000, in the horizontal embodiment.

In one embodiment as shown in FIG. 14, each end region of the flexure member 100 has different engagement types. As shown in FIG. 14, one end region 232 of the flexure member 100 has a rigidly fixed connection which is rigidly constrained to the interior chord of the frame 280. The opposite end region 231 of the flexure member 100 has a sliding and pivoting engagement with the yield connector and respective structure. The sliding engagement helps prevents the flexure member 100 (plates) from developing direct tensile or compressive membrane forces within itself.

Figure 18A:
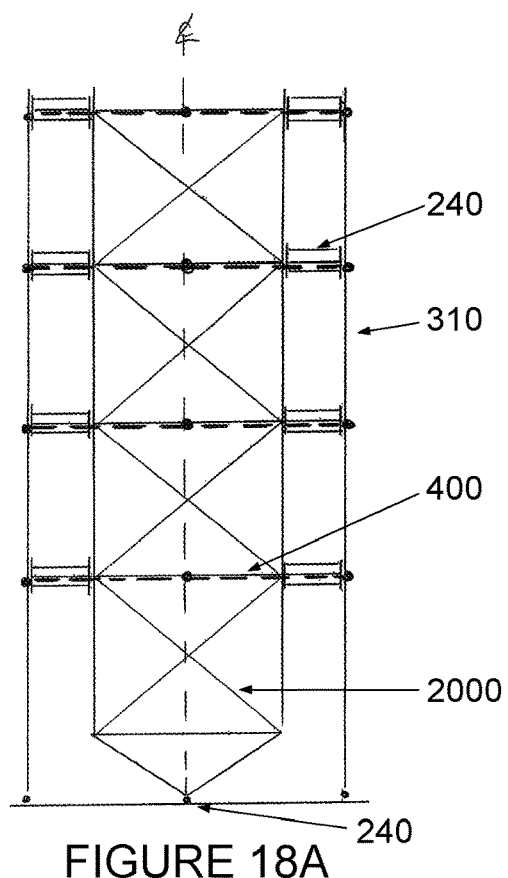
Figure 18B:
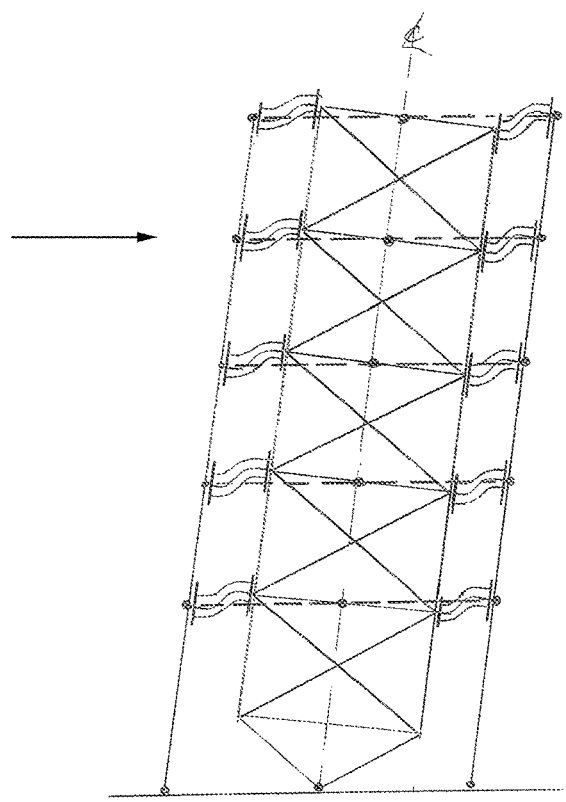
Figure 18C:
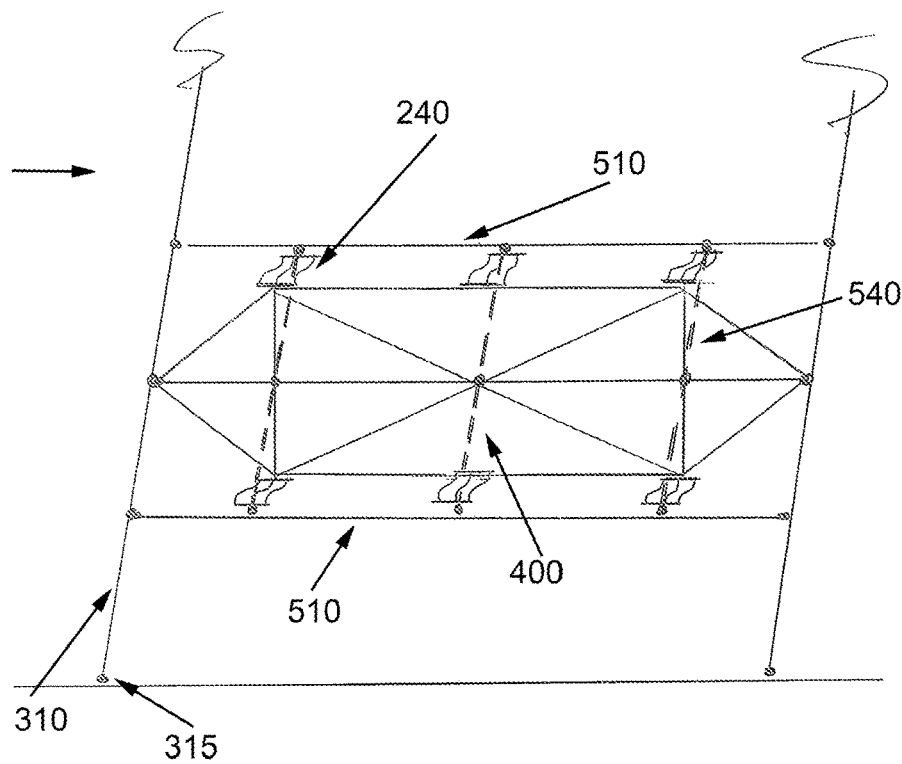
Figure 19A:
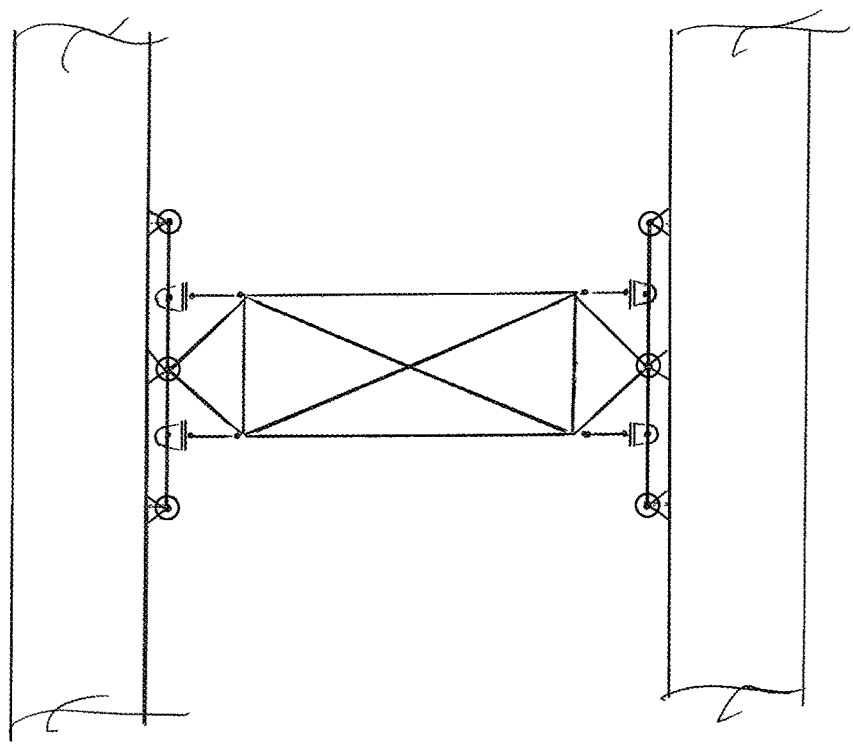
Figure 19B:
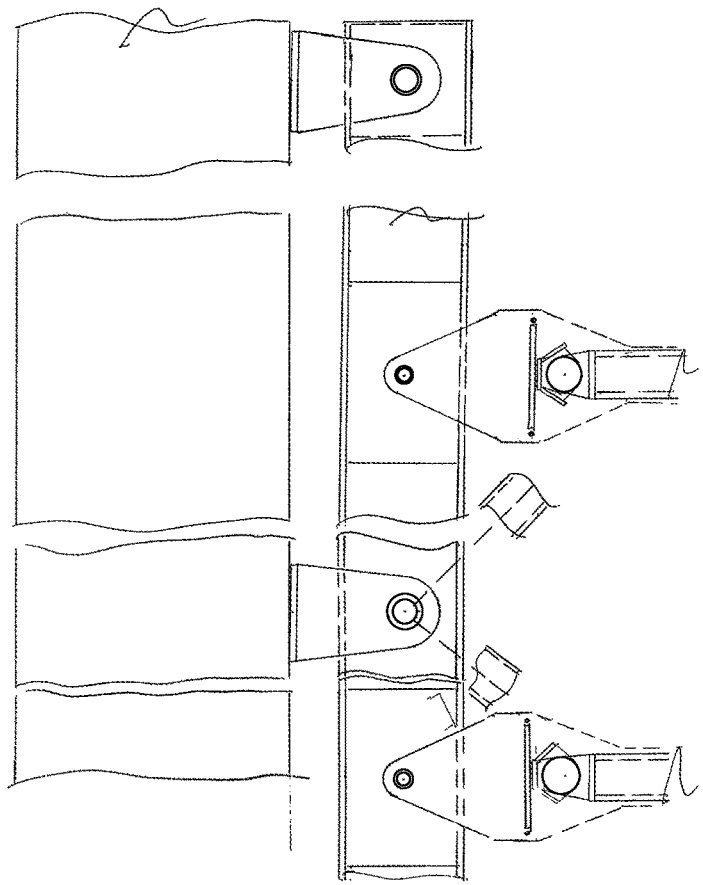
Figure 19C:
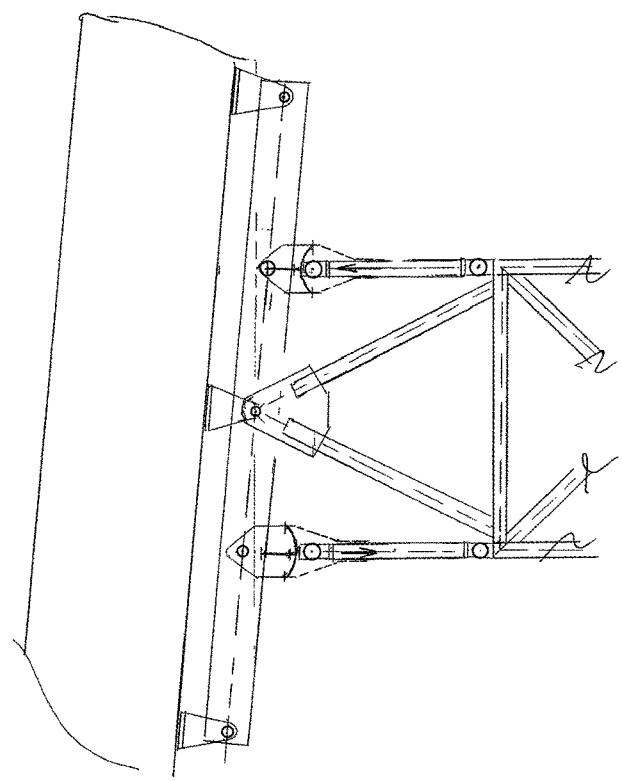
Figure 19D:
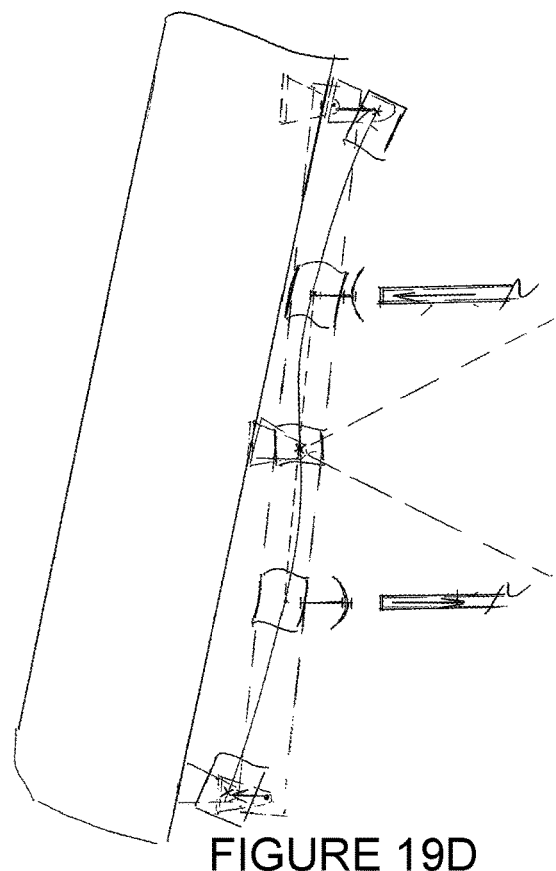
Figure 19E:
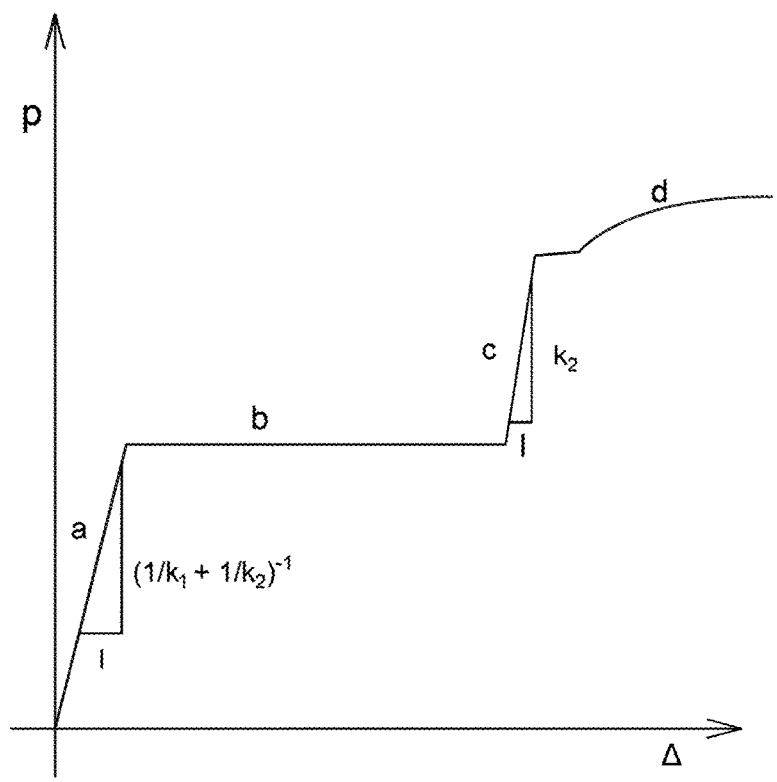
Figure 19F:
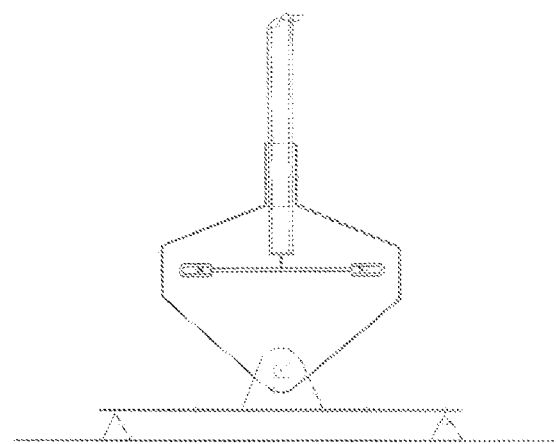
Figure 20A:
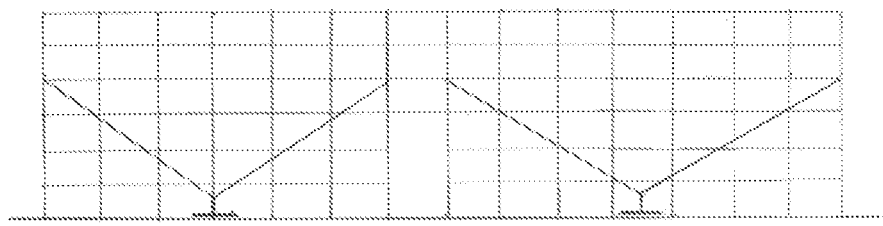
Figure 20B:

Because the flexure member 100 is not translationally connected to the respective structure (i.e. it can slide relative to), the entire system must be tied together. For this reason, rigid but end pin connected ties 400 should be utilised to connect the vertical chords 310 to the rocker 2000. The ties 400 are preferably pin connected to the centrelines of the exterior chords 310 and the centreline of the frame 1000. The ties 400 are seen in FIGS. 18A and 18B, a non-displaced and displaced condition respectively. FIG. 18C shows the ties in a displaced condition for the horizontally orientated system.

The flexure members 100 herein described are force limiting and energy dissipating structural plates which transfer inter-lamina shear forces from exterior chord to interior chord of rocker frame through minor axis flexure and shear, and dissipate energy by minor axis flexural yielding.

Figure 24A:
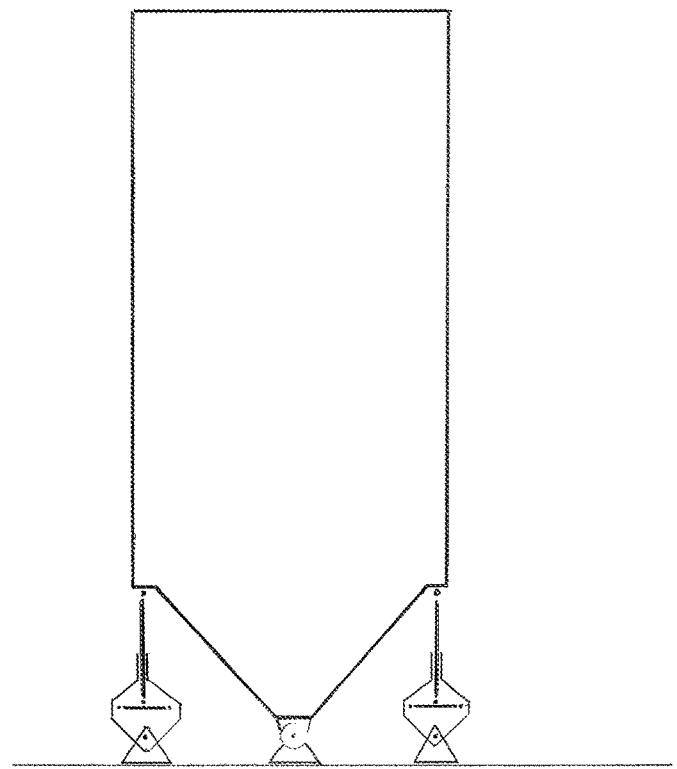
Figure 24B:
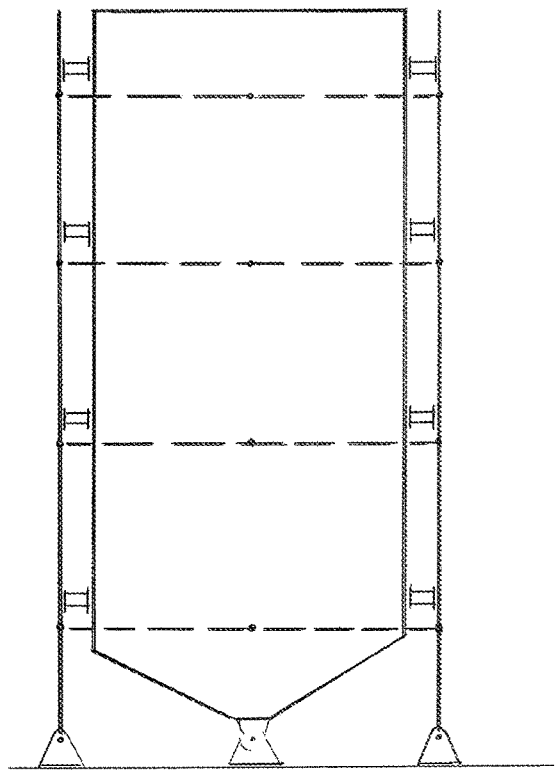
Figure 25:
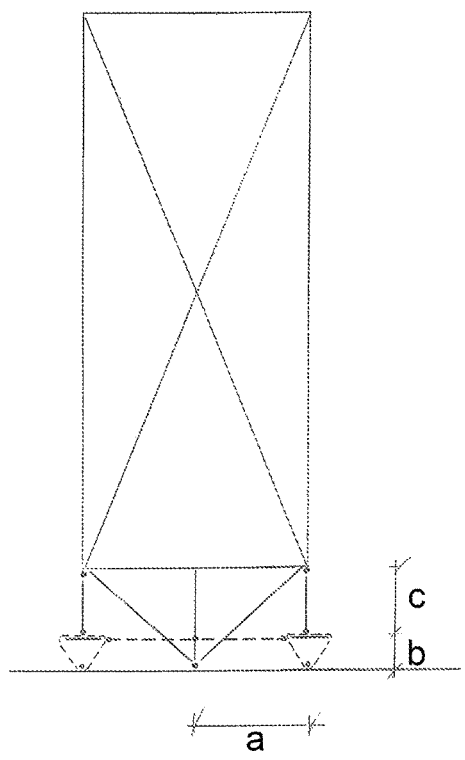
Figure 26:
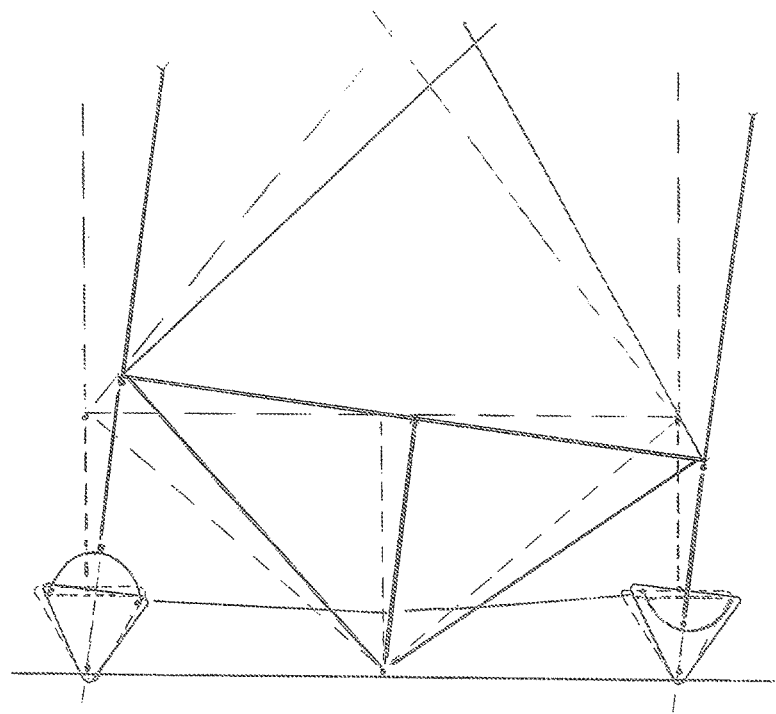
Figure 27:
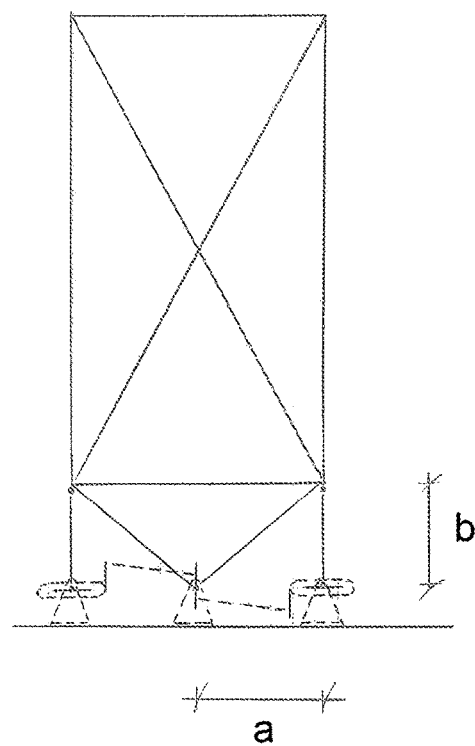
Figure 28:
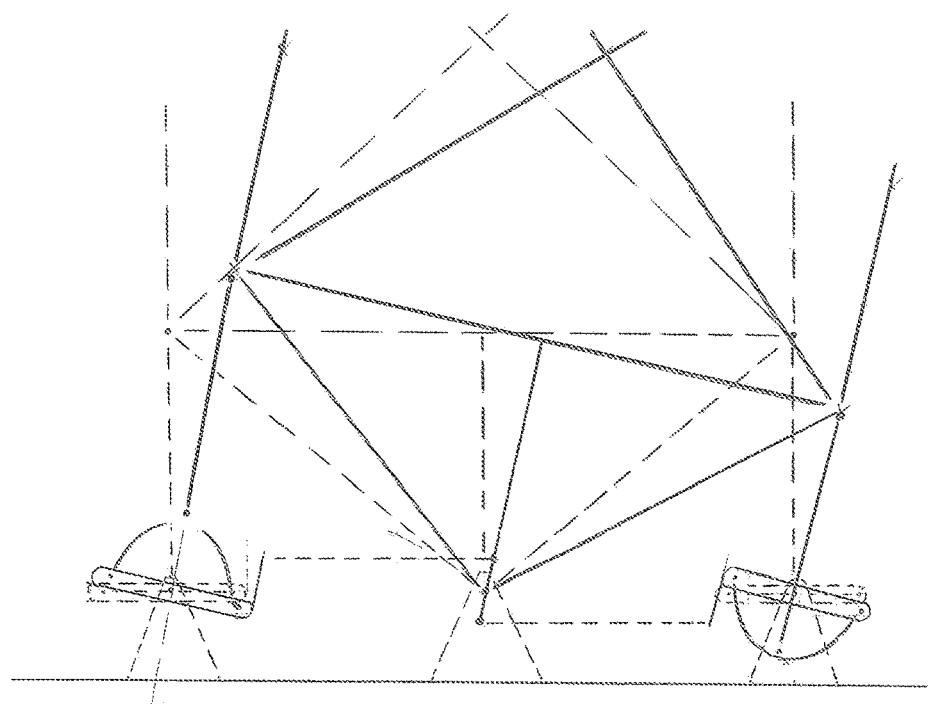
Figure 29:
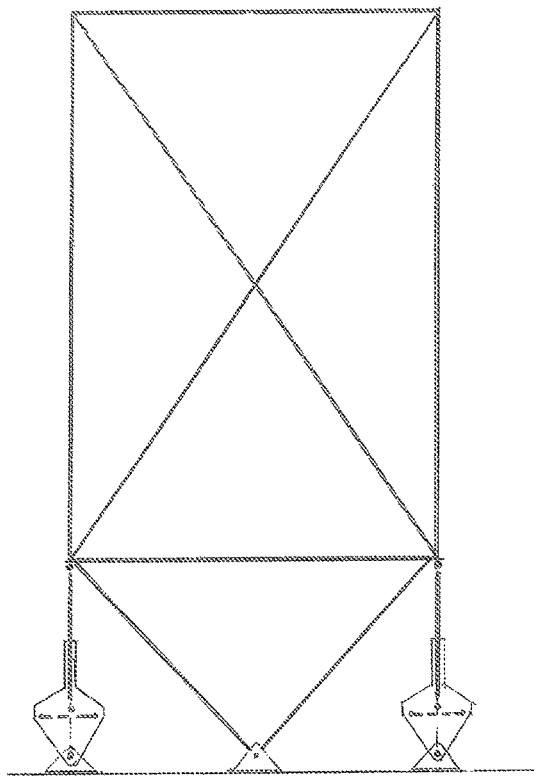
Figure 30:
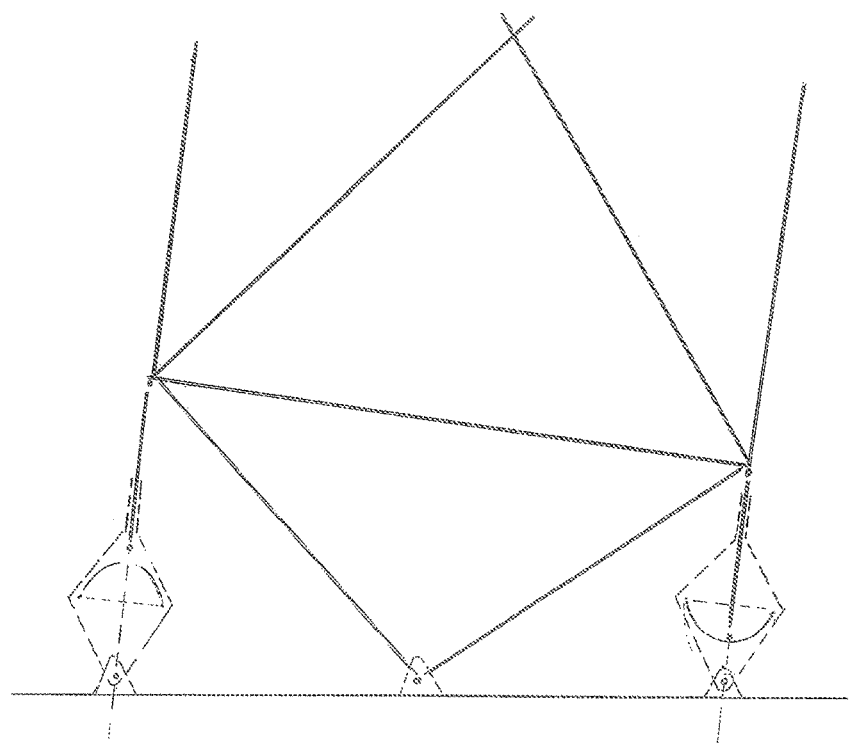
Figure 31:
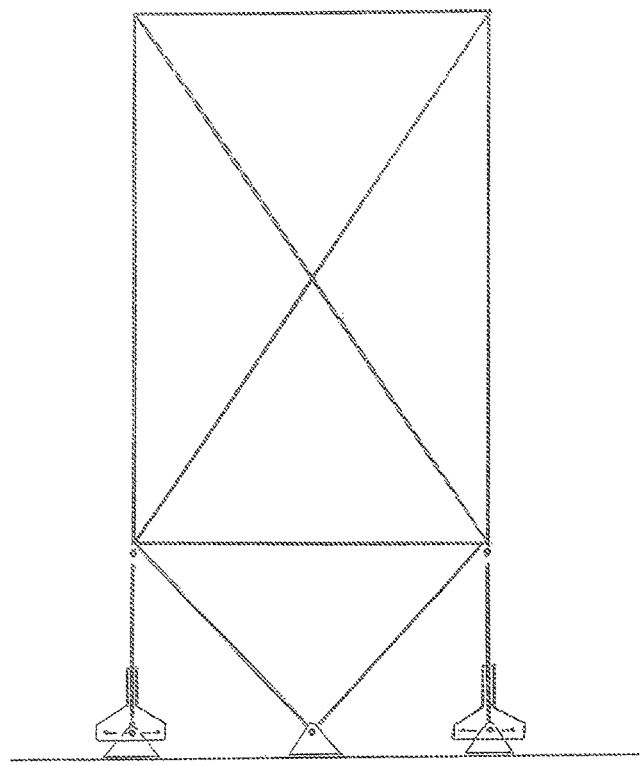
Figure 32:
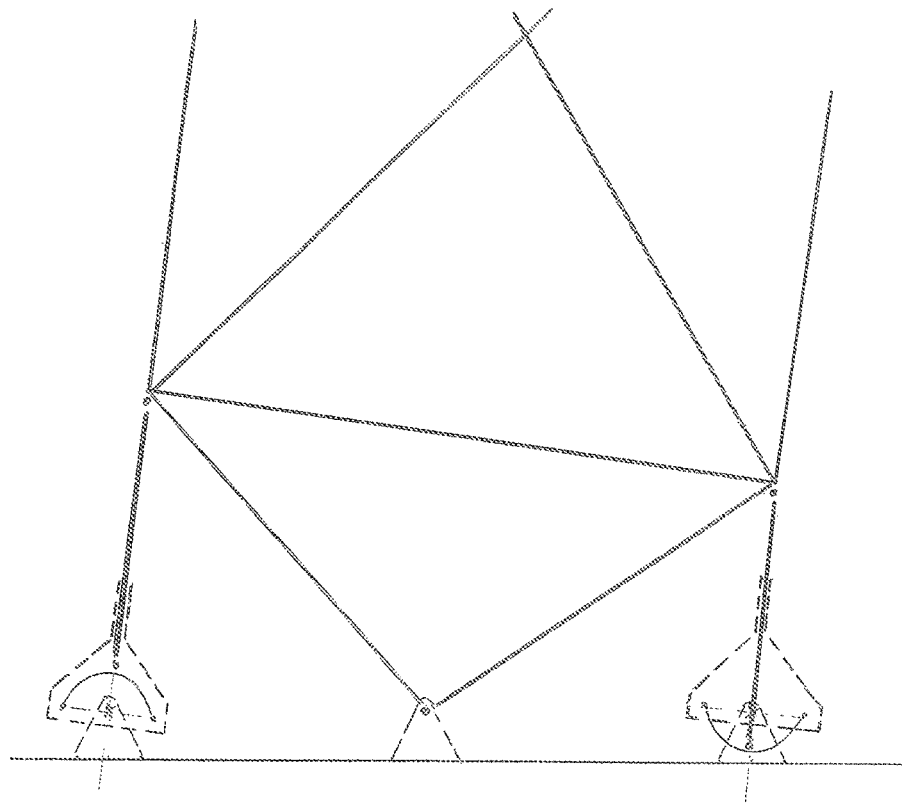
Figure 33:
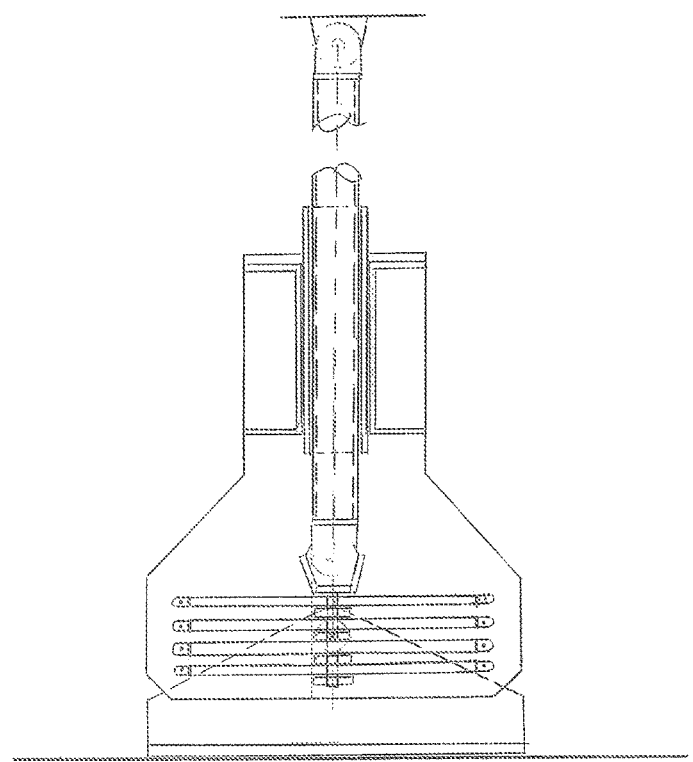
Figure 34:
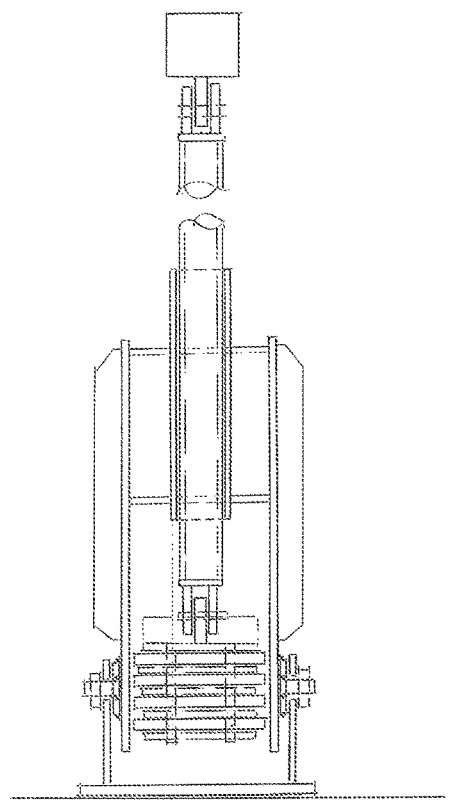
Figure 35:
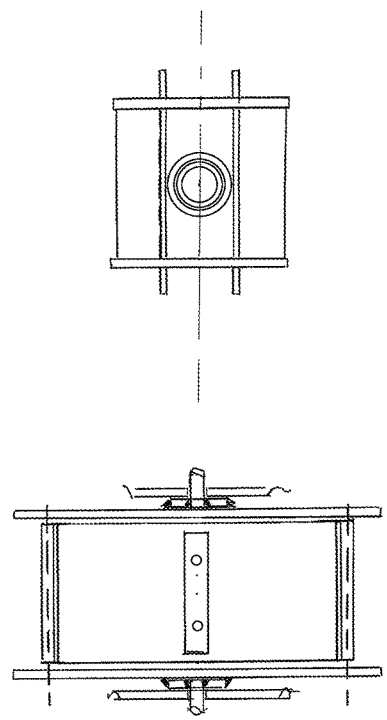
Figure 36:
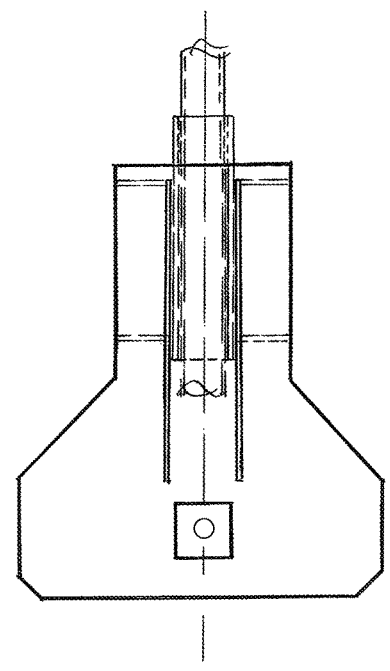
Figure 37:
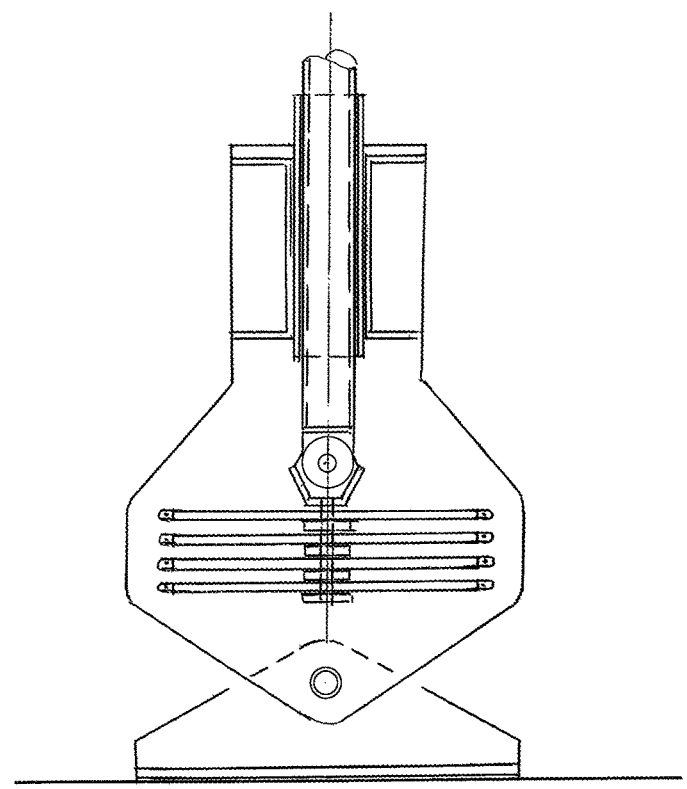
Figure 38:
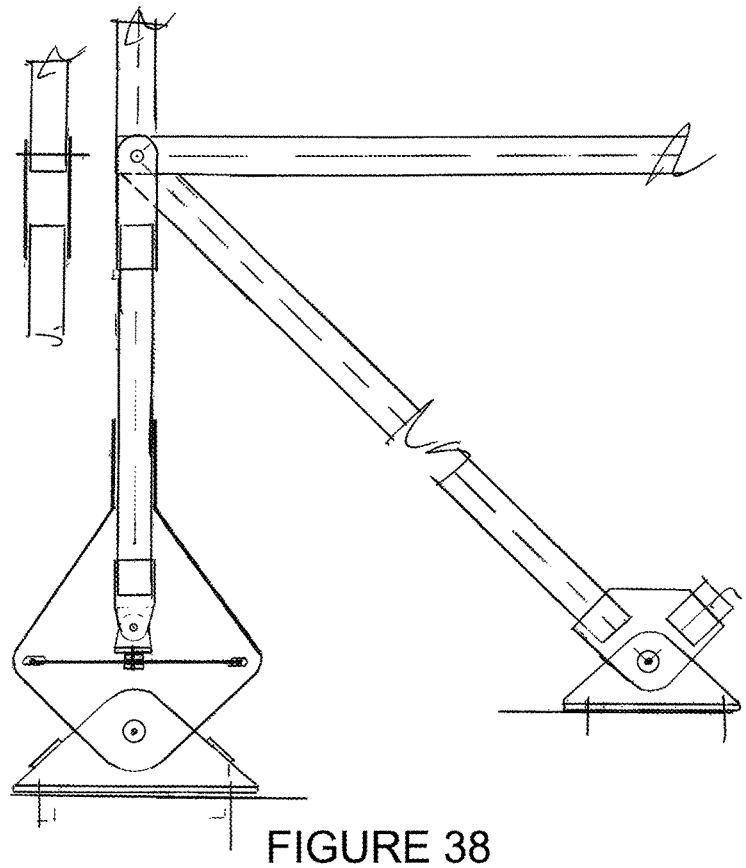
Figure 39:
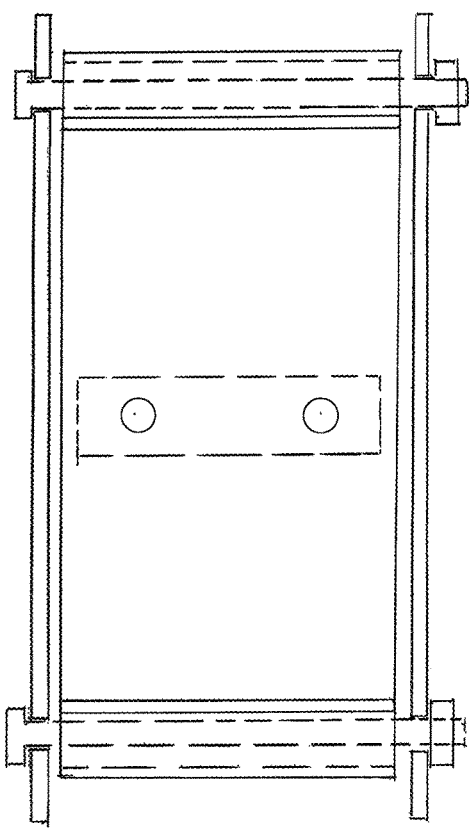
Figure 40:
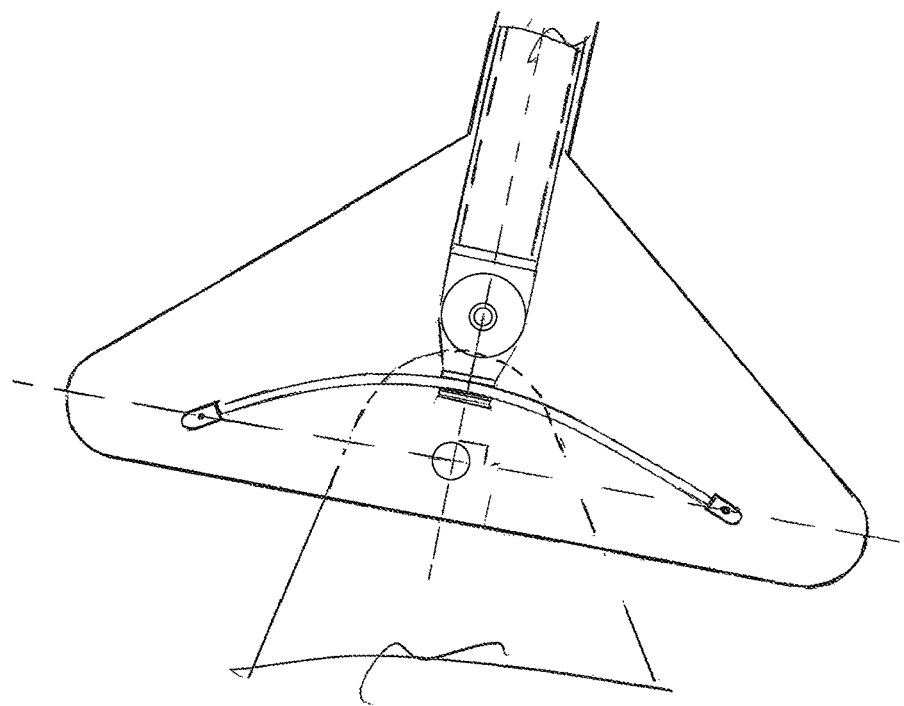
Figure 41:
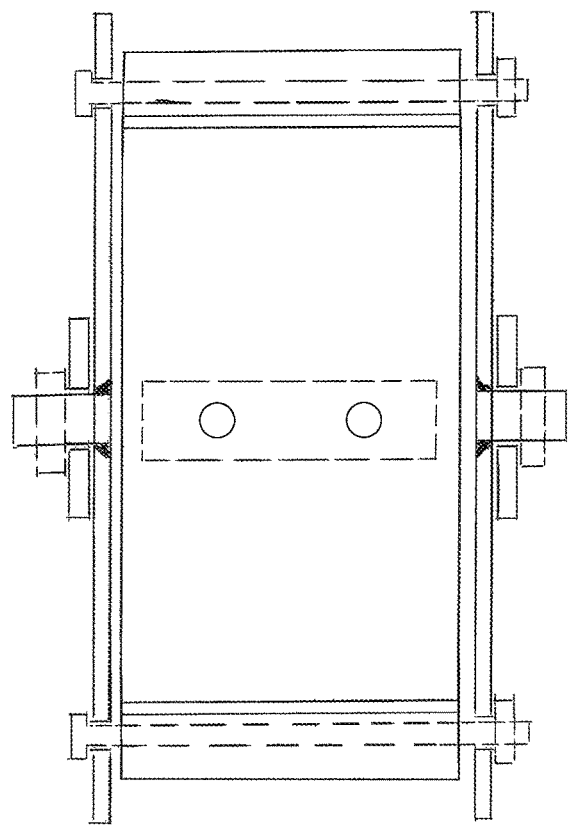
Figure 42:
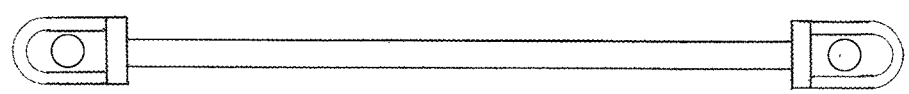
Figure 42:
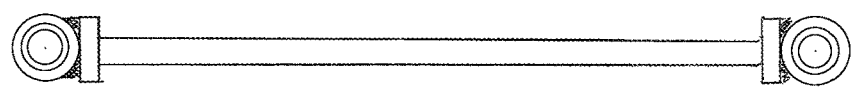
Figure 43:
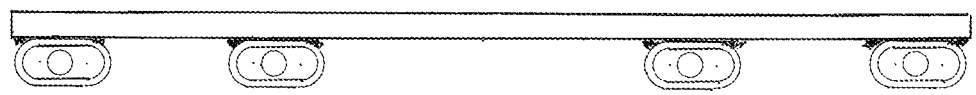
Figure 43:
Figure 44:
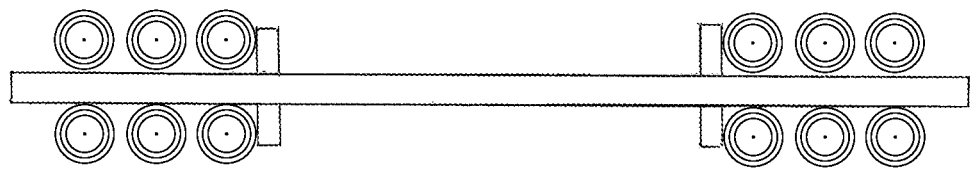
Figure 45:
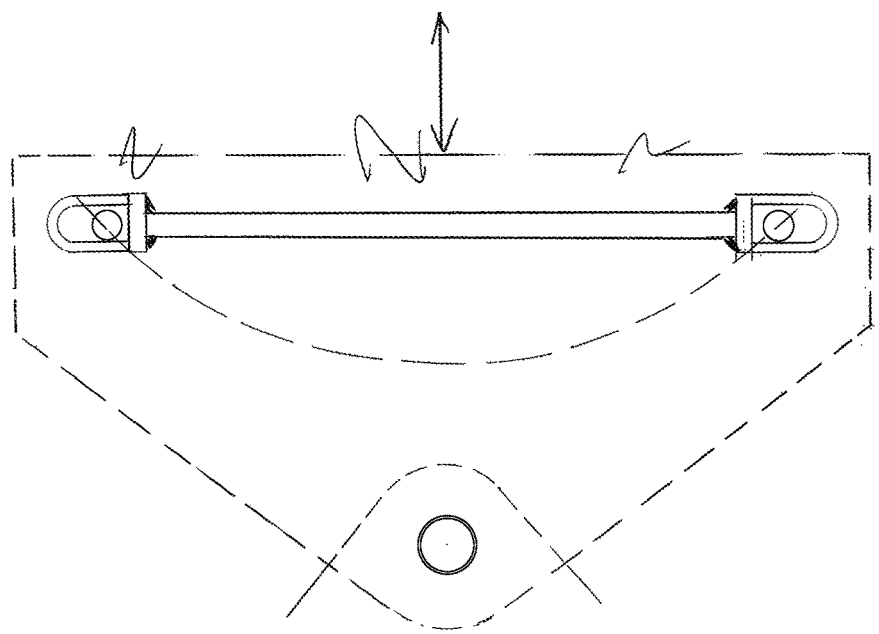
Figure 46:
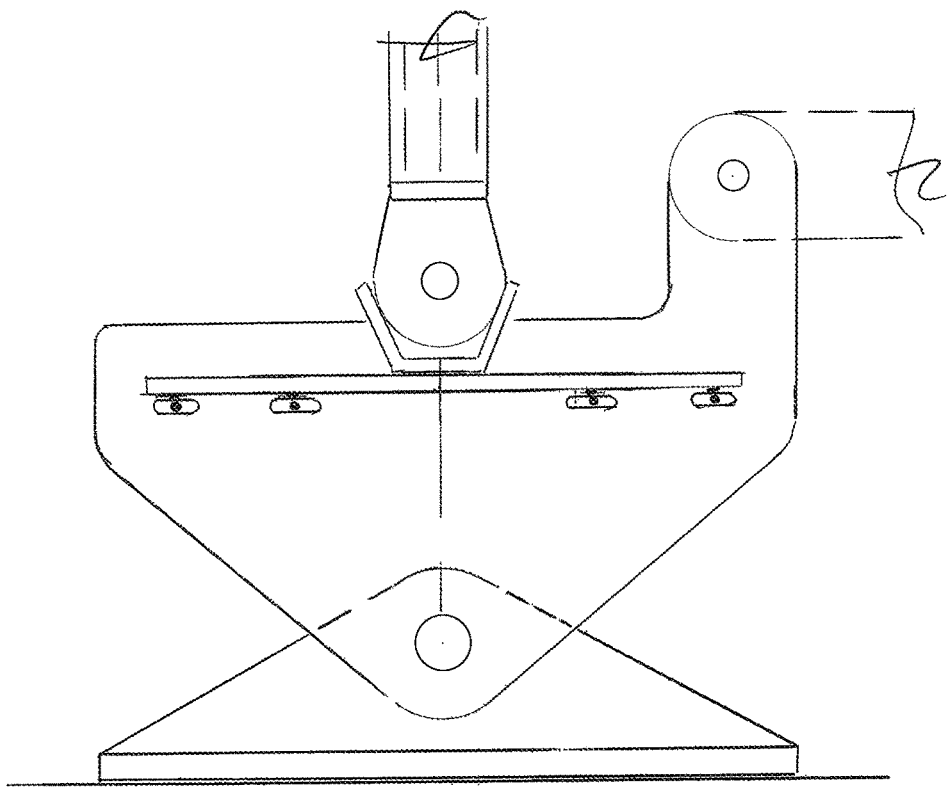
Figure 47:
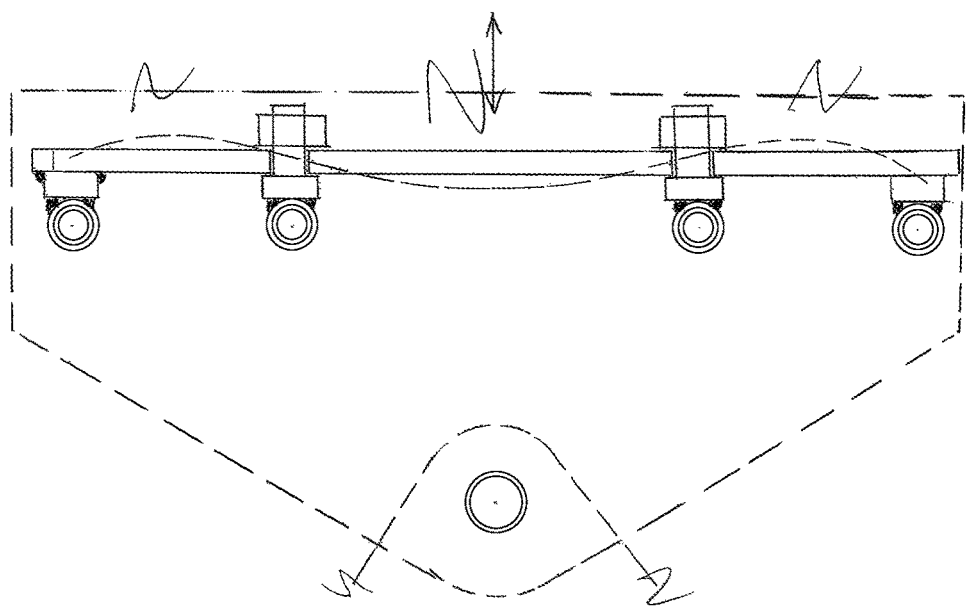
Figure 48:
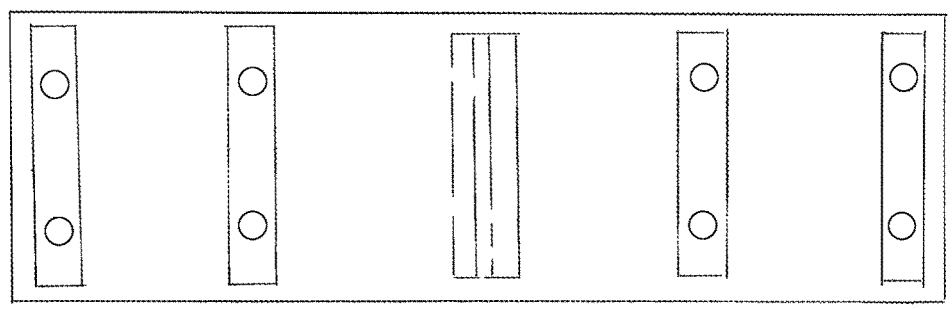
Figure 49:
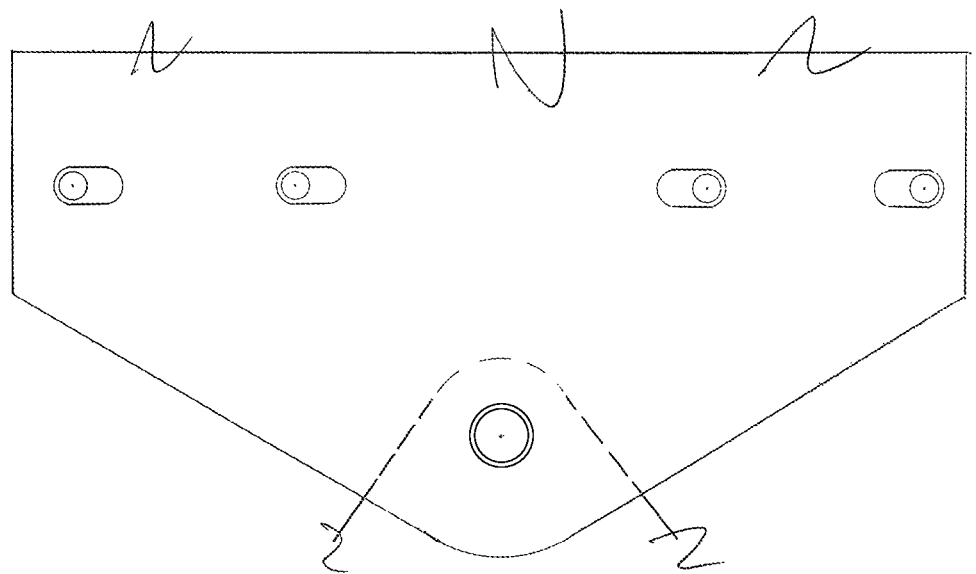
Figure 50:
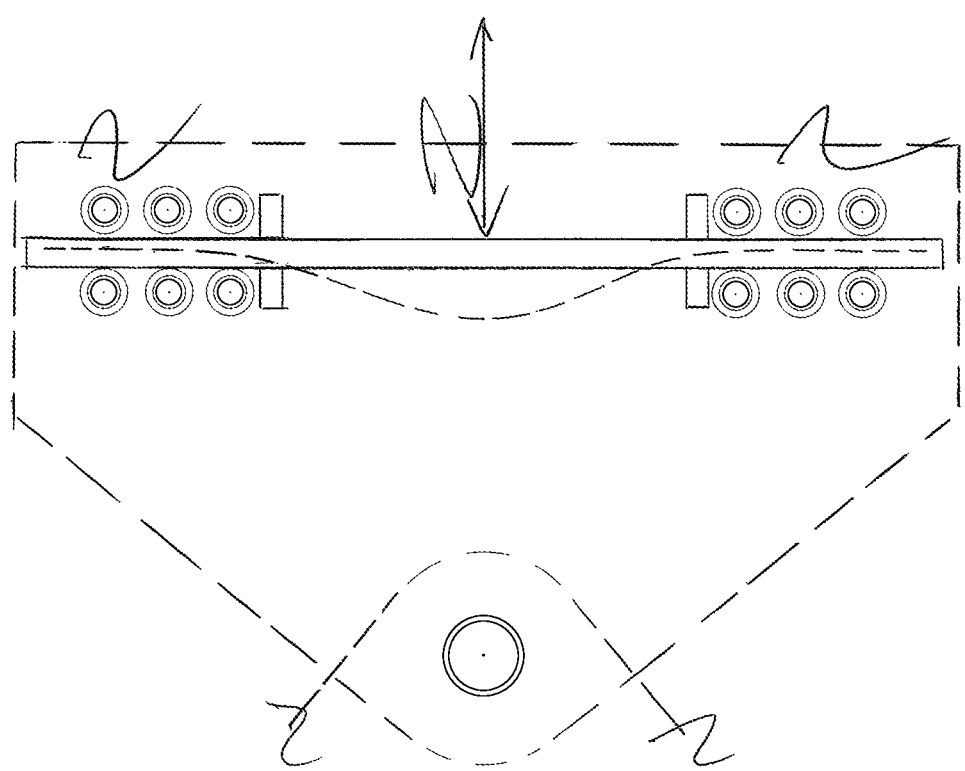
Figure 51:
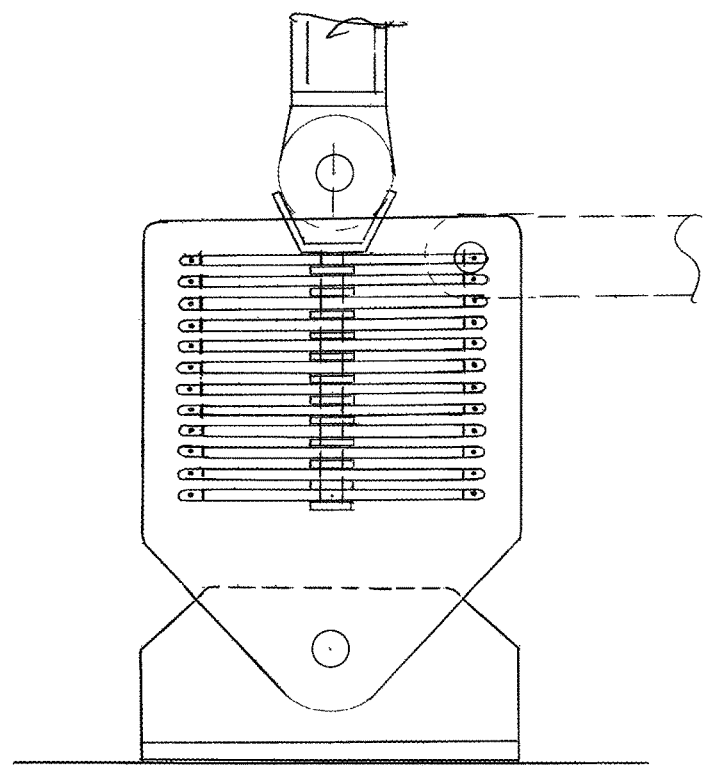
Figure 52:
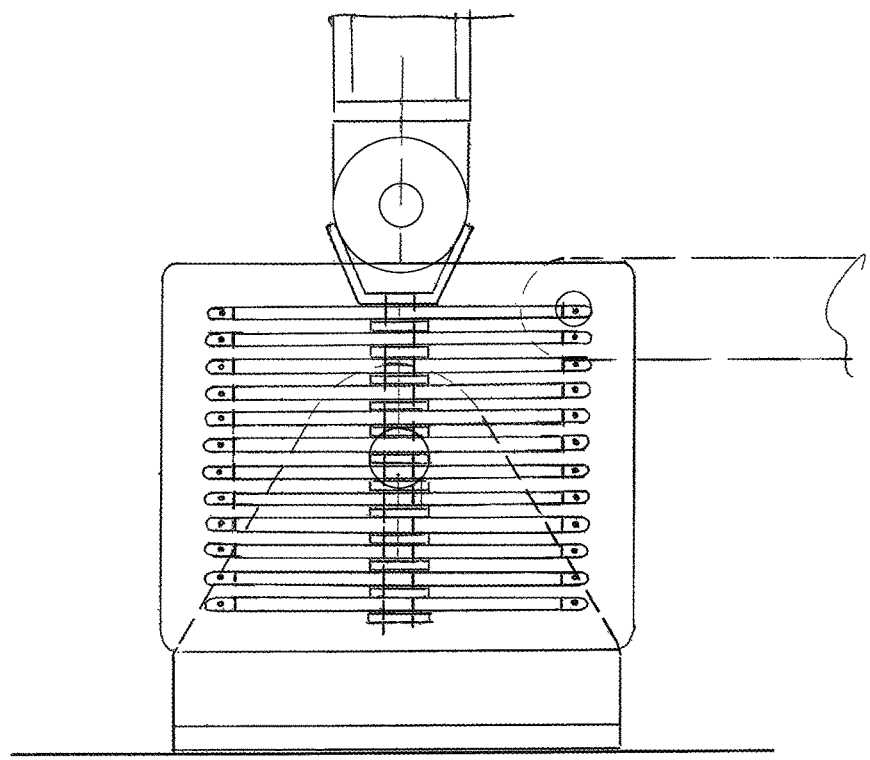
Figure 53:
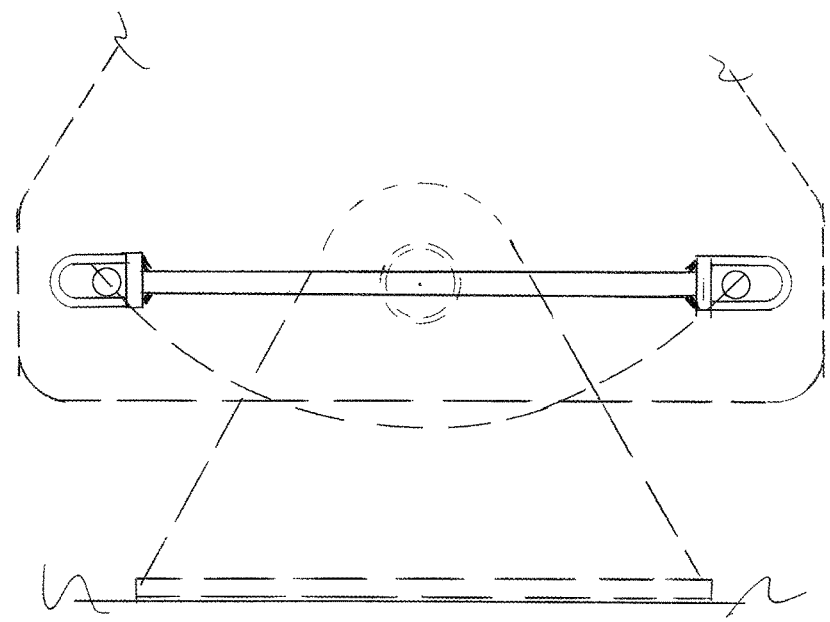
Figure 54:
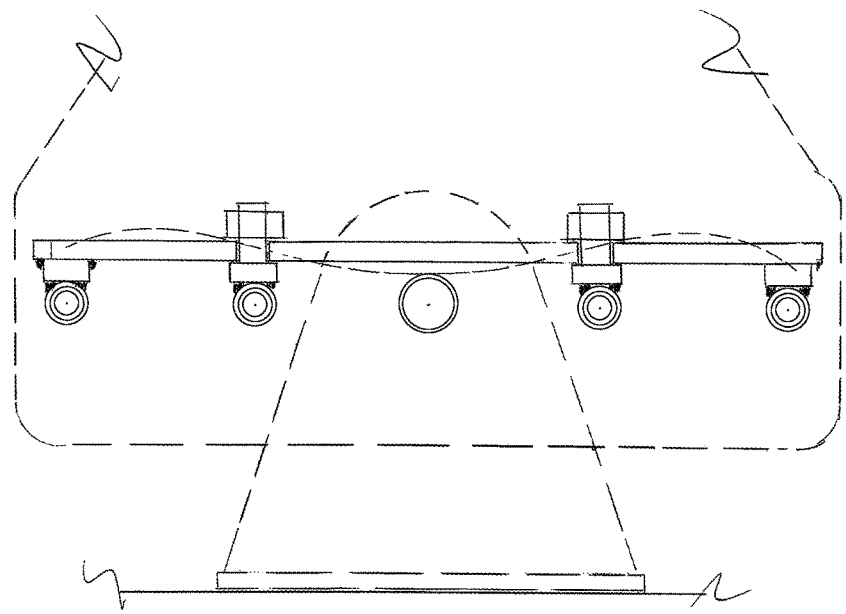
Figure 54A:
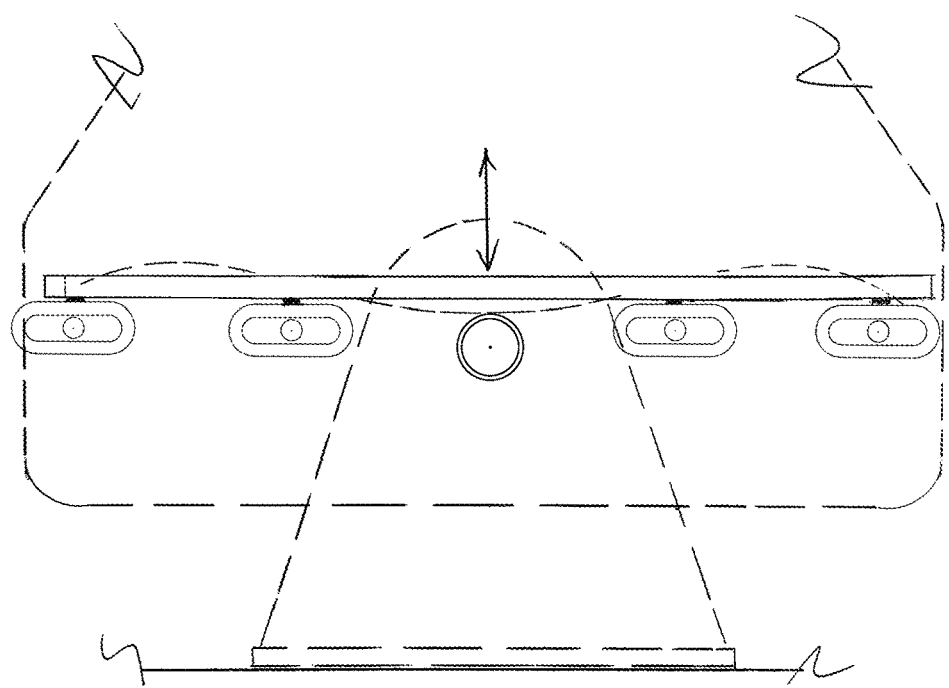
Figure 55:
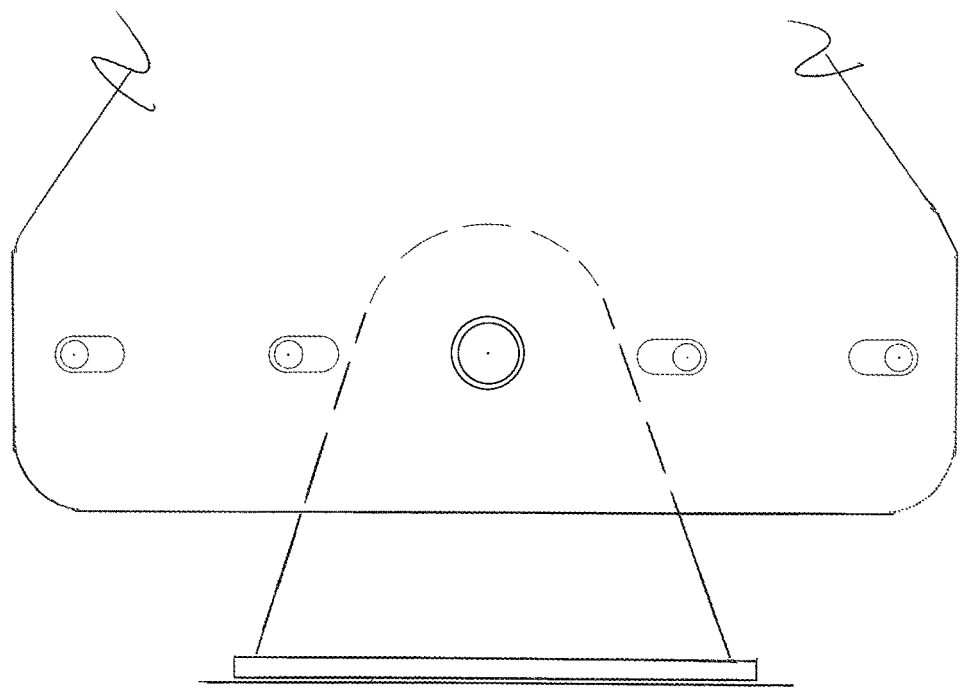
Figure 56:
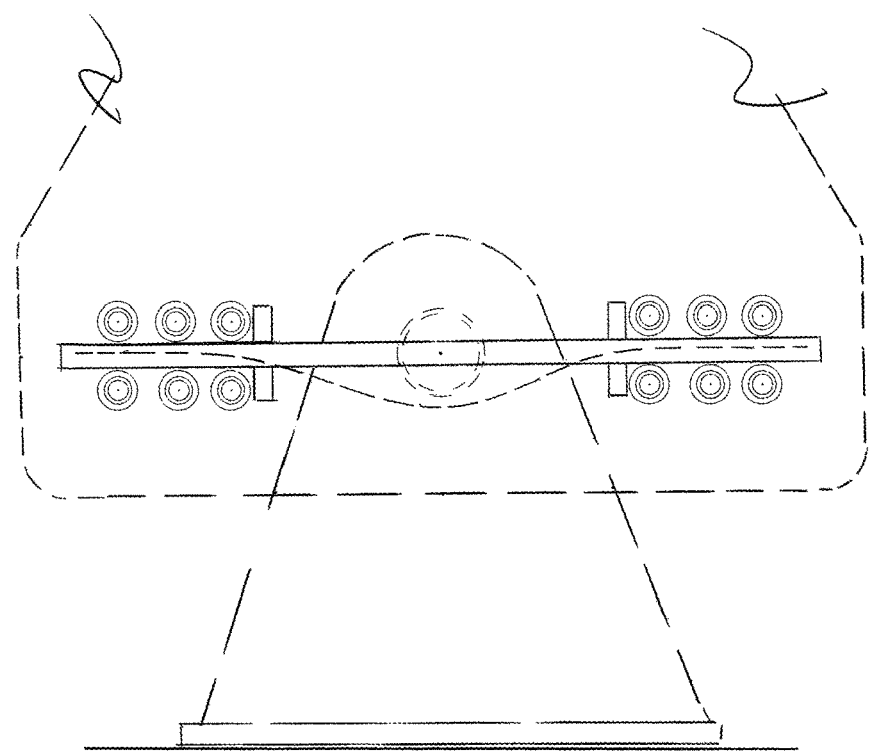
Figure 57:
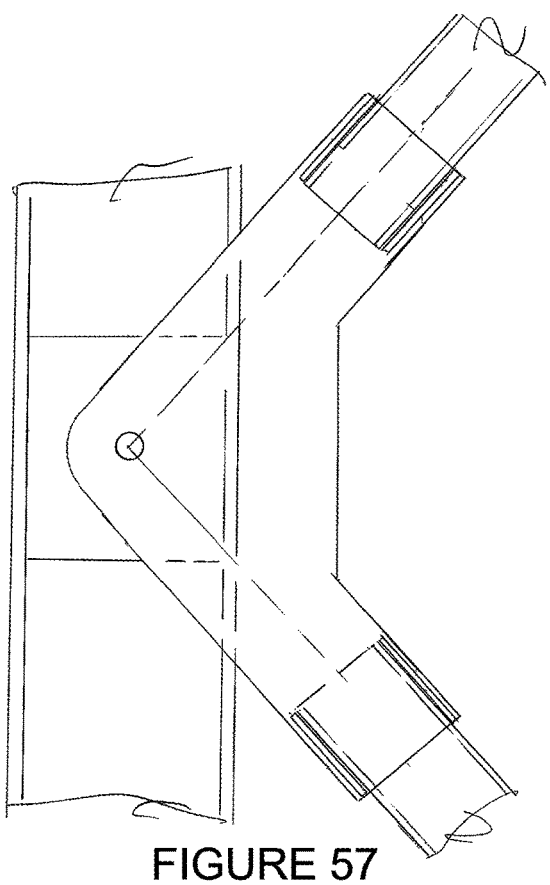
Figure 58:
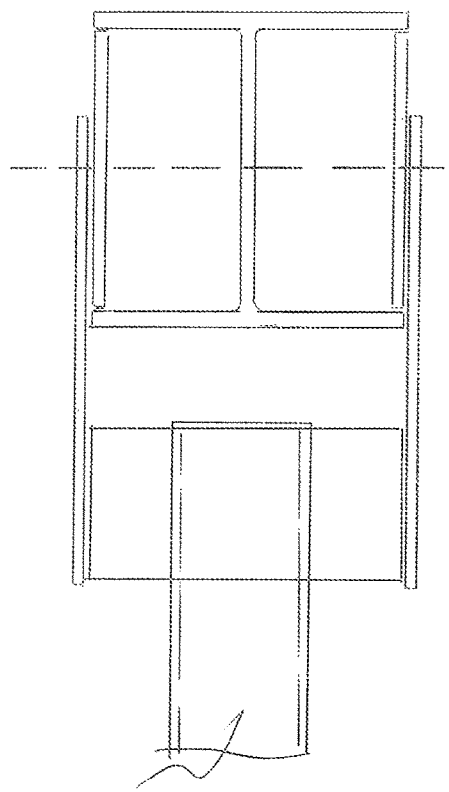
Figure 59:
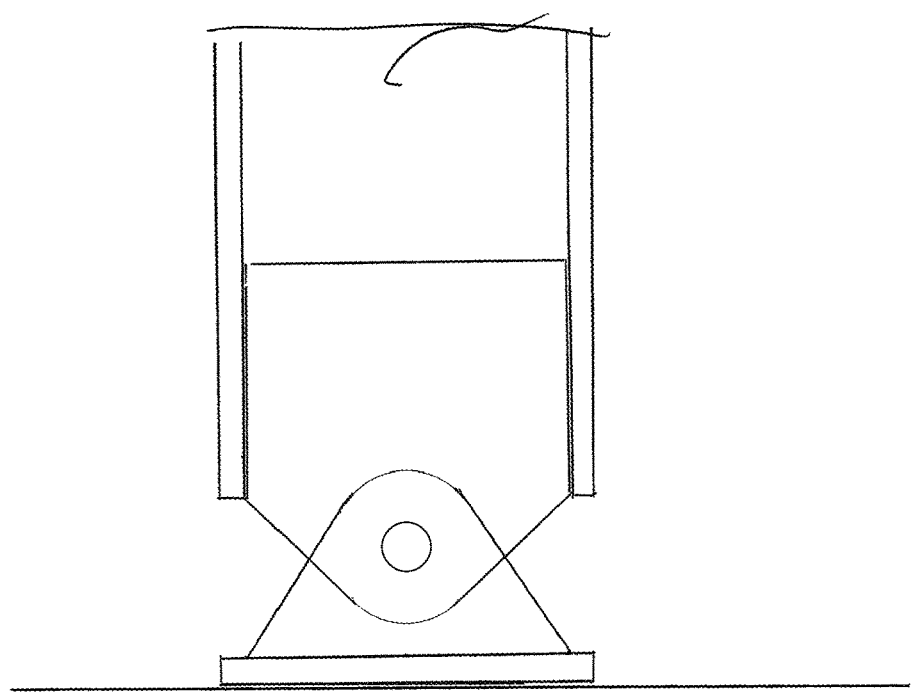
Figure 60:
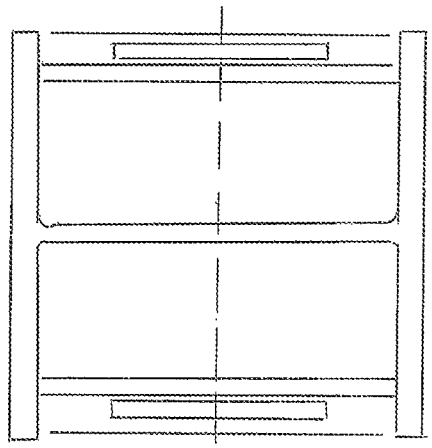
Figure 61:
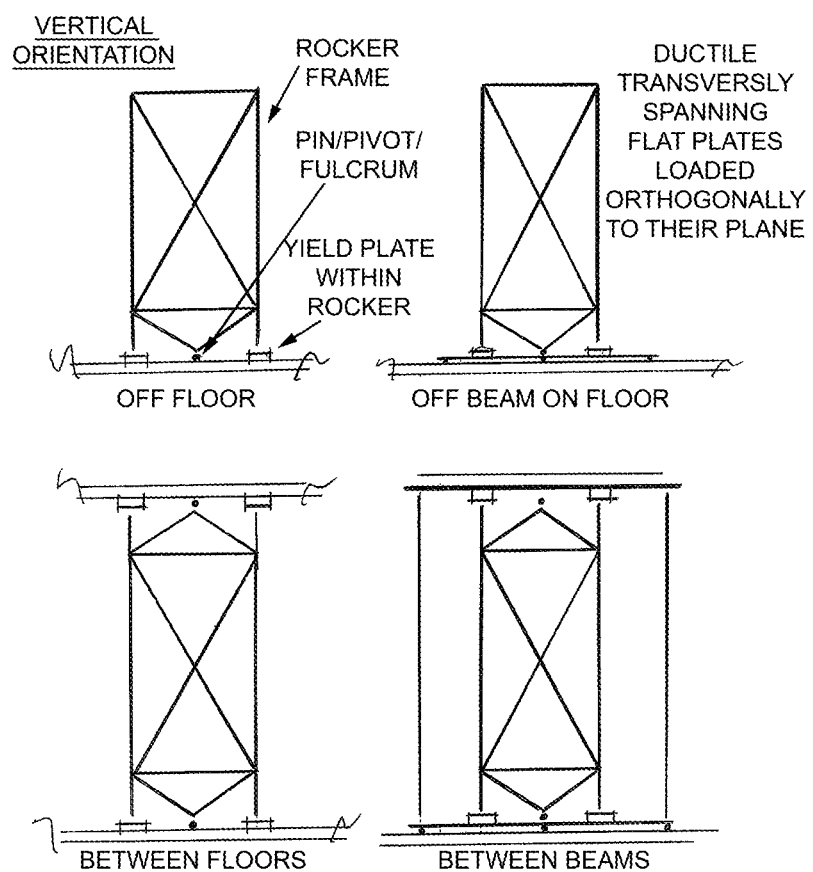
Figure 62:
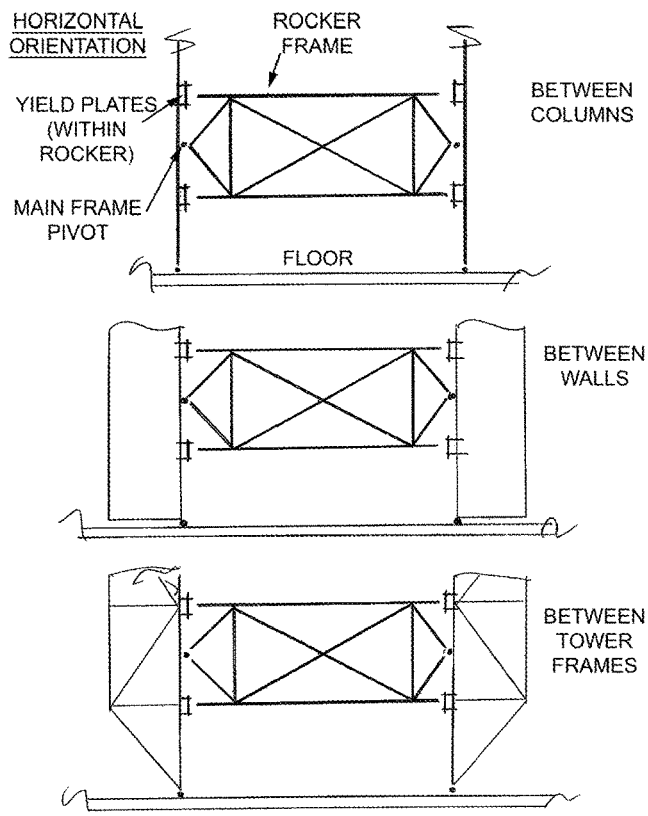
Figure 63:
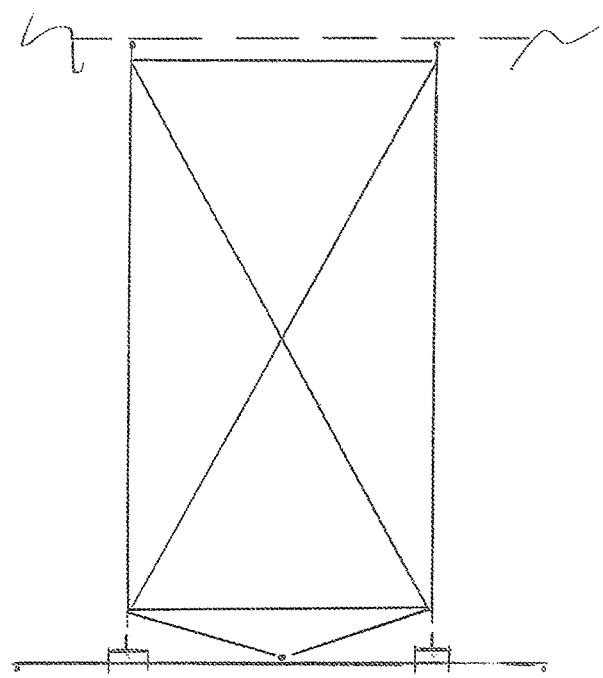
Figure 64:
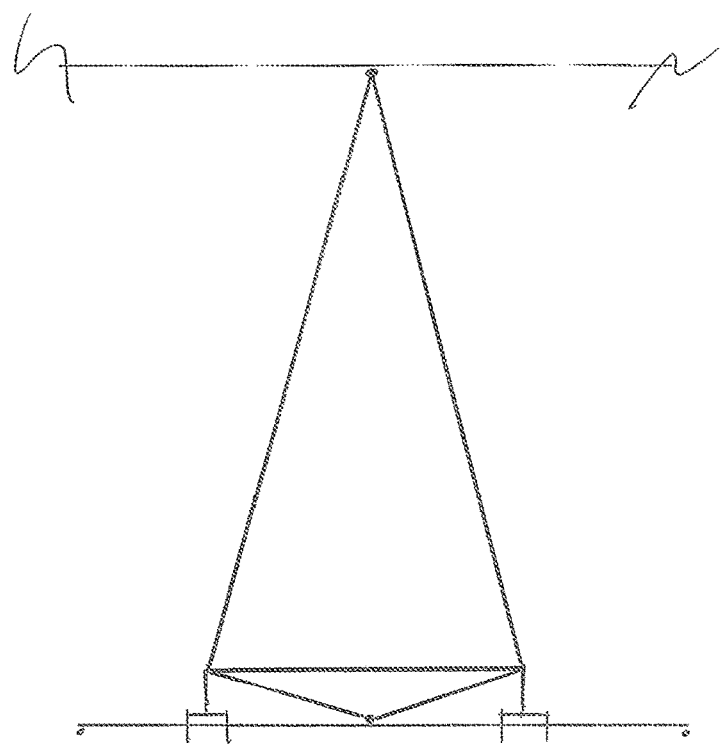
Figure 65:
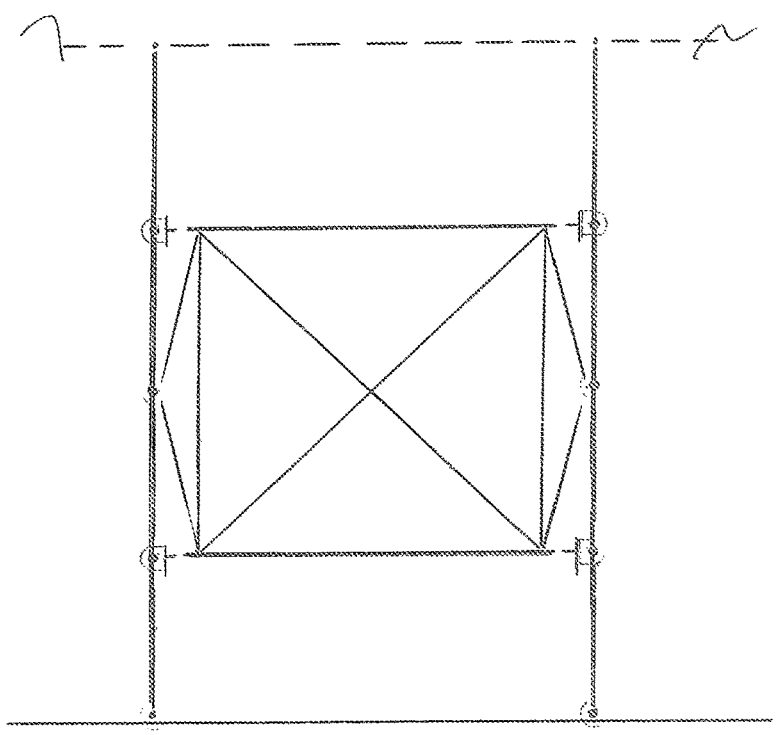
Figure 66:
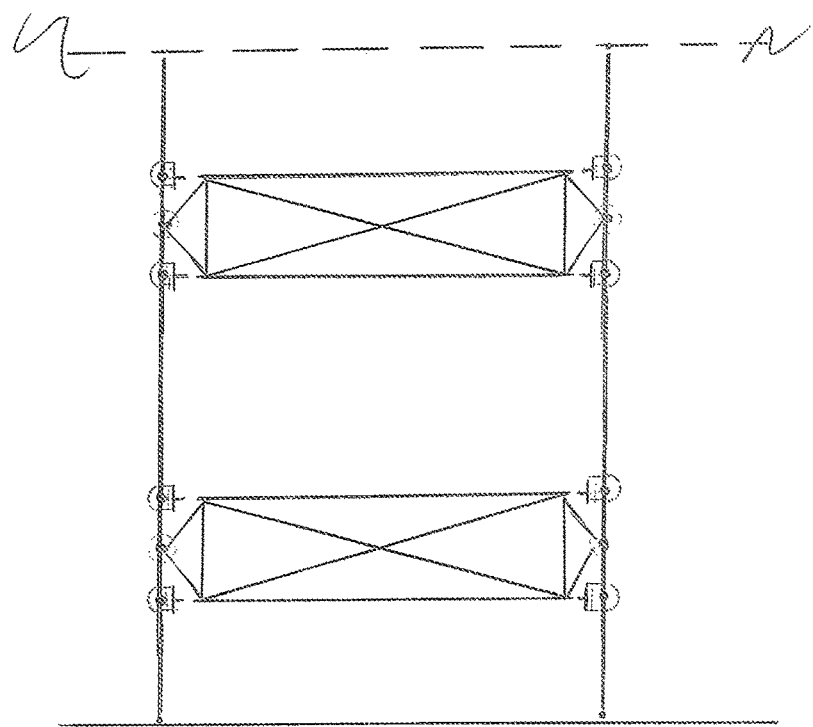
Figure 67:
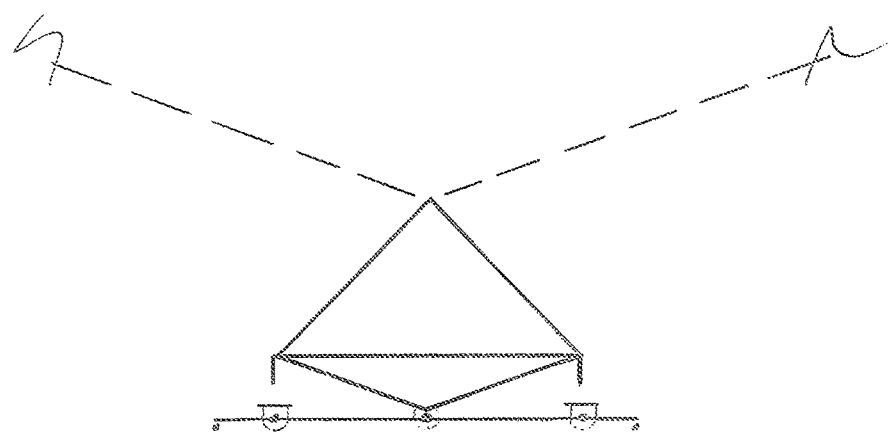
Figure 68:
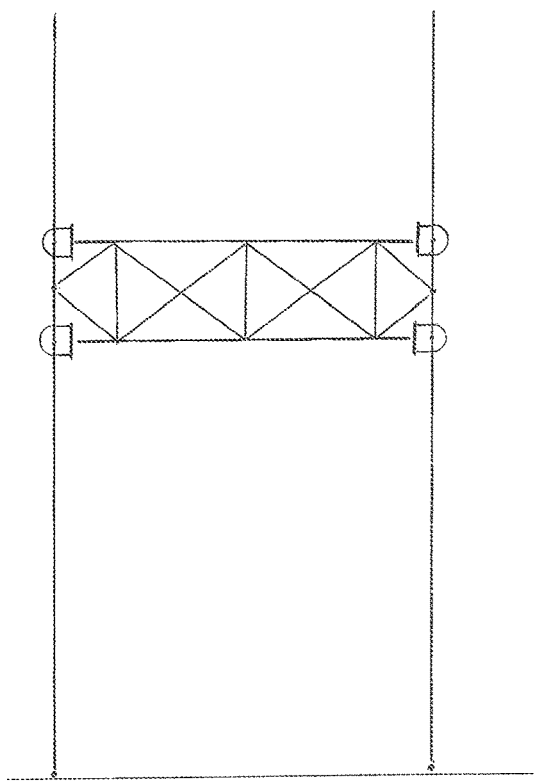
Figure 69:
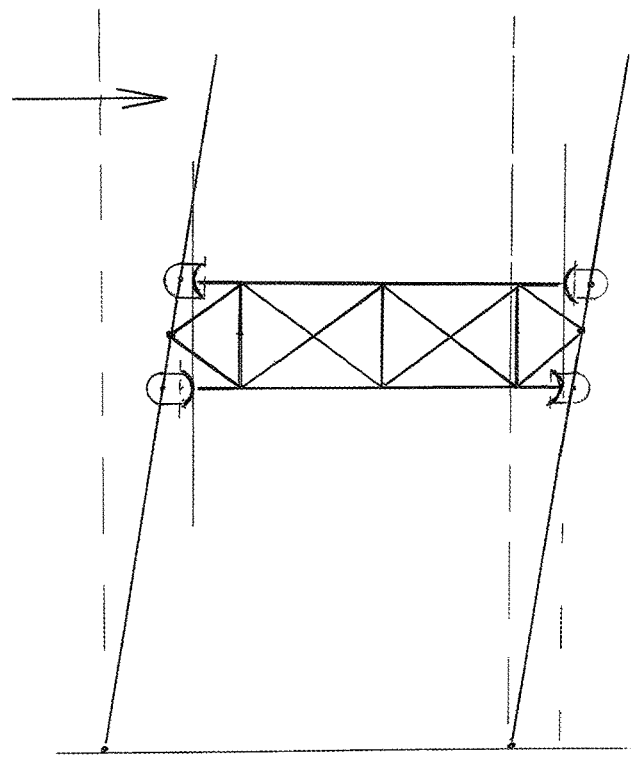
Figure 70:
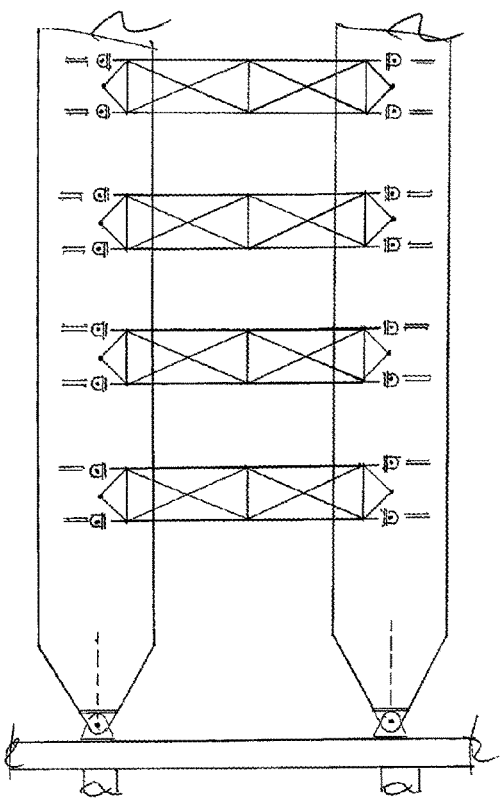
Figure 71:
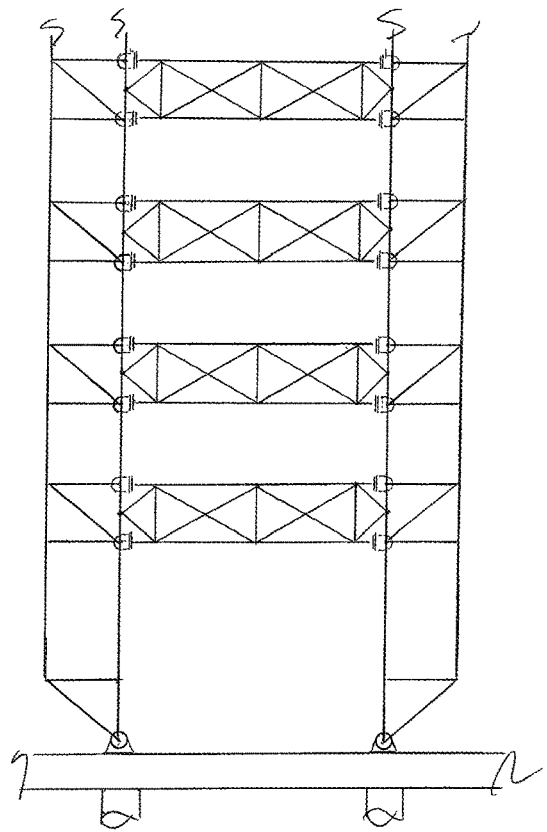
Figure 72:
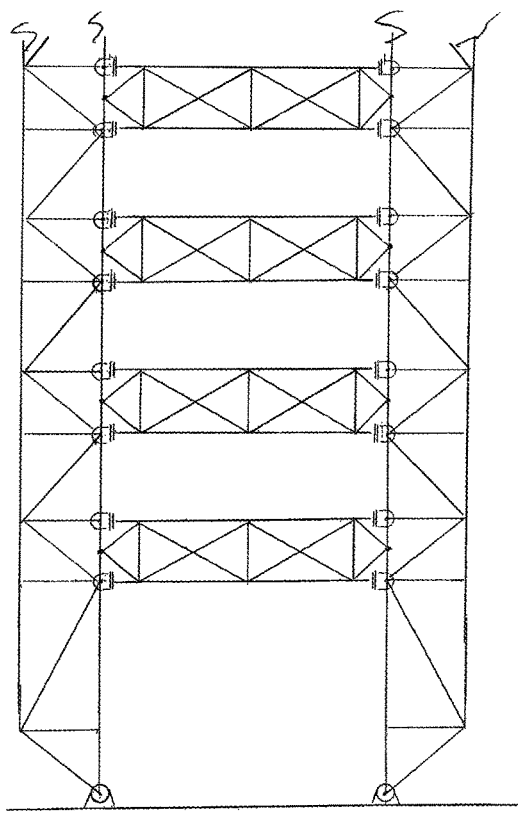
Figure 73:
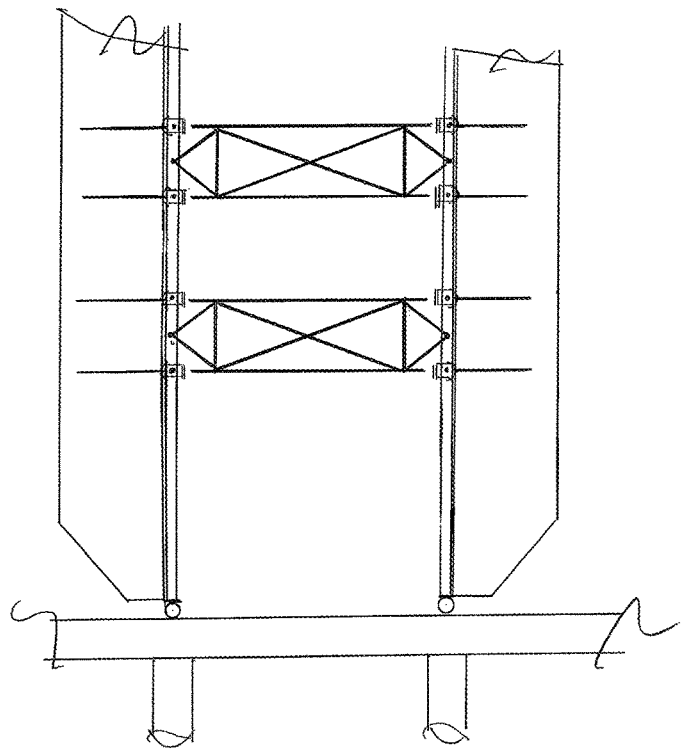
Figure 74:
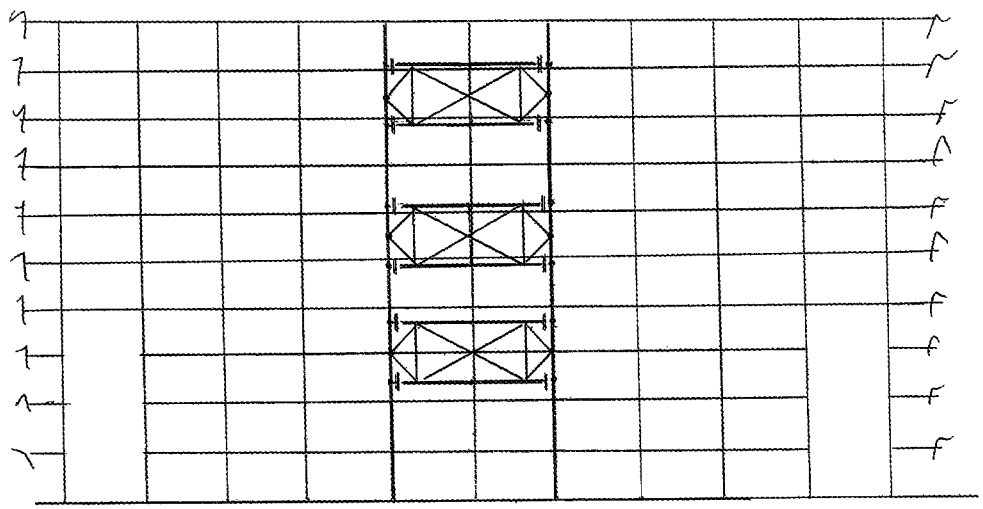
Figure 75:
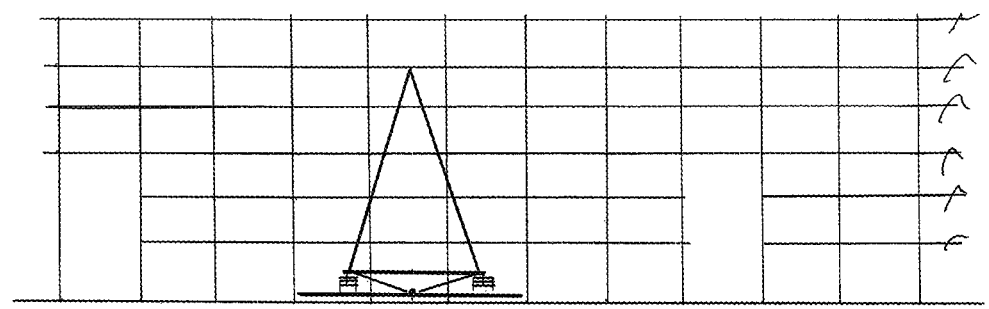
Figure 76:
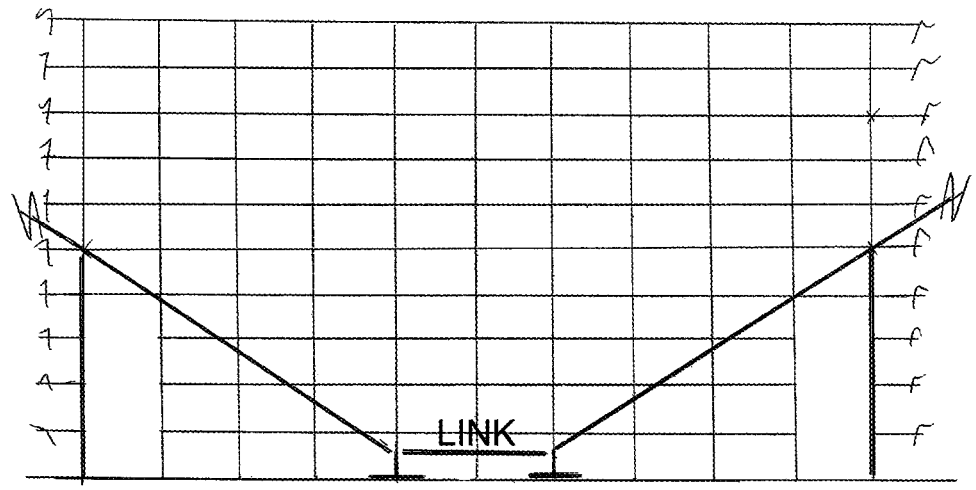
Figure 77:
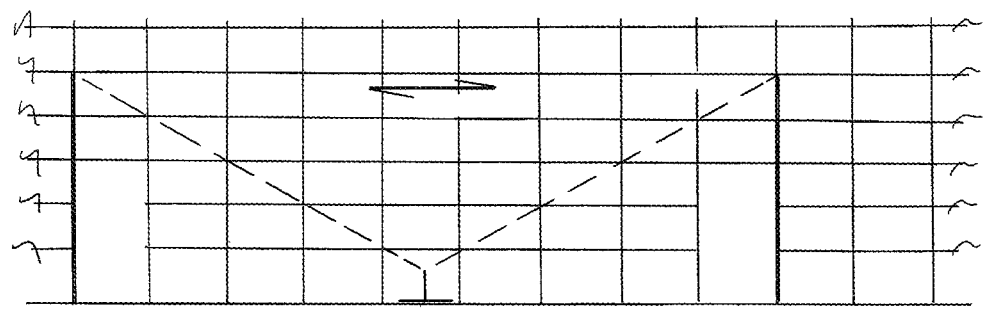
Figure 78:
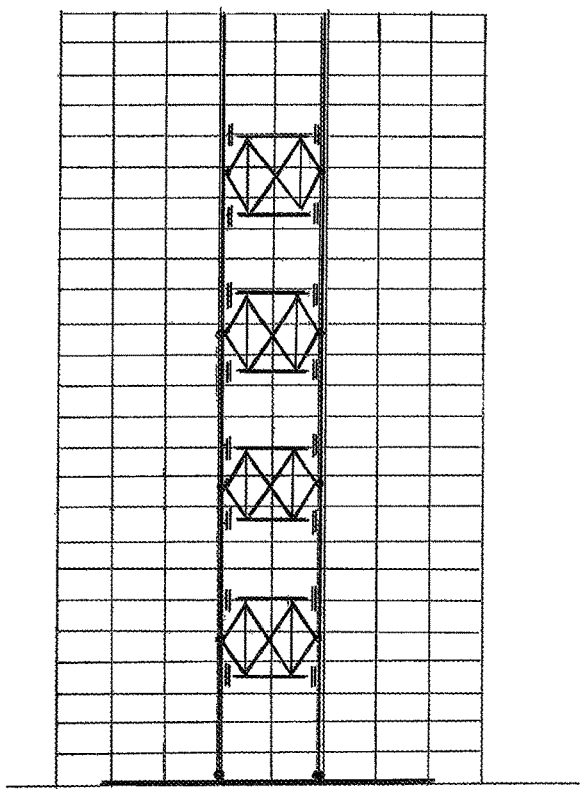
Figure 79:
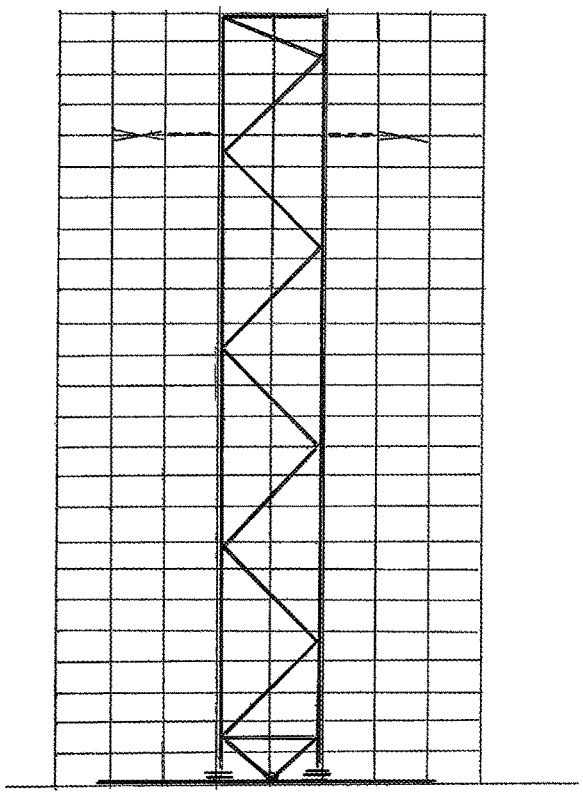
Figure 80:
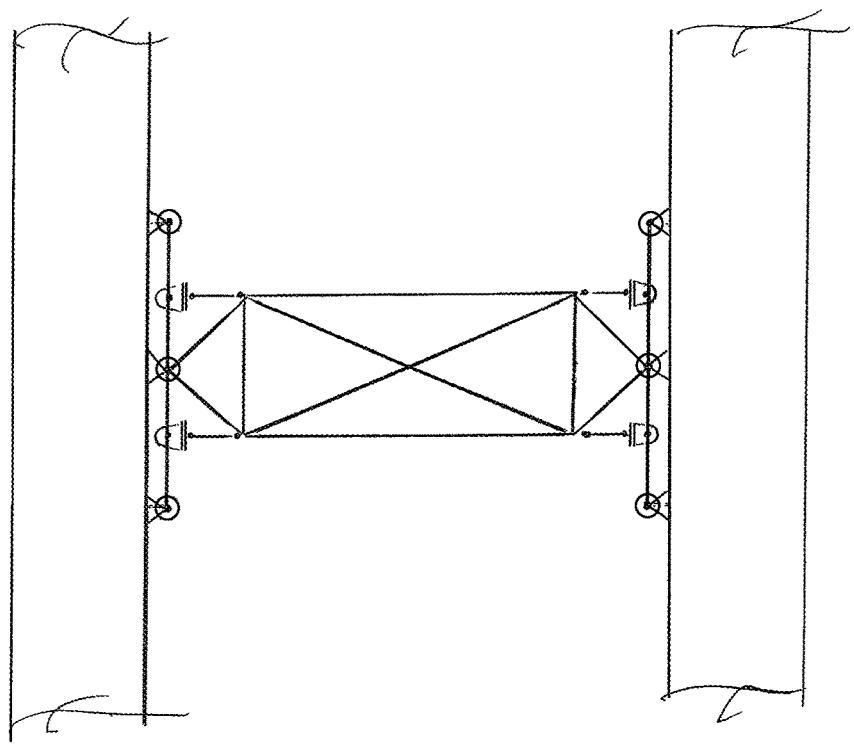
Figure 81:
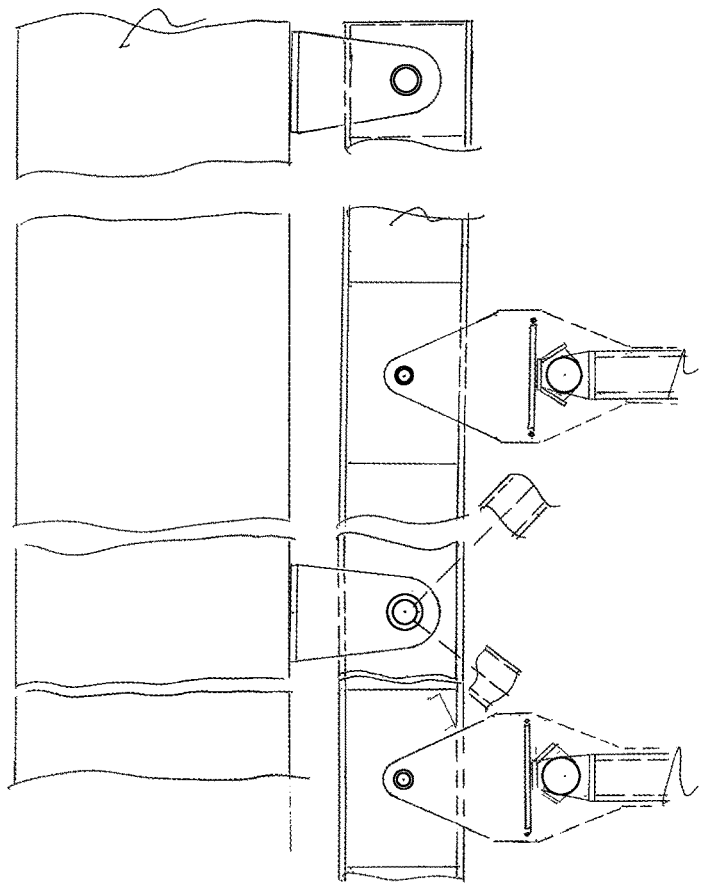
Figure 82:
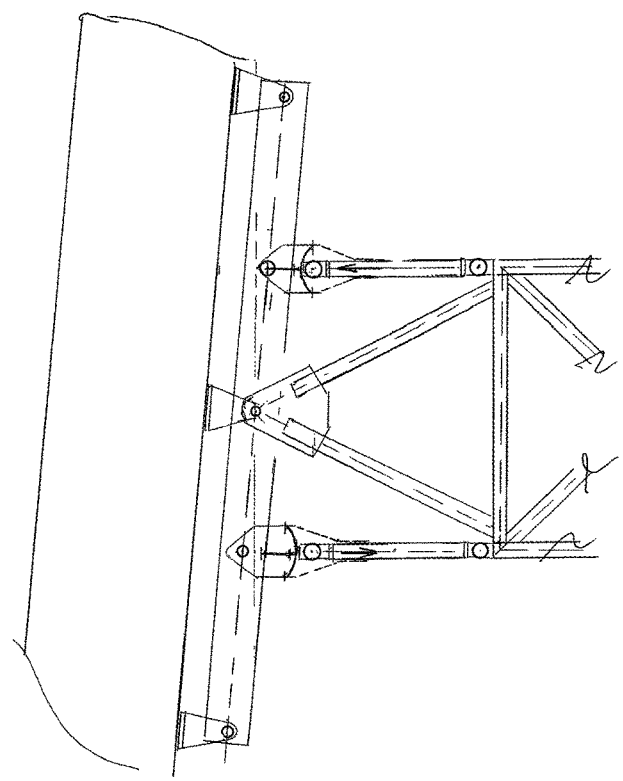
Figure 83:
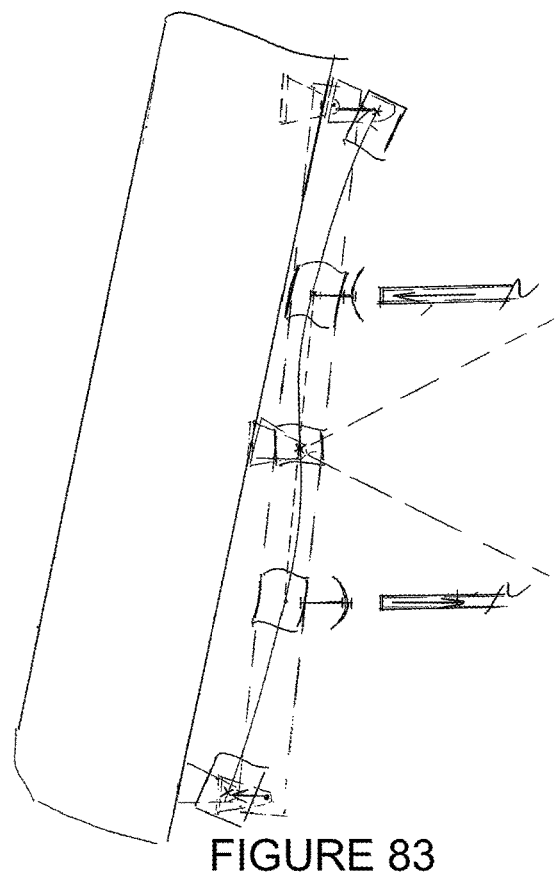
Figure 84:
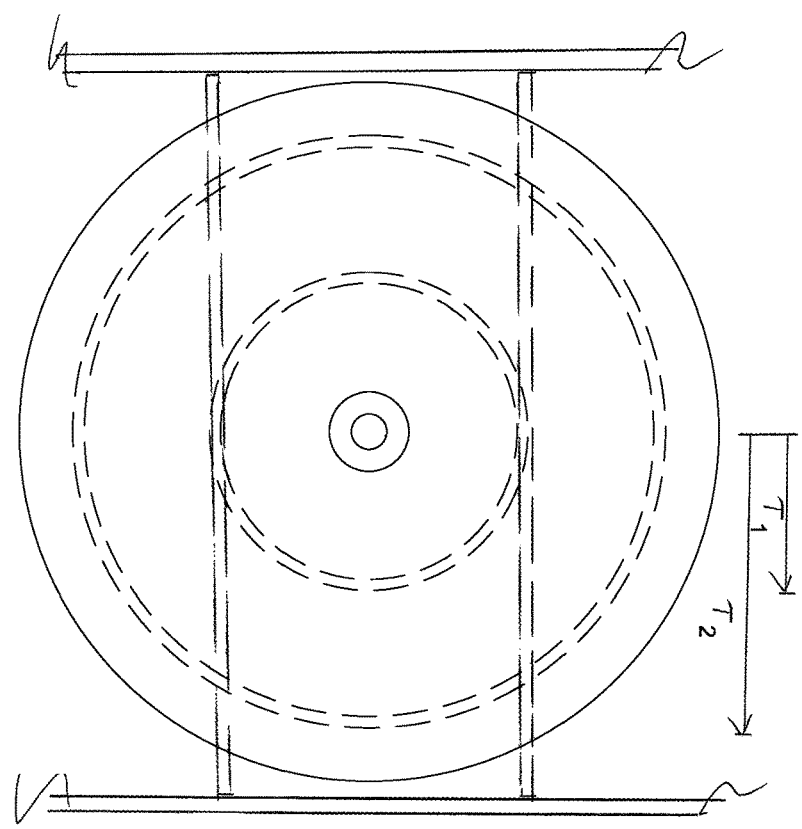
Figure 85:
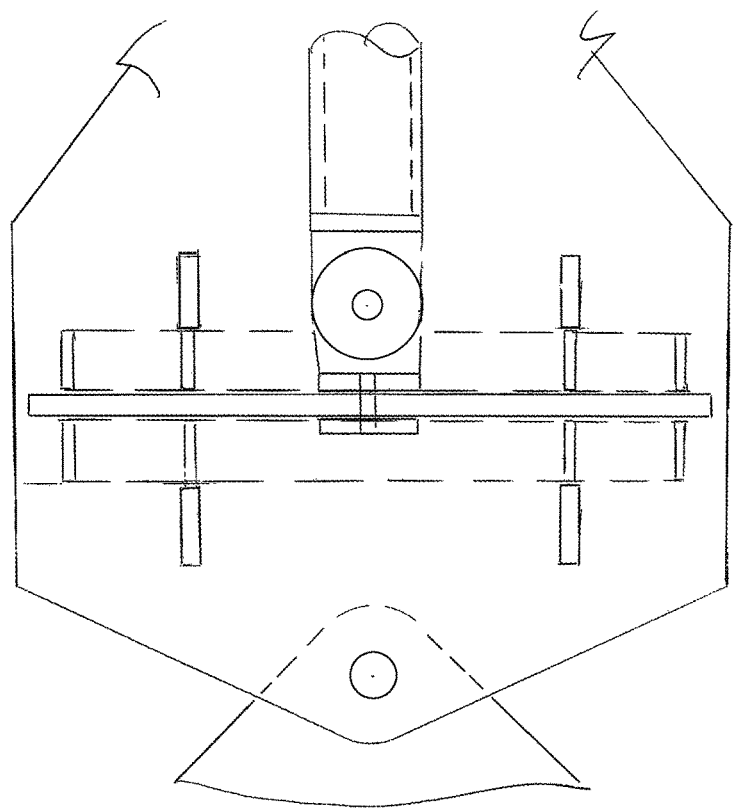
Figure 86:
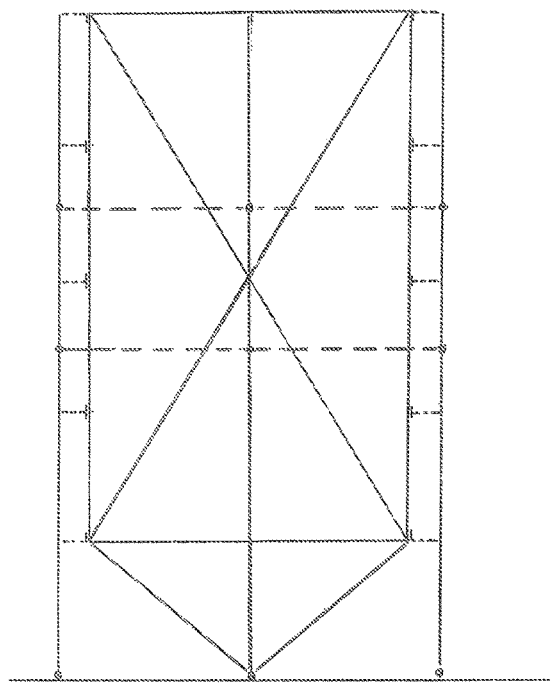
Figure 87:
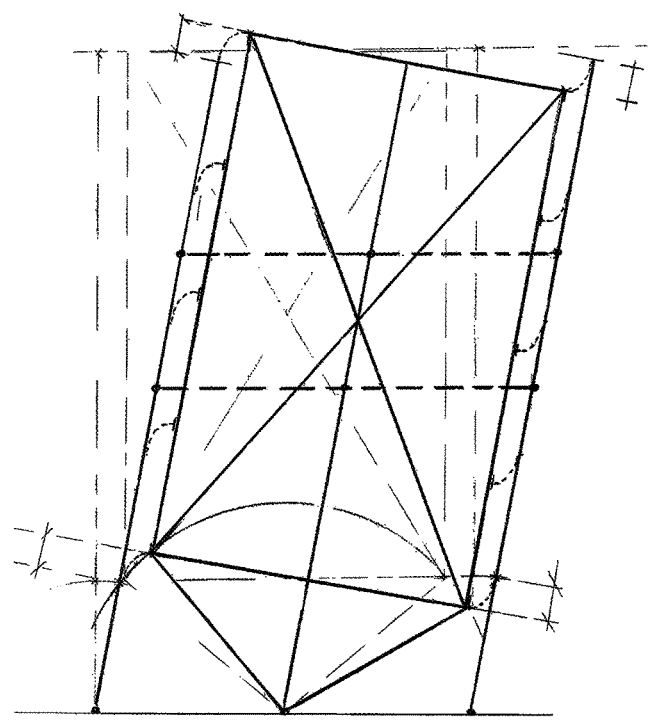
Figure 88:
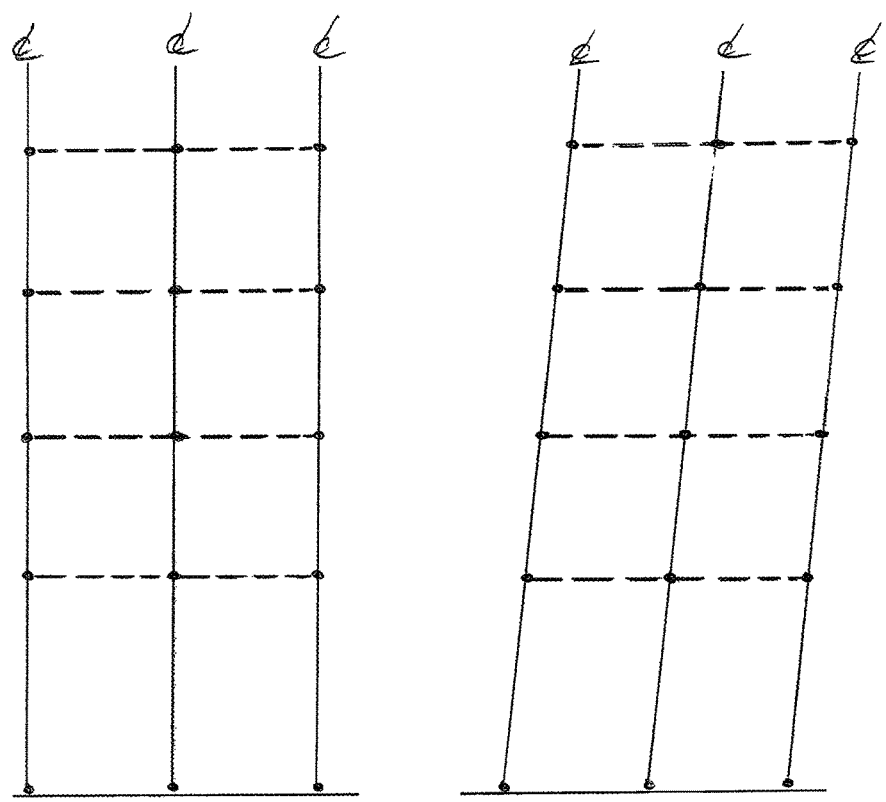
Figure 89:
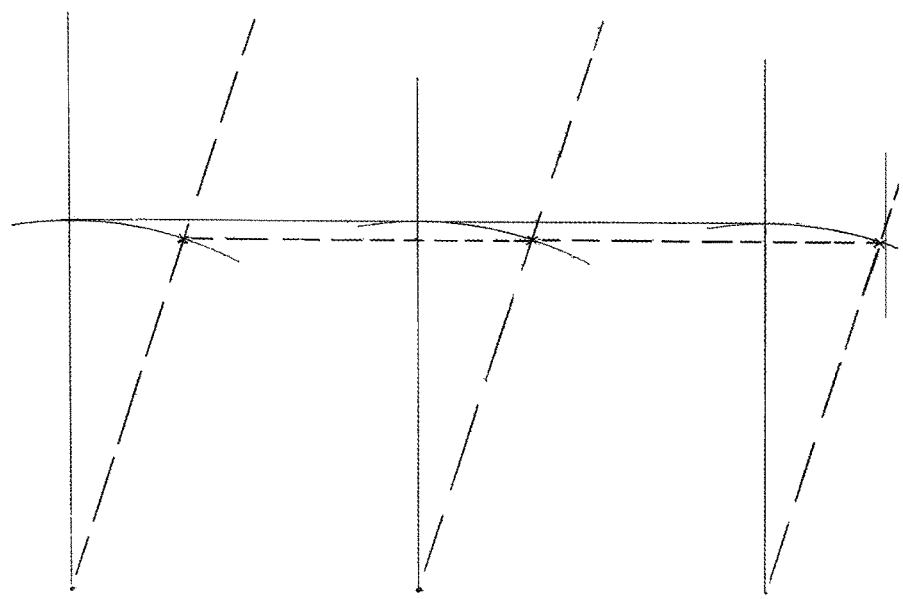
Figure 90:
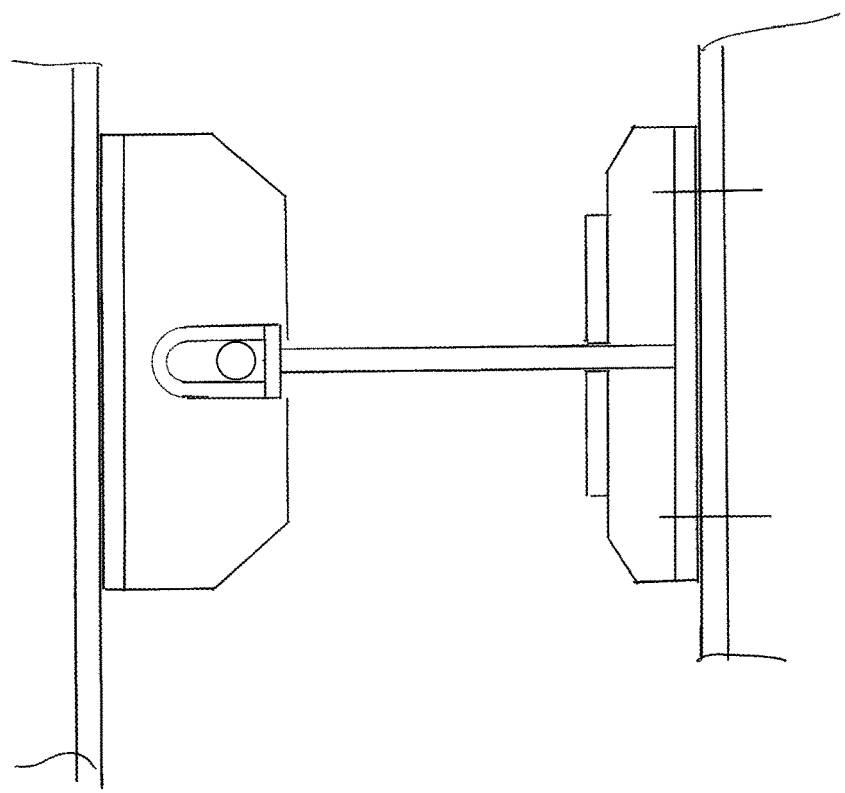
Figure 91:
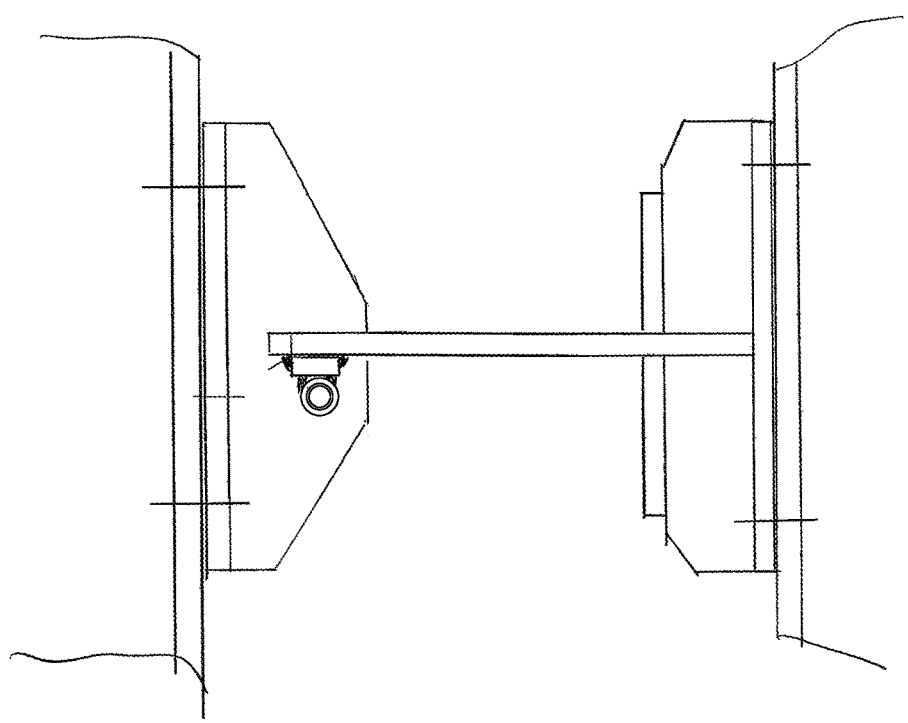
Figure 92:
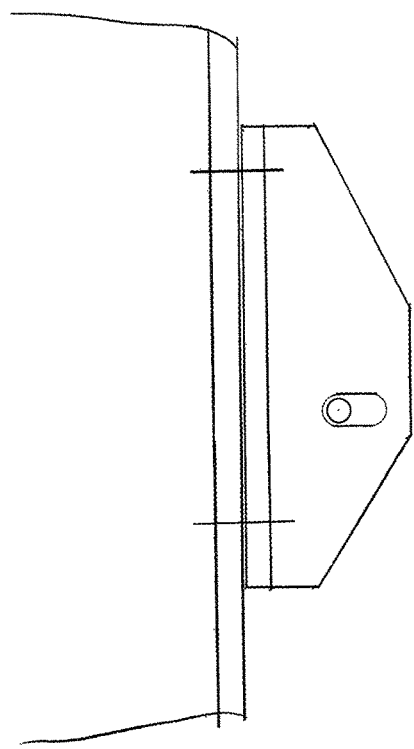
Figure 93:
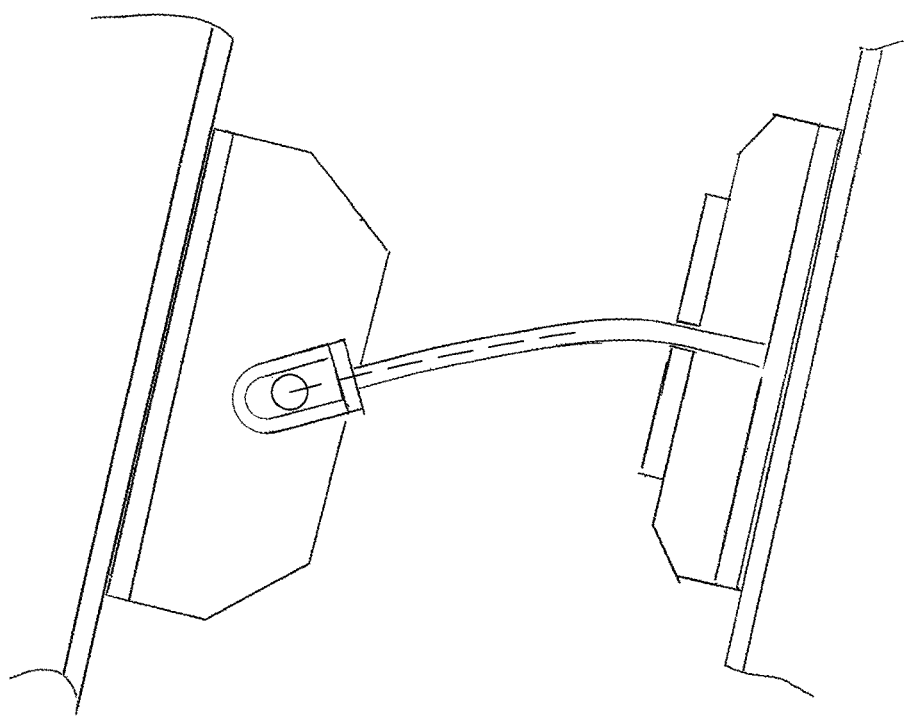
Figure 94:
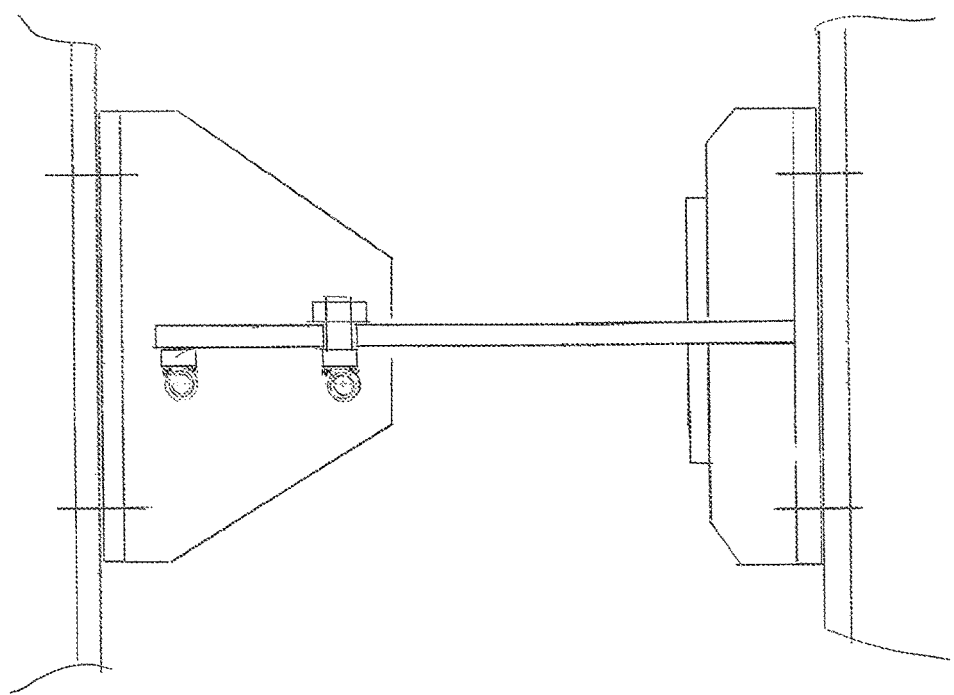
Figure 94A:
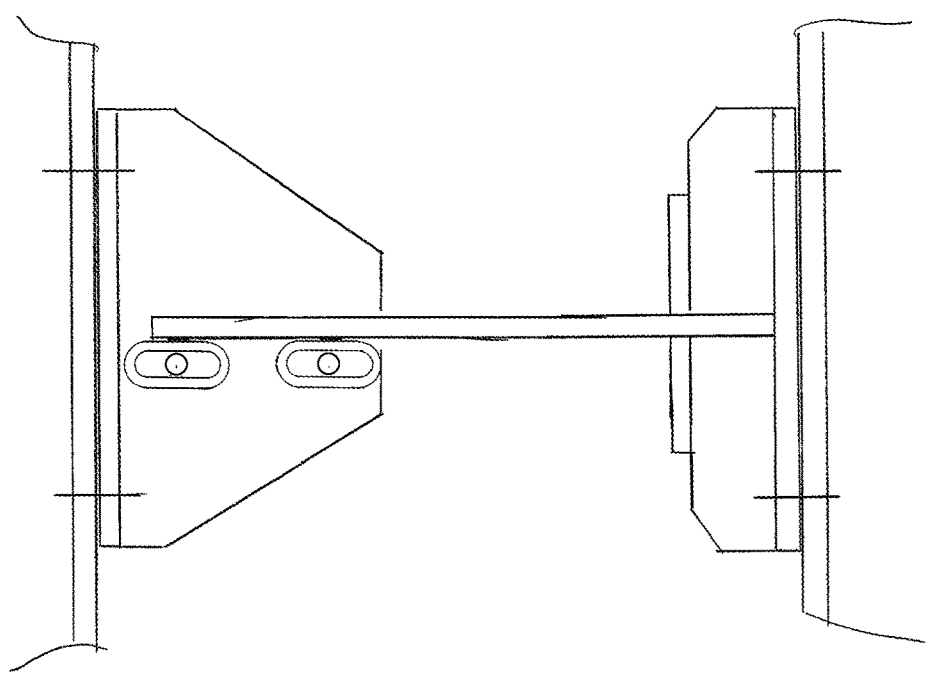
Figure 95:
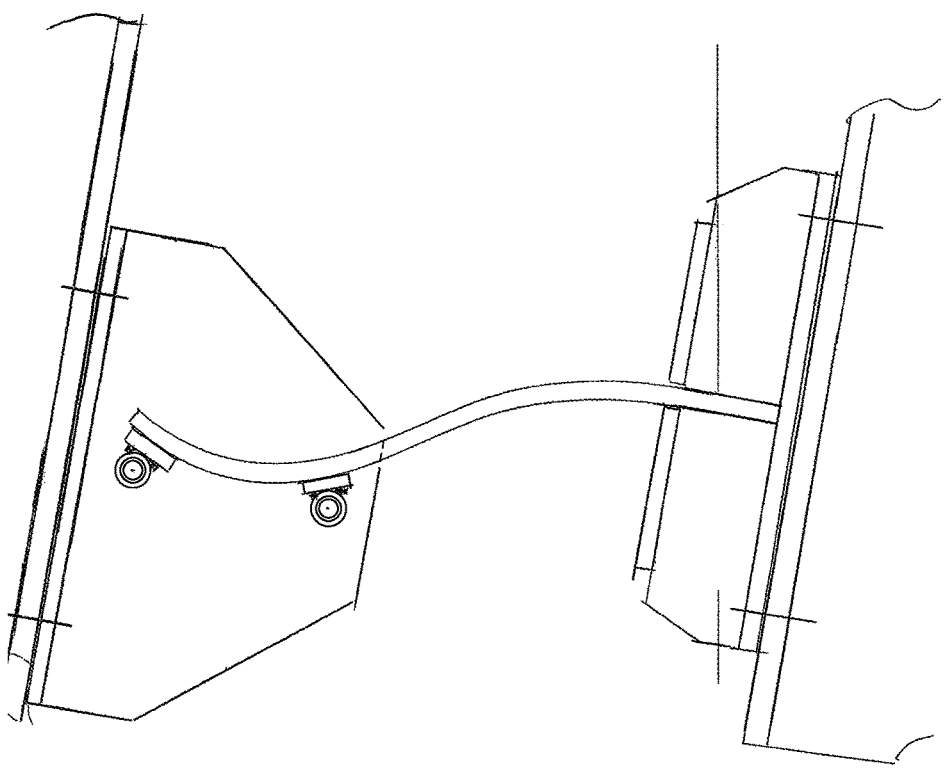
Figure 95A:
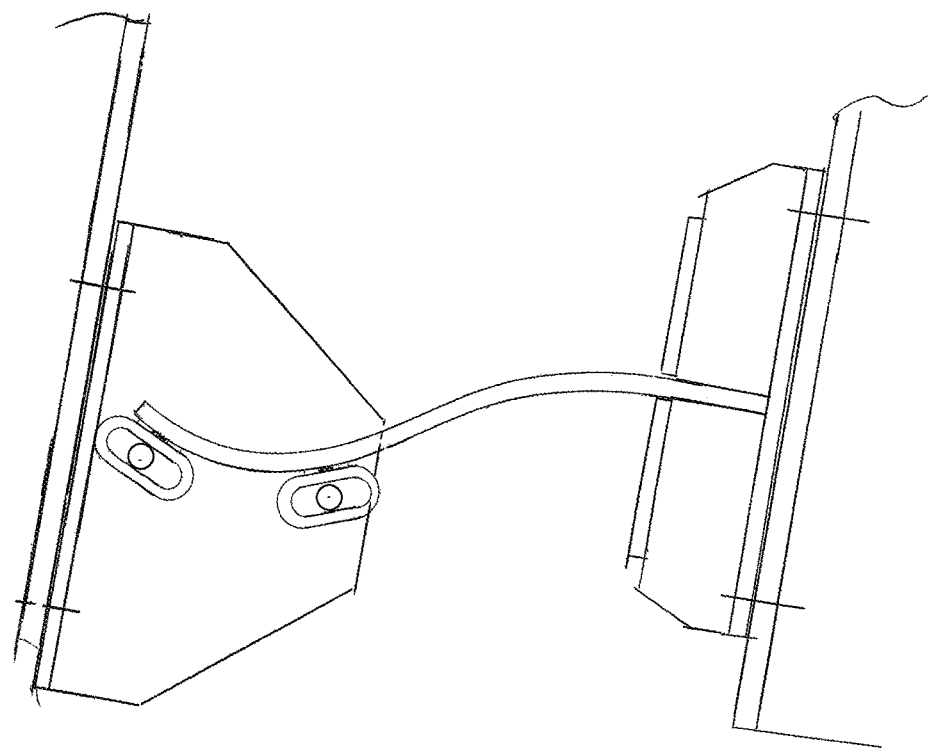
Figure 96:
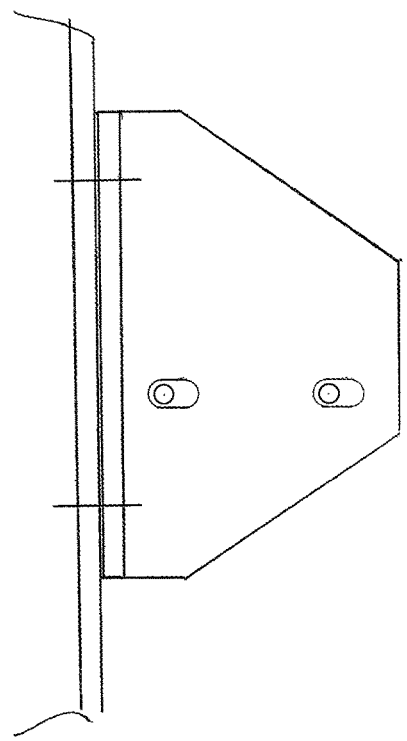
Figure 97:
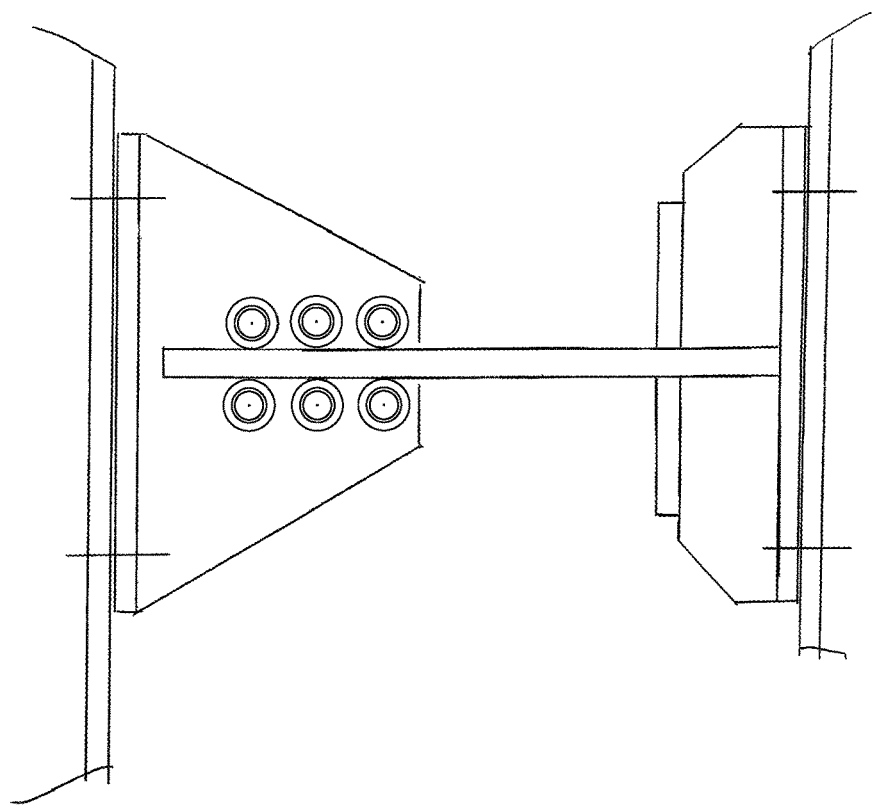
Figure 98:
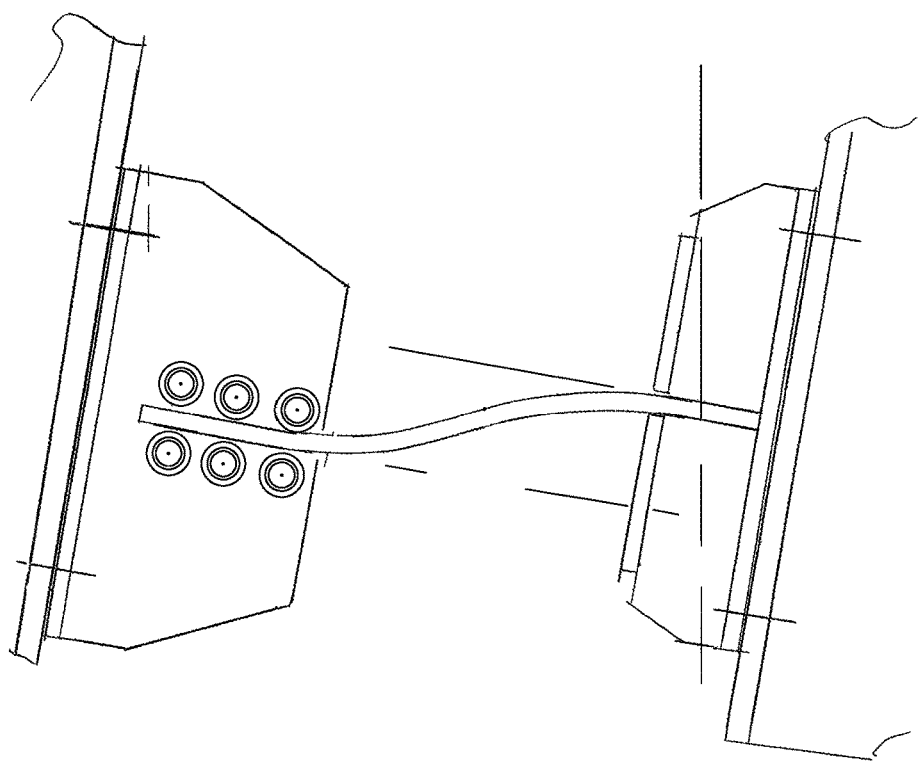
Figure 99:
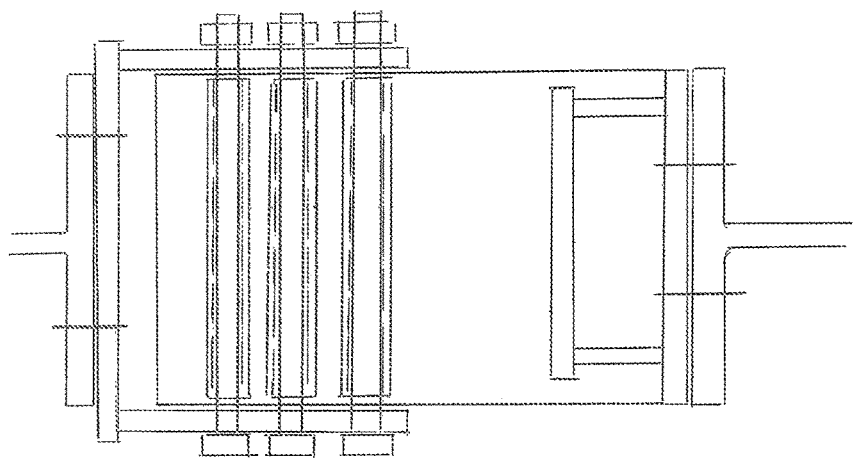
Figure 100:
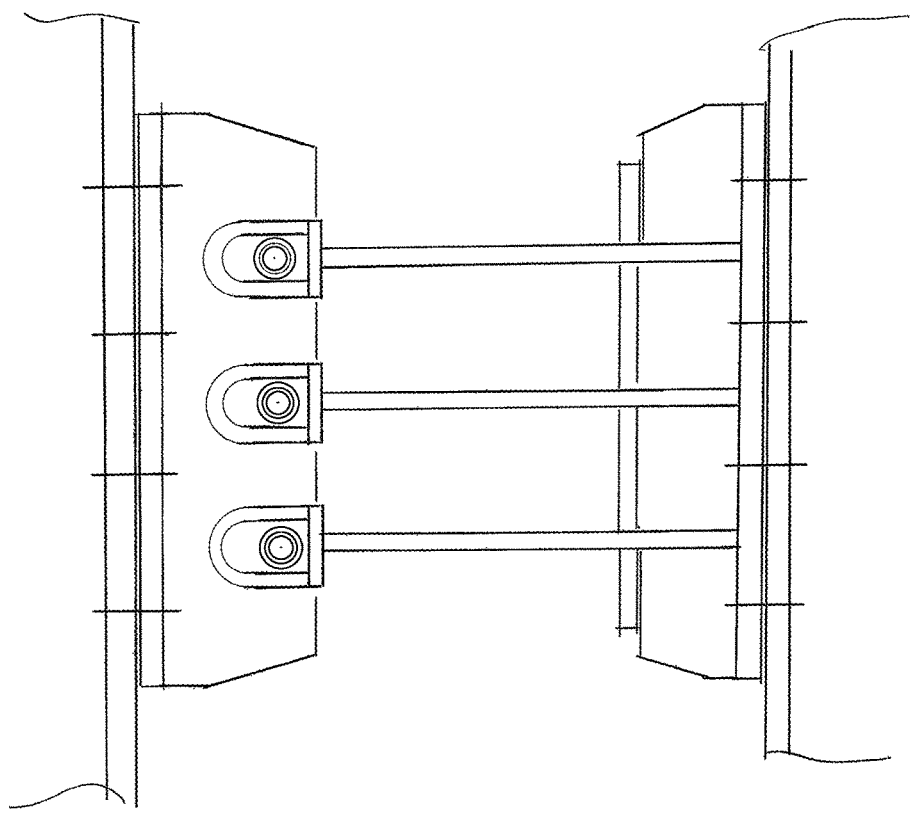
Figure 101:
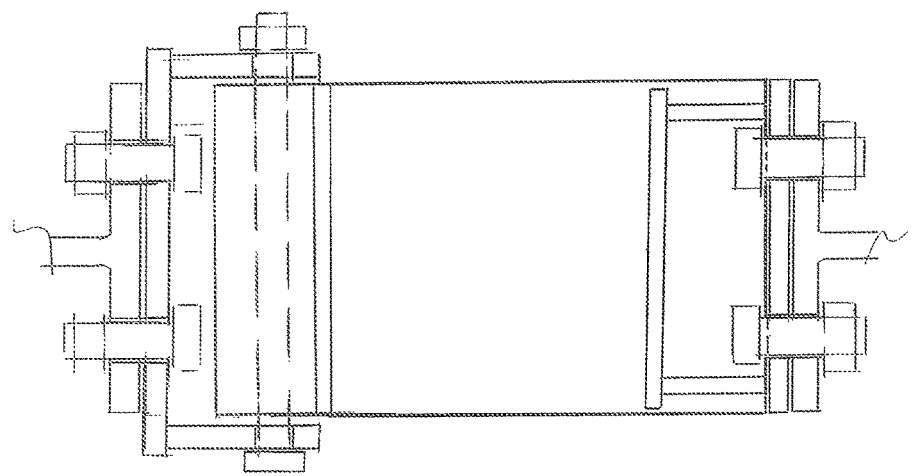
Figure 102:
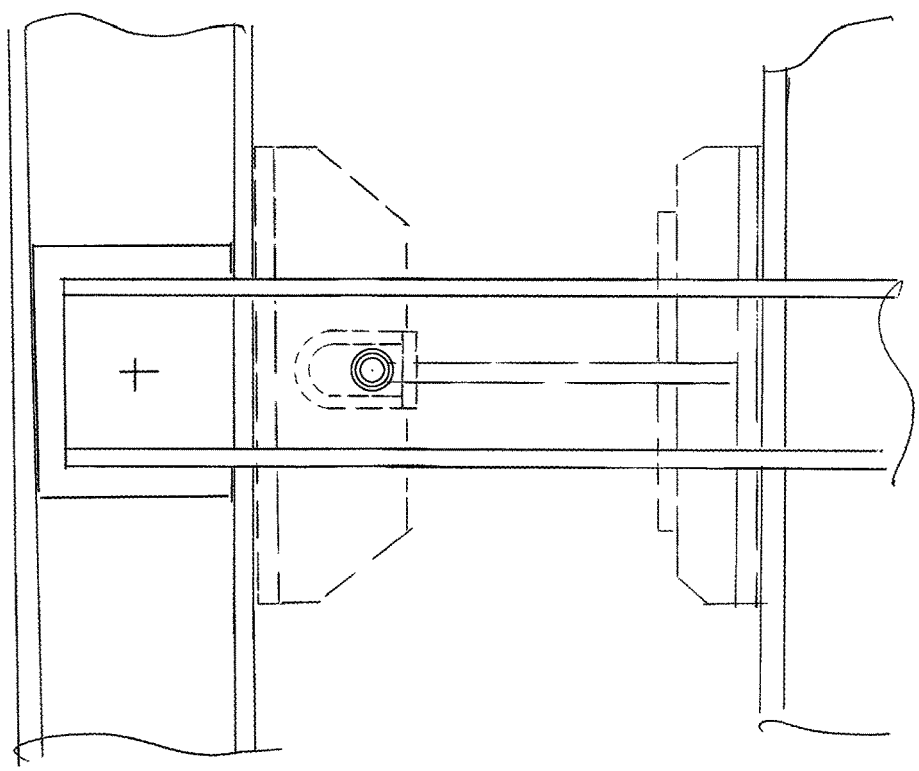
Figure 103:
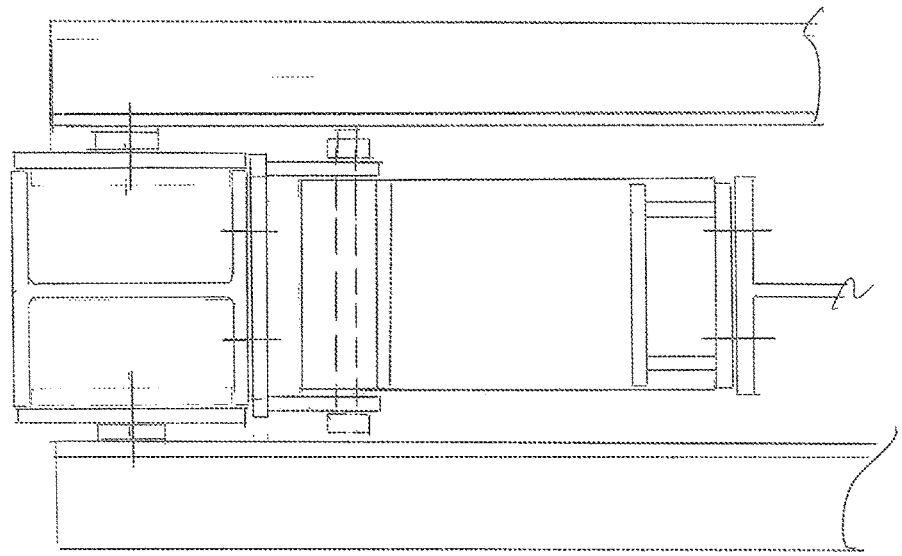
Figure 104:
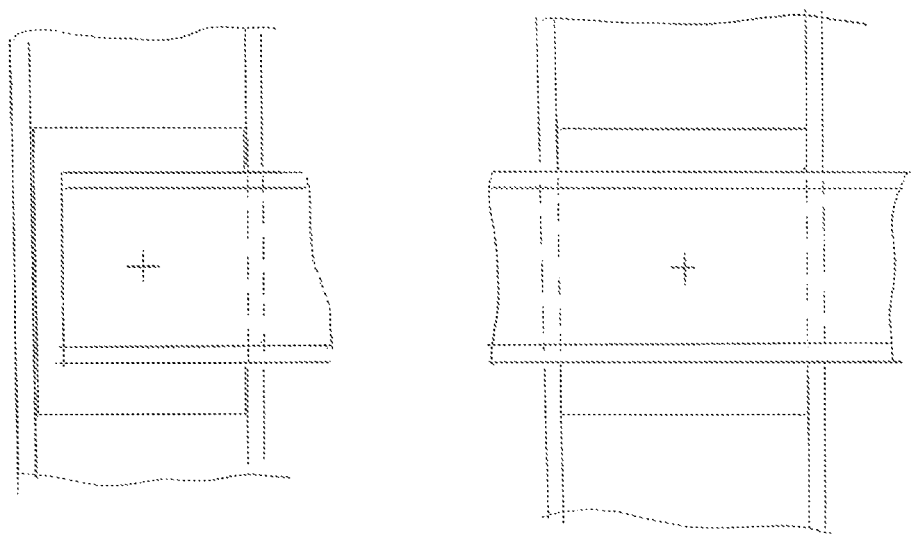
Figure 105:
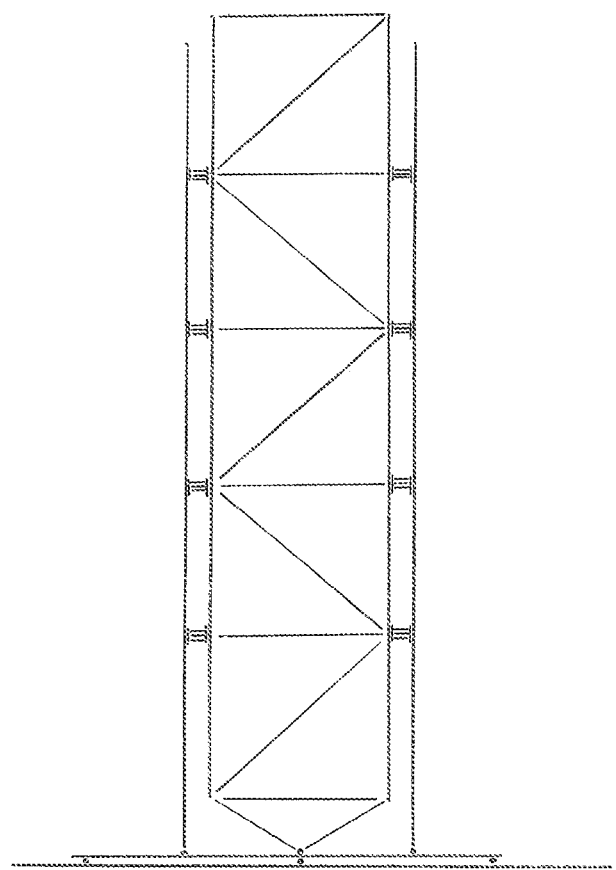
Figure 106:
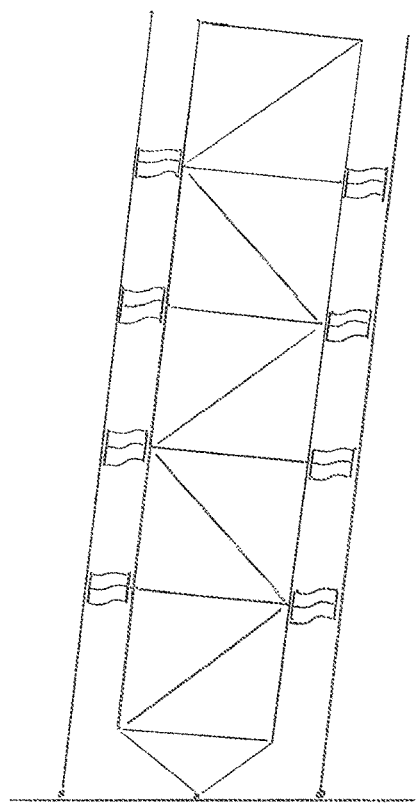
Figure 107:
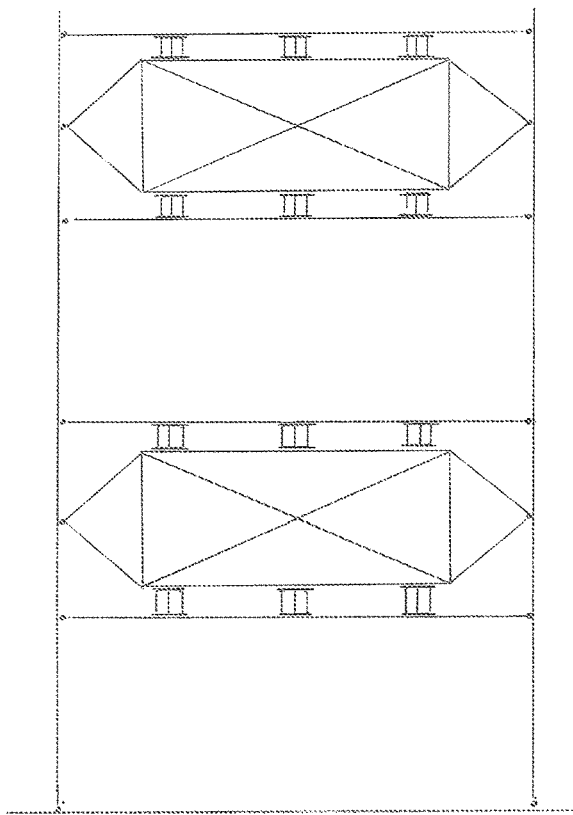
Figure 108:
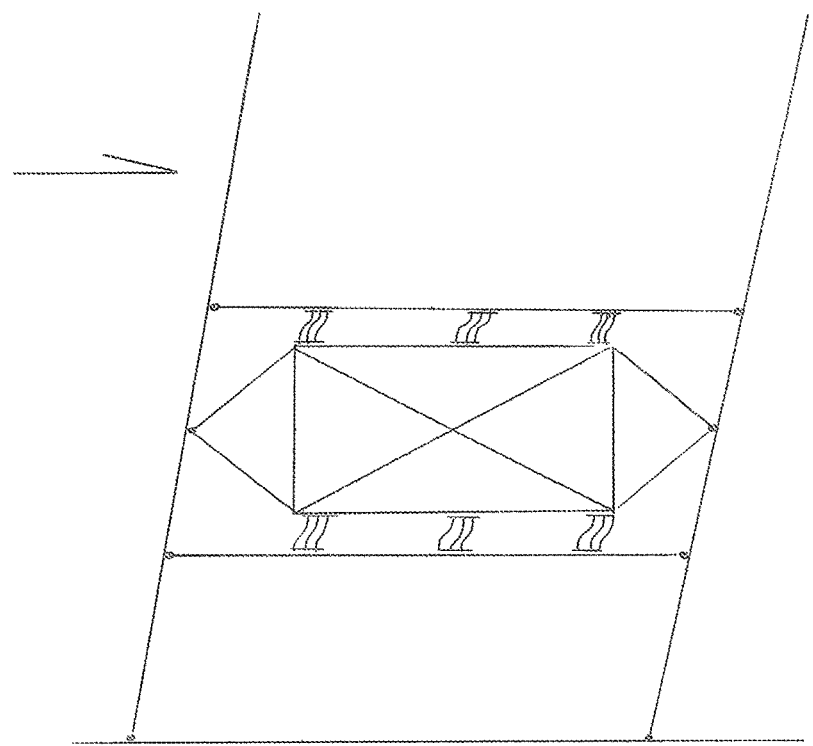
Figure 109:
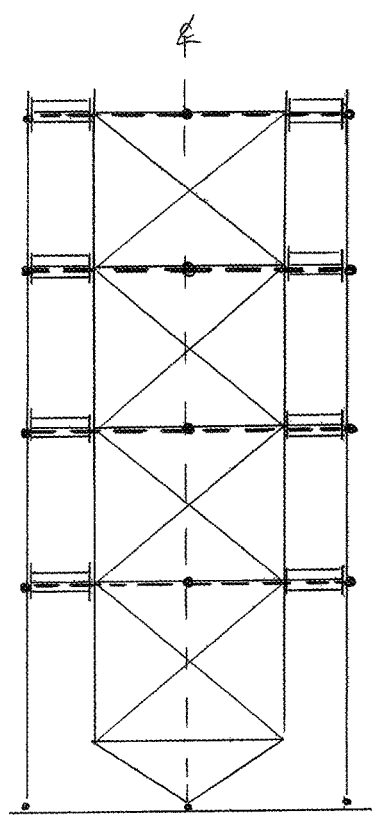
Figure 110:
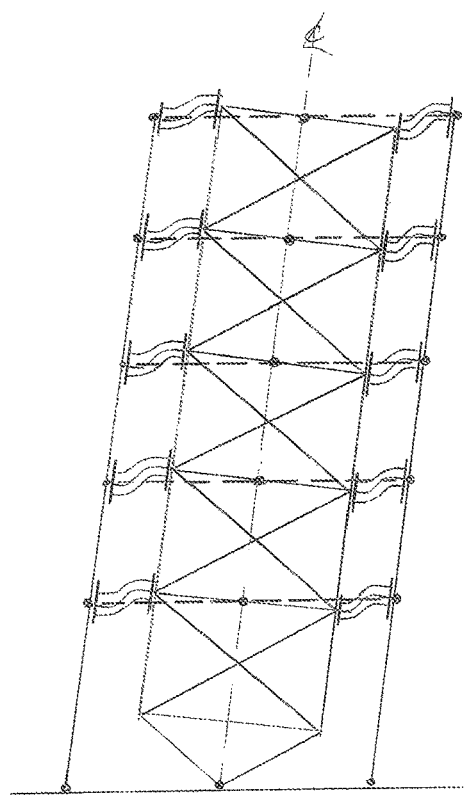
Figure 111:
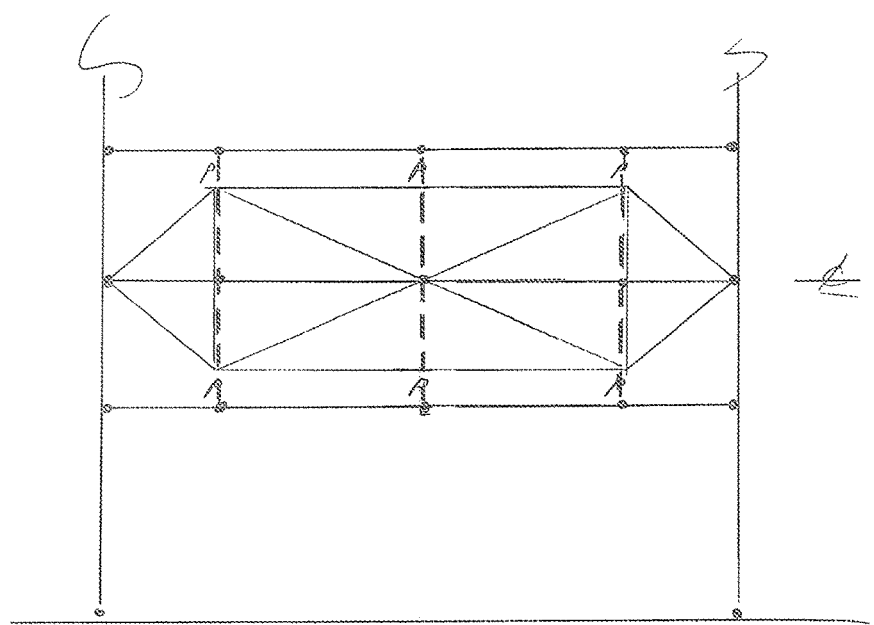
Figure 112:
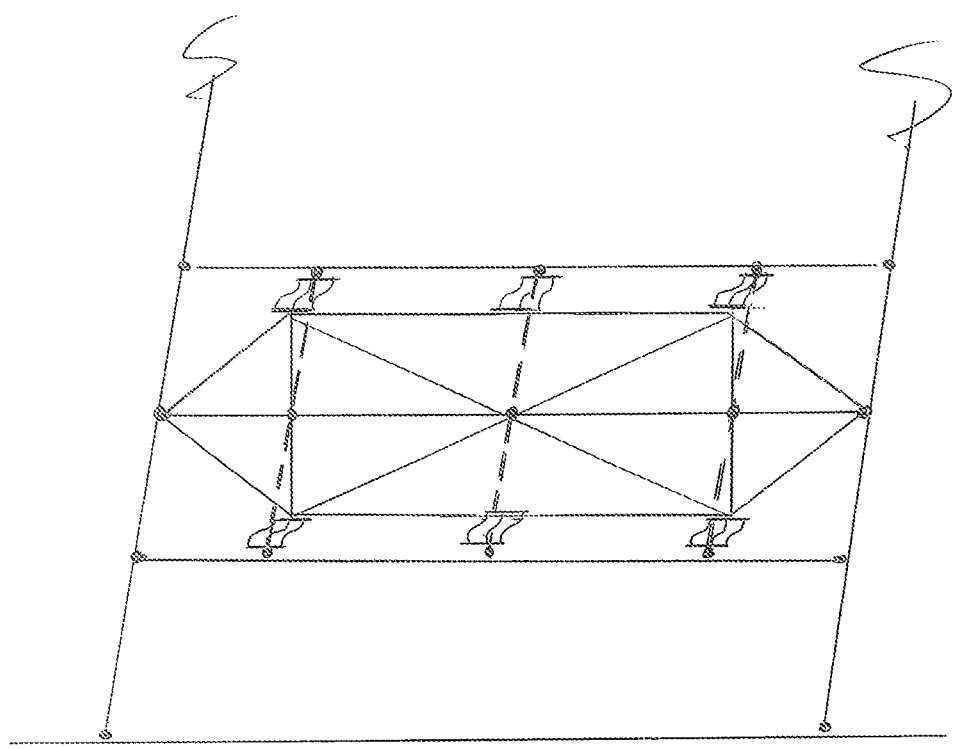

Preferably the entire system is composed substantially of metal. Even more preferably, composed of steel. The pivotable anchors, chords, frame, trusses are substantially stiff and rigid so as not to yield during a seismic event. There are variations that are available to an engineer to design the trusses, body, chords et cetera so they can withstand appropriate forces. For example the frame 280 could comprise a stiff planar reinforced concrete element (FIGS. 24). This results in a composite concrete/steel control structure.

In further embodiments, any of the embodiments above may utilise a secondary flexure member for added resilience (FIGS. 19A-19D). Where the secondary flexure member is intermediate a yield connectors and the equivalent foundation (i.e. the foundation 4 or a vertical chord, or ceiling). The secondary flexure members add in a second layer of safety. In this case the yield plates have flexural deflection (travel) limiters which stop plastic flexure in them at a prescribed limit. Only after these limiters engage is the second tier system able to yield.

By adjusting the relative strengths and elastic stiffness's of the yield plates and secondary flexure member a bi-linear elastic stiffening system can be developed in which yield can occur in one member only (either plate or secondary member) or both.

A further embodiment is where a spring or elastic structural component is added to the pin ended ties connecting the frame 280 to the yield connectors in the alphas frame or a spring added at the connection of the exterior chords to the horizontal or vertical bases of the shear action alpha$_2$ frames. This allows an independent adjustment of the control structures natural elastic frequency.

Where a ground 2 has been mentioned, it is envisaged that the ground could also be a floor or ceiling of a building or structure, a beam, or truss, or part of a structure that is engaged to the anti-racking system as described.

It is appreciated that where all of these structures and systems herein described are symmetrical, the systems may be halved or doubled or so forth and still be effective. For example the energy absorbing system 1000, may only have one yield connector 232 on one side of the pivot anchor 240. In a similar fashion, the energy absorbing system 400 FIG. 18A may also be halved so there is only one set of yield connector 430 spaced between a frame 400 and one stiff column 310.

The embodiments described above may be altered and combined together to form further embodiments. A person skilled in the art will realise that these configurations can be adapted to suit many different purposes and functional characteristics of a structure or storage rack. Such as the height of the structure or storage rack, the number of storage racks to restrain, the weight of the structure or storage rack, the weight of the goods or structure, the tendency and frequency and magnitude of seismic events where the structure or rack is installed. Furthermore these configurations may be adapted depending on the materials used and the factor of safety required.

Further variations of a system 1000 (control structure) are shown in FIGS. 20 to 23 where an energy absorbing system 1000 may be used to both restrain storage racks 3 and dissipate racking energy during a seismic event. The energy absorbing system 1000 utilises restraining ties 300 to brace itself to the racks 3. These ties 300 are connected to a rocker 2000.

During a seismic event the forces transferred through the ties 300 are tensile forces. More than one tie 300 can be attached to a rocker 2000. The rocker 2000 is preferably provided intermediate two ties 300. In alternative embodiments, the rocker 2000 may be at the end of a rack and only attached to a single tie 300.

The ties 300 have a low elasticity and minimal deformation during seismic activity. Preferably the ties 300 are metal cables. However the ties 300 may be braided line, or solid bar or the like. Any material and geometry substantially strong enough to take the tensile forces with low deformation may be used for the ties 300.

The rocker 2000 (FIG. 21A), in this embodiment, connects with the yield connectors. The flexure member 100 (plate) is part of the yield connector. The flexure member 100 (plates) are able to flex to high elasto-plastic displacements. Absorption of energy through elastic and plastic deformation at the constant yield force of the plate reduces and limits the internal forces that can be generated within the control structure or any adjacent structure it is seismically supportive of. Both structures are hence able to withstand seismic activity with damage confined to the replaceable yield members (plates).

Preferably, the material variables of the rocker 2000, and more specifically the flexure member(s) 100, do not change significantly after each cycle. Importantly, the variables that stay substantially similar are the yield strength and elastic stiffness of the flexure member(s) 100. Preferably the flexure member(s) 100 has 1) a stable and constant cycling yield strength and 2) a stable and constant cycling elastic stiffness.

Because the structural behaviour of the yield plates (flexure member 100) is simple to calculate or verify by load test their performance can be accurately assessed. This allows the performance of the control structure and any adjacent structure it seismically supports to also be accurately assessed. For example, the stiffness, deflection and deformation in operation, weaknesses, stress concentrations et cetera are able to be readily calculated. This allows the design of the rocker 2000 to be specifically designed. As such the more simplified the design can be, and the more accurate the analysis can be.

The rocker 2000 of the present invention utilises the flexure member(s) 100 that throughout the oscillating forces does not significantly change its material properties. This is achieved by detailing the yielding members (plates) to be free to translate (slide) so as to simply flex without developing any membrane forces within themselves.

FIGS. 21 are schematic figures of finite dimension, of four control structures.

These control structures are seismically supportive of load carrying rack structures or general building structures. Connection of these structures to the control structures is through typically inclined tensile cables or rods.

Figure 21A:
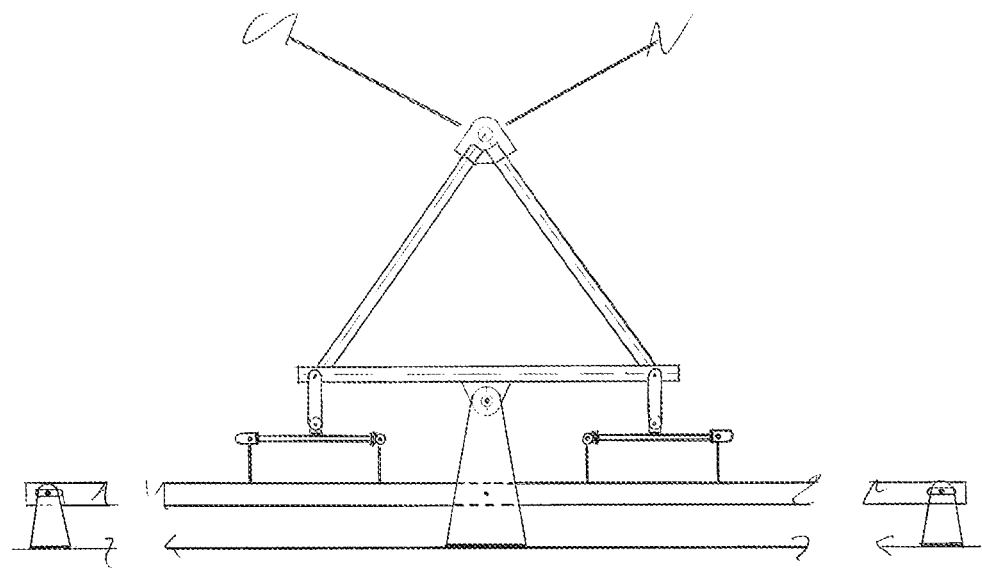

FIG. 21A shows an alphas control structure in which double pin links connect the flexure member 100 yield plates to the frame. The yield plate end connections are anchor rods as described for FIG. 6. The anchor rods connect to a base member whose flexibility is independently adjustable.

Figure 21B:
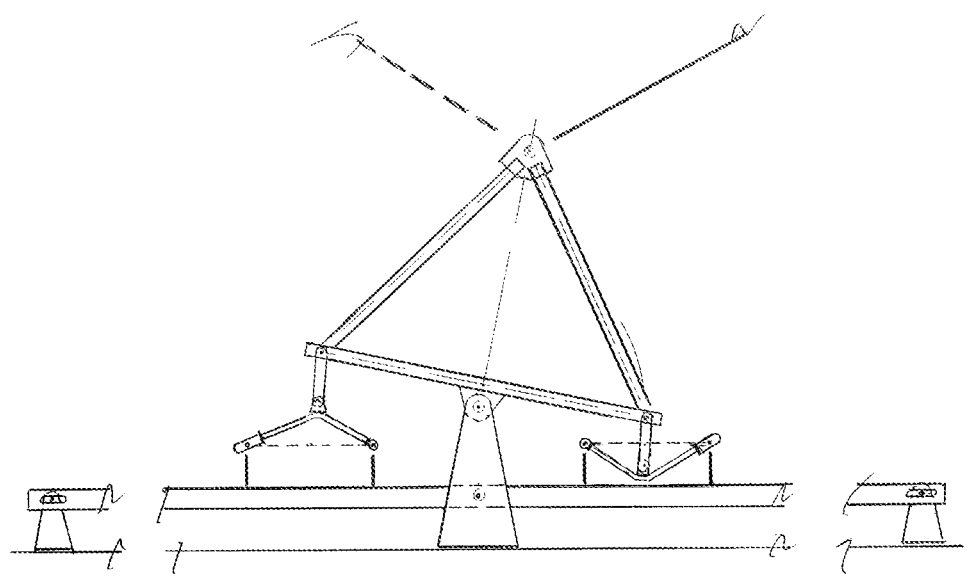

FIG. 21B shows the displaced form of FIG. 21A under the action of a tensile force in the ties.

FIG. 21B shows the displacement form for the case of a rigid (inflexible) base.

Figure 21C:
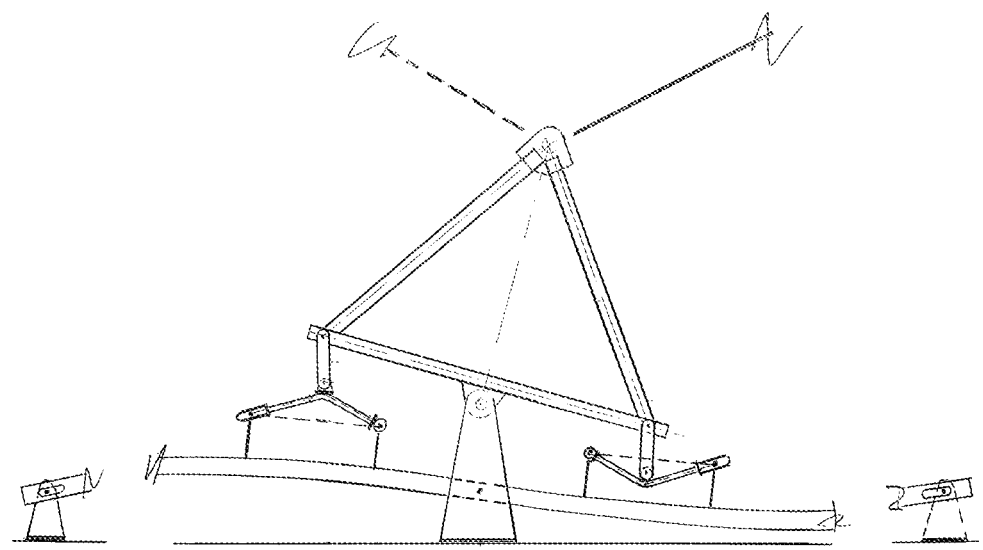

FIG. 21C shows the similar but increased displacement form for the same case but with a flexible base member.

Figure 21D:
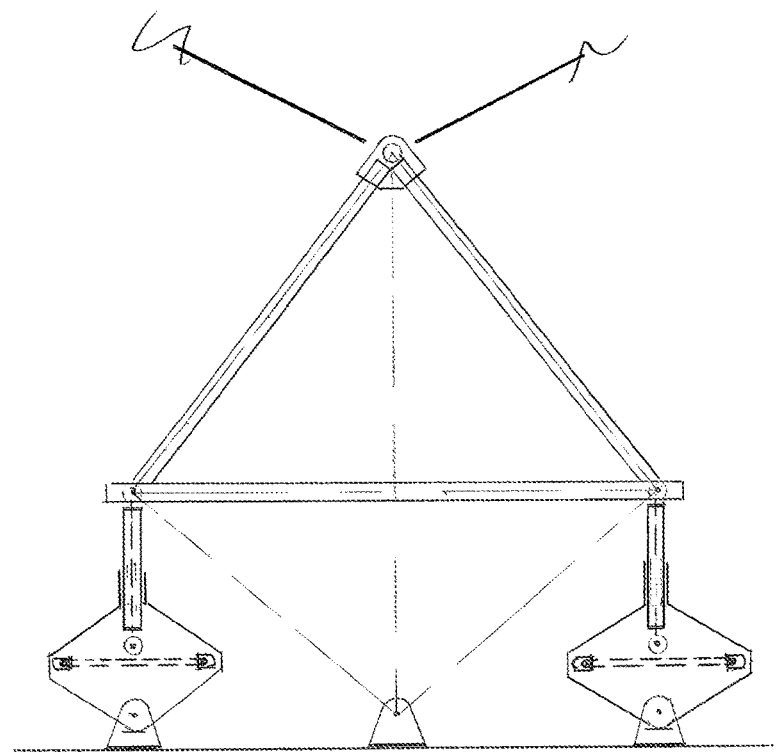

FIG. 21D shows the case of an alphas frame with yield plates (flexure member 100) supported within sleeve guided rockers (defined as eccentrically pivoting beta$_2$ rockers in the figures).

Figure 21E:
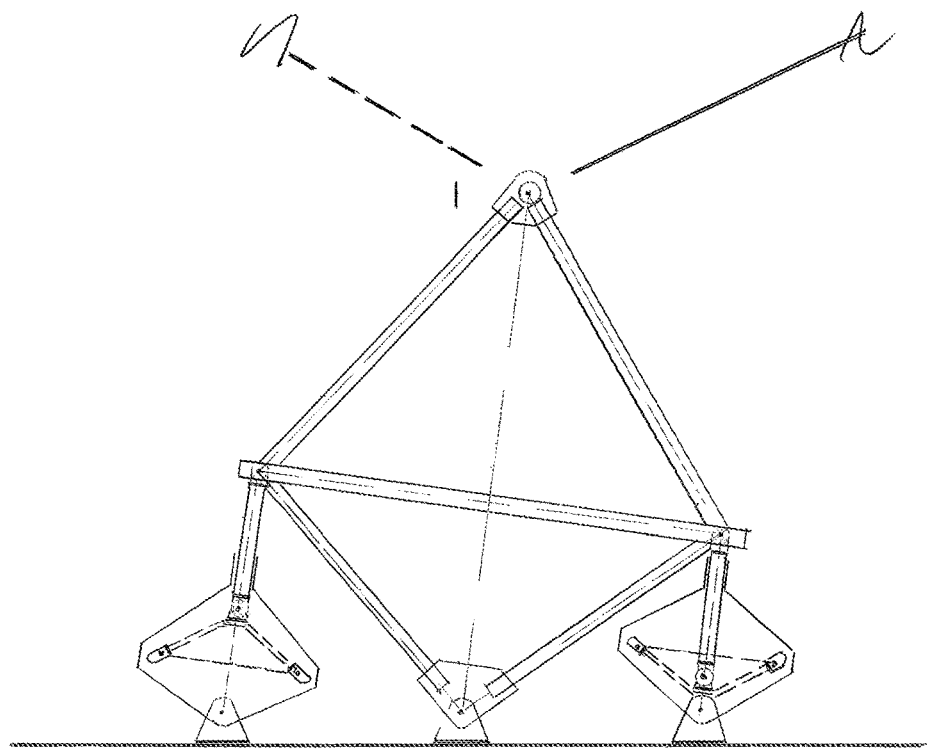

FIG. 21E shows the displaced form of FIG. 21D when subject to tensile load from the ties.

Figure 21F:
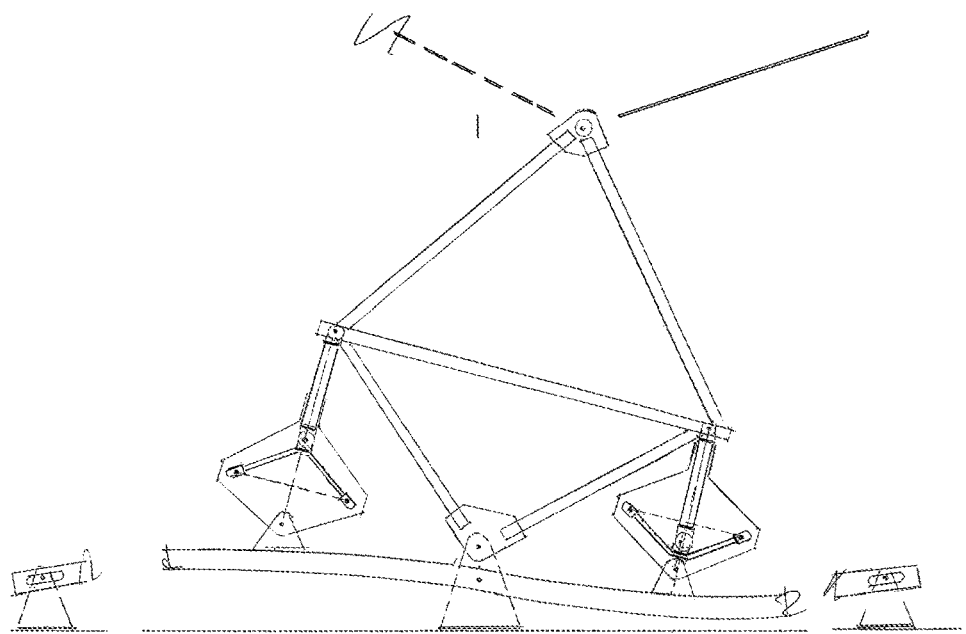

FIG. 21F shows the similar but increased displaced form for the same case but with a flexible base member.

Figure 21G:
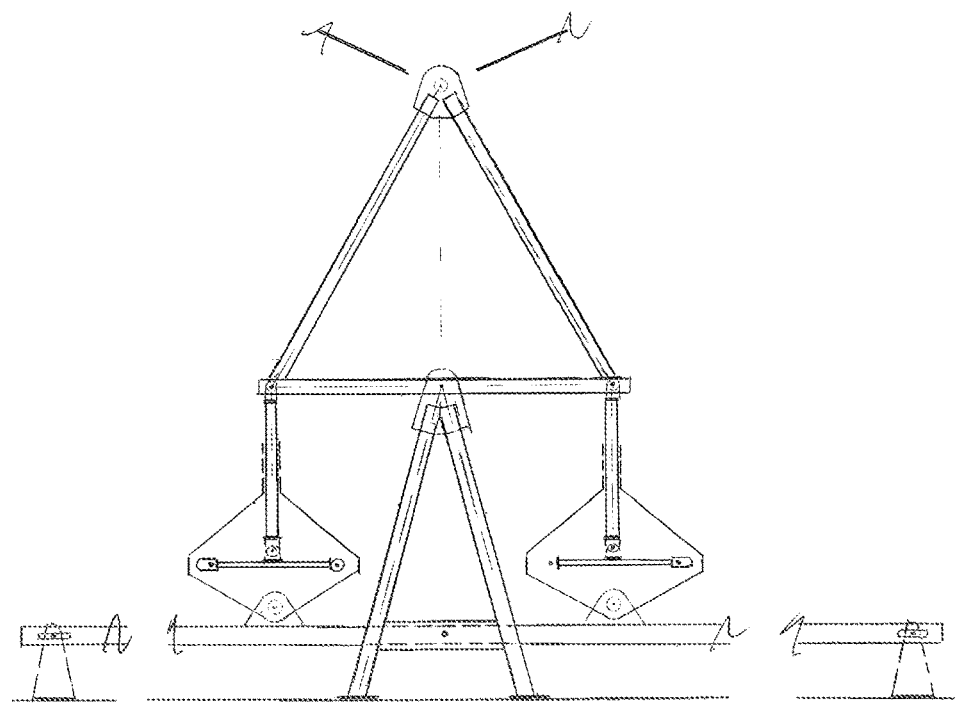

FIG. 21G shows a control structure similar to that of FIG. 21D but with a rocker frame supported on and pivotable about an elevating A-frame.

Figure 21H:
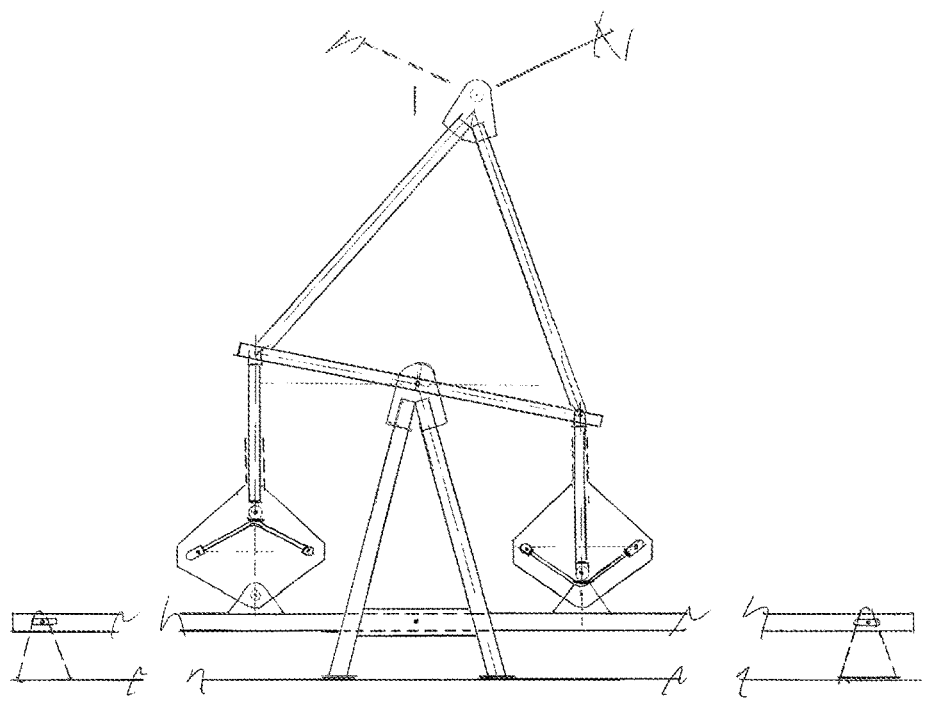

FIG. 21H shows the displaced form of FIG. 21G in response to tensile forces in the ties; and with inflexible base member.

Figure 21I:
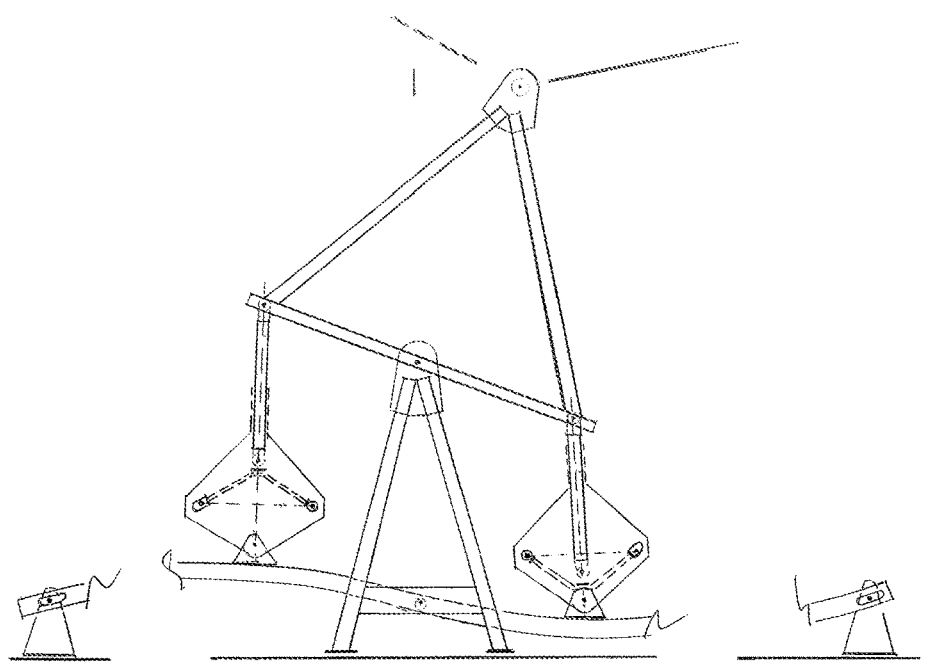

FIG. 21I shows the similar but increased displaced form for the same case but with a flexible base member.

In FIGS. 21H and 21I the pin ended tension/compression ties (push rods) connecting the elasto-plastically flexing yield plates to the rocker frame remain near vertical while the plates flex to high elasto-plastic displacements. As discussed previously the sleeve guided rockers maintain an orthogonal loading to the plates as they freely flex at a constant resistive yield force to high displacements without self generating any response changing membrane forces. As also discussed previously this being due to their free translation support details.

Figure 21J:
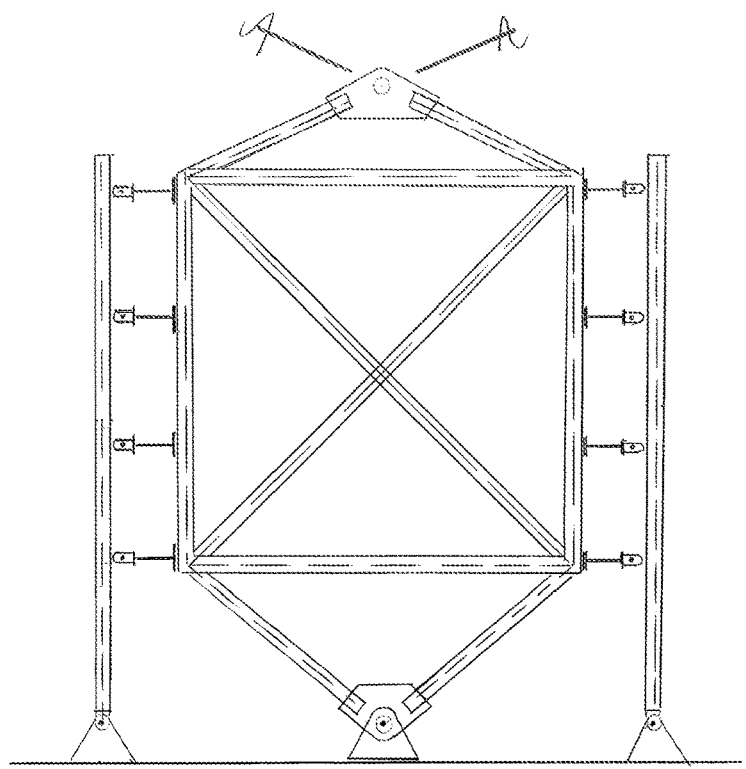

FIG. 21J shows the case of an alpha$_2$ frame with 'shear type' flexure member 100 yield plates as previously described.

Figure 21K:
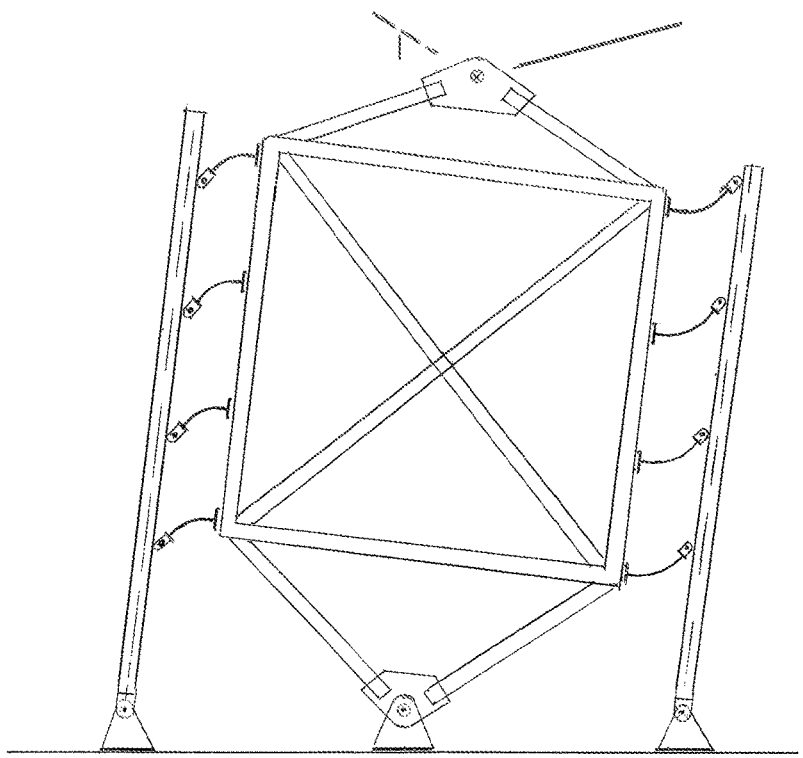

FIG. 21K shows the displaced form of FIG. 21J when subject to tensile loads from the ties.

Figure 21L:
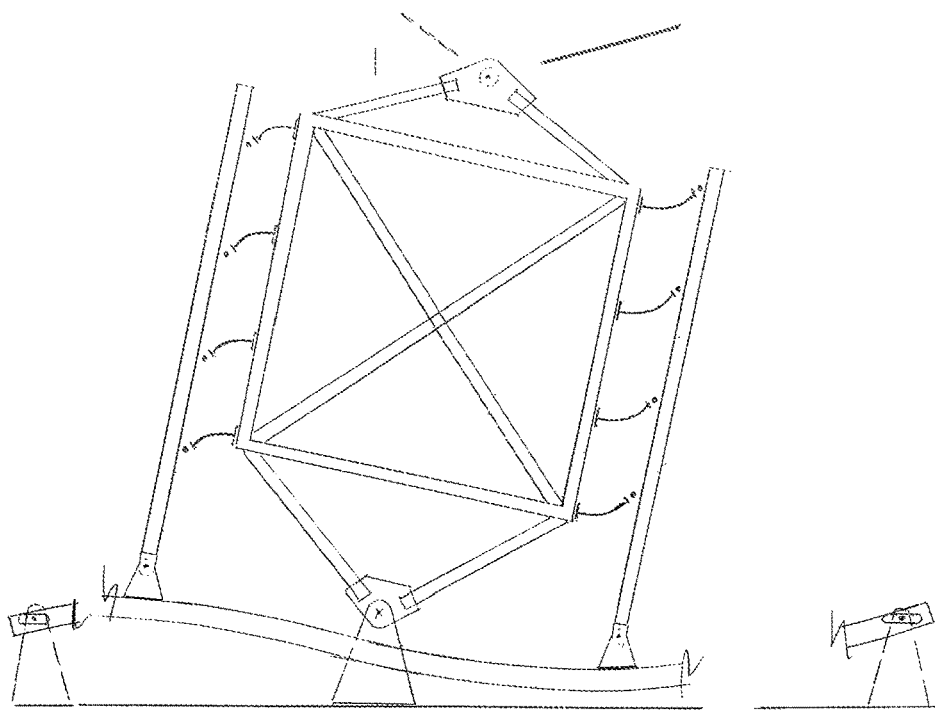

FIG. 21L shows the similar but increased displaced form for the same case but with a flexible base member.

The base member allows
i. the fixing (anchor) forces to the foundation (base) generated by the moment couple from the counter directional yield force in the yield plates to be reduced by leverage through the base member about its central pivot.
ii. the natural elastic frequency and force/displacement characteristics of the control structure, in conjunction with any other structure it is seismically supportive of, to be adjusted independently.
iii. As discussed previously from FIG. 19; the development of a two-tier ductile system.

The rocker 2000 in most instances is intermediate two ties 300 of a racked system. In alternative embodiments, the tie anchor may be at the end of a rack system and only attached to a single tie 300 (not shown). The examples shown in FIG. 20 onwards show a tie anchor located intermediate to ties 300 as shown in detail A in FIG. 20A.

The desirability of having two ties 300, acting in opposite directions, is due to the cycling response of the restrained structure during a seismic event.

Figure 23:
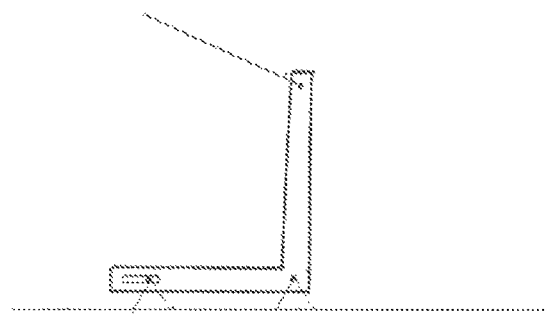

The ties are typically in cable or rod form and are only able to carry tensile loads. Hence at any time only one tie is engaged in load transfer from main structure to energy absorbing system 1000 (control structure). Load and motion reversal between both the main structure and ground results in switching tensile loads in the ties, the rocking of 2000 and the yield working of plates 401 and 402. With only one tie 300, after deformation in one direction, racking during the next cycle will incur slack in the tie 300 due to the previous deformation. However, one tie may be used albeit with less effectiveness than two tie, this could be at the ends of a rack where one tie is better than no ties to a tie anchor (FIG. 23).

Figure 22:
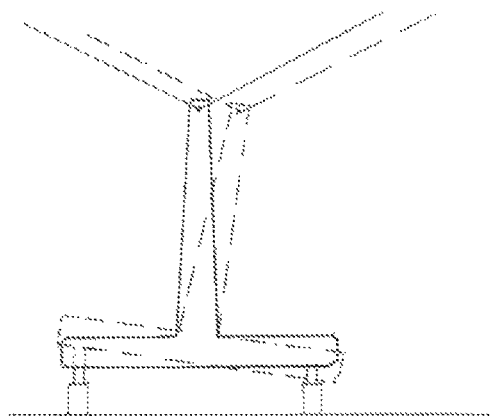

In an alternative embodiment as shown in FIG. 22 hydraulic energy absorbent means 800 may be utilised. This is used to absorb the energy of the lever 200. In this embodiment, the tie anchor is converting the substantially lateral forces of the ties into substantially vertical forces.

Preferably the entire rocker 2000 is substantially composed of metal. Even more preferably, the rocker 2000 is composed of steel. The rocker, rocker arms, upstand, and anchors are substantially stiff and rigid so as not to yield during a seismic event. There are many alternatives in the design to fabricate a rigid rocker frame.

Where a foundation 4 has been mentioned, it is envisaged that the ground could also be a floor or ceiling of a building or structure, a beam, or truss, or part of a structure that is engaged to the anti-racking system as described.

It is appreciated that where all of these structures and systems herein described are symmetrical, the systems may be halved or double or so forth and still be effective. For example the energy absorbing system 1000 may only have one yield connector 230 on one side of the pivot anchor 240.

The embodiments described above may be altered and combined together to form further embodiments. A person skilled in the art will realise that these configurations can be adapted to suit many different purposes and functional characteristics of a structure or storage rack. Such as the height of the structure or storage rack, the number of storage racks to restrain, the weight of the structure or storage rack, the weight of the goods or structure, the tendency and frequency and magnitude of seismic events where the structure or rack is installed. Furthermore these configurations may be adapted depending on the materials used and the factor of safety required.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A force limiting and energy dissipating seismic control structure comprising: a pivotable rocker frame having a pivot connection to a structural member;
   a yield connector comprising a resistively and resiliently deformable, elastoplastically yielding yield element, the yield connector being directly or indirectly connected between the rocker frame and the structural member wherein the yield connector comprises a first anchor for direct or indirect connection to a first end region of the yield element, and a second anchor for direct or indirect connection to a second end region of the yield element, and wherein the second anchor and second end region are configured with at least one of a free translational boundary condition or a free translational and rotational boundary condition wherein the second end region is able to translate or translate and rotate relative to a reaction surface or reaction point at the second anchor,
   whereby the yield connector is able to elastoplastically displace while maintaining a constant resistive yield force, and control and limit a dynamic response of the control structure and a mass seismically supported by the control structure, during a seismic event.

2. The force limiting and energy dissipating seismic control structure of claim 1 wherein the structural member comprises a structural base or foundation, and the yield connector is directly connected between the rocker frame and the structural base or foundation.

3. The force limiting and energy dissipating seismic control structure of claim 1 wherein the structural member comprises a structural base or foundation, and the yield connector is connected between the rocker frame and a further structural member, the further structural member being pivotably connected to the structural base or foundation.

4. The force limiting and energy dissipating seismic control structure of claim 3 wherein the further structural member comprises a chord.

5. The force limiting and energy dissipating seismic control structure of claim 1 wherein the structural member is pivotably connected to a structural base or foundation.

6. The force limiting and energy dissipating seismic control structure of claim 1 further comprising a secondary flexural member provided between the yield connector and the structural member.

7. The force limiting and energy dissipating seismic control structure of claim 1 wherein the yield connector further comprises a flexural deflection limiter configured to stop flexure of a yielding element at a prescribed limit.

8. The force limiting and energy dissipating seismic control structure of claim 7 further comprising a secondary flexural member configured to yield upon the prescribed limit being reached.

9. The force limiting and energy dissipating seismic control structure of claim 1 wherein the yield connector comprises a pivot connector to connect to either the rocker frame or the structural member.

10. The force limiting and energy dissipating seismic control structure of claim 1 wherein the yield connector comprises a guide configured to receive and guide a connector configured to connect to either the rocker frame or the structural member.

11. The force limiting and energy dissipating seismic control structure of claim 10 wherein the yield connector comprises a pivot connector to connect to either the rocker frame or the structural member and the pivot connector is configured to maintain the connector orthogonal to the yield element.

12. The force limiting and energy dissipating seismic control structure of claim 10 wherein the connector comprises a part of one of: the structural member; the rocker frame; a further structural member.

13. The force limiting and energy dissipating seismic control structure of claim 1 wherein the yield element comprises a plate or a plurality of plates.

14. The force limiting and energy dissipating seismic control structure of claim 1 wherein the first anchor is configured for connection to the rocker frame and a second anchor for connection to the structural member.

15. The force limiting and energy dissipating seismic control structure of claim 1 wherein the yield element is displaced and increases in length between the first and second anchors during a seismic event.

16. The force limiting and energy dissipating seismic control structure of claim 15 wherein no membrane forces are generated in the yield element during displacement.

17. The force limiting and energy dissipating seismic control structure of claim 1 wherein the yield element undergoes plastic deformation at a yield zone intermediate the first anchor and second anchor during a seismic event as a result of relative oscillatory movement between the rocker frame and the structural member.

18. The force limiting and energy dissipating seismic control structure of claim 1 wherein the rocker frame comprises a vertical aspect and the structural member comprises a horizontal structural base or foundation.

19. The force limiting and energy dissipating seismic control structure of claim 1 wherein the rocker frame has a horizontal aspect and is pivotably connected at each end to vertical chords which are pivotably connected to a horizontal base or foundation.

20. The force limiting and energy dissipating seismic control structure of claim 1 wherein the rocker frame comprises part of, or is connected to, a shelving or racking or building structure.

21. A force limiting and energy dissipating seismic control structure comprising:
  a pivotable rocker frame having a pivot connection to a structural member and being configured to be connected to a shelving, racking or building structure, the pivotable rocker frame being configured to rotate about the pivot connection as the shelving, racking or building structure moves relative to the structural member in response to a seismic event,
  a yield connector comprising a resistively and resiliently deformable, elastoplastically yielding yield element, wherein the yield connector comprises a first anchor for direct or indirect connection to the rocker frame distal from the pivot connection and a second anchor for direct or indirect connection to the structural member, and wherein one of the first or second anchors is configured with a free translational and rotational boundary condition whereby the yield element is displaced and undergoes plastic deformation at a yield zone intermediate the first anchor and second anchor during a seismic event as a result of relative oscillatory movement between the rocker frame and the structural member, and wherein the yield connector maintains a constant resistive yield force to thereby control rotation of the rocker frame about the pivot connection, the constant resistive yield force limiting and controlling the magnitude of a dynamic response force developed within the control structure during the seismic event.

22. The force limiting and energy dissipating seismic control structure of claim 21 wherein the dynamic response force is independent of the magnitude of the seismic event.

23. A structure supported on a foundation, the structure comprising: a framework,
  the framework being connected to a pivotable rocker frame having a pivot connection to the foundation and being configured to rotate about the pivot connection as the framework moves relative to the structural member in response to a seismic event,
  a yield connector comprising a resistively and resiliently deformable, elastoplastically yielding yield element, and wherein the yield connector comprises a first anchor for direct or indirect connection to the rocker frame distal from the pivot connection and a second anchor for direct or indirect connection to the foundation, and wherein one of the first or second anchors is configured with a free translational and rotational boundary condition whereby the yield element is displaced and undergoes plastic deformation at a yield zone intermediate the first anchor and second anchor during a seismic event as a result of relative oscillatory movement between the rocker frame and the foundation, and wherein the yield connector maintains a constant resistive yield force to thereby control rotation of the rocker frame about the pivot connection, the constant resistive yield force limiting and controlling the magnitude of a dynamic response force developed within the framework during the seismic event.

24. The structure of claim 23 wherein a dynamic response force developed in the foundation during the seismic event is limited by the constant resistive yield force.

25. The structure of claim 23 wherein the framework has or supports a mass, and a dynamic response force developed in the mass during the seismic event is limited by the constant resistive yield force.

26. The structure of claim 23 wherein the dynamic response force is independent of the magnitude of the seismic event.

27. A force limiting and energy dissipating seismic control structure comprising:
  a pivotable rocker frame pivotably connected to a structural member,
  a yield connector located between and directly or indirectly connecting rocker frame to structural member, the yield connector comprising a resistively and resiliently deformable elastoplastically yielding yield element,
  the yield element having a first region connected to a first anchor and a second end region connected to a second anchor, the first and second anchor directly or indirectly connecting to the rocker frame or structural member,
  the yield connector configured with free translational or free translational and free rotational boundary conditions, wherein the second end, edge, or boundary region of the yield element, is able to translate or translate and rotate relative to the reaction surface or reaction point at its second anchor, and without generating membrane forces within the yield element, and wherein the resultant reaction force at the reaction surface or reaction point, is able to rotate as the yield element elastoplastically displaces, and remain orthogonal to the tangent plane at the reaction surface of the yield element, and wherein the horizontal component of the resultant reaction force acts in the same direction as the horizontal translation component of the displacing end region,
  the yield element able to elastoplastically displace while maintaining a constant resistive yield force, enabling the control structure to form an elastoplastic mechanism, able to cyclically displace and plastically flow, in response to a forcing event or in response to base motion input from a seismic event, with a constant resistive yield force,
  the seismic control structure able to control and limit its dynamic response and control and limit the response acceleration and dynamic response of a mass it is seismically supportive of.

28. The force limiting and energy dissipating seismic control structure as claimed in claim 1 wherein the yield connector is connected between the rocker frame and a further structural member, the further structural member and rocker frame being pivotably connected to the structural member.

29. The force limiting and energy dissipating seismic control structure as claimed in claim 28 wherein the structural member and further structural member comprise pivotably connected chords.

30. The force limiting and energy dissipating seismic control structure as claimed in claim 6 wherein the secondary flexural member enables independent adjustment of the natural elastic response frequency of the control structure.

31. The force limiting and energy dissipating seismic control structure as claimed in claim 7 further comprising a secondary flexural member, wherein the secondary flexural member and the flexural deflection limiter enable the control structure to provide a two tier, elastic stiffening, ductile response.

32. The force limiting and energy dissipating seismic control structure as claimed in claim 13 wherein the or each plate is configured to flex about a minor bending axis and flexurally yield at a specific yield zone and is displaced to high elastoplastic displacements and high ductility values while maintaining the constant resistive yield force.

33. The force limiting and energy dissipating seismic control structure as claimed in claim 1 wherein the yield element is displaced and freely increases and decreases in length between the first and second anchors during a seismic event.

34. The force limiting and energy dissipating seismic control structure as claimed in claim 33 wherein the length of the yield element along a flexing curve of the yield element is able to freely increase and decrease length between the first and second anchors and wherein reaction resultants rotate and remain orthogonal with a tangent plane of the yield element during a seismic event.

35. The force limiting and energy dissipating seismic control structure as claimed in claim 1, wherein the yield element has a spanning aspect and is configured with simply supported, flexurally continuous or flexurally restrained boundary conditions at the second end region.

36. The force limiting and energy dissipating seismic control structure as claimed in claim 29 wherein the yield connector is connected between the chords and wherein interlaminar displacement along and between the chords is resisted by a constant interlaminar shear force produced by flexural yielding of the yield element.

37. The force limiting and energy dissipating seismic control structure as claimed in claim 1 wherein the yield element is able to cyclically displace to plastic strain values within the yield element along a positive yield plateau and to and beyond plastic strain values at maximum stress values within a strain hardening region of the stress-strain curve of the yielding material from which the yield element is formed.

38. The force limiting and energy dissipating seismic control structure as claimed in claim 14 wherein the yield connector comprises a casing and a guided pushrod, the pushrod linking the yield connector to the rocker frame, and the casing being pivotably connected to the structural member, and wherein the guided pushrod is configured to connect to the yield element at the first anchor, and the casing is configured to connect to the yield element at the second anchor.

39. A force limiting and energy dissipating seismic control structure comprising a rocker frame which is pivotably connected to a structural base or structural member, wherein rotation of the rocker frame about the pivotal connection causes a pivotably anchored flexural yield member which is directly or indirectly connected to the rocker frame, but distal to the rocker frame pivot, to flexurally displace, wherein the yield member is configured with a (i) free translational or (ii) free translational and free rotational boundary condition to allow it to flex and yield about its minor bending axis to high elastoplastic displacements and high ductility values while maintaining a constant resistive yield force, and wherein the structure is able to dissipate energy and limit forces developed within itself or a structure it connects with and is seismically supportive of as it endures ground or base motion input from a seismic event.

40. The force limiting and energy dissipating seismic control structure as claimed in claim 39 wherein the yield member comprises:
a first anchor secured directly or indirectly to the rocker frame,
a second anchor secured to another structural member of the control structure or to a foundation base, the flexural yield member having a first region and a second region spaced from the first region and located respectively by the first anchor and second anchor, whereby the first anchor secures the first region to the rocker frame so that the first region is able to move with the rocker frame relative to the second region and second structural member being another member of the control structure or foundation base, during a seismic event, and the second anchor allowing translation or translation and rotation of the second region relative to the second anchor during rocking movement of the rocker frame relative to the second structural member allowing the flexural yield member to flexurally yield while maintaining a stable constant resistive yield force.

41. The force limiting and energy dissipating seismic control structure as claimed in claim 40 wherein at the second region the flexural member is able to translate or translate and rotate relative to its respective anchor and at the other of the first or second regions the flexural member is pinned or cantilevered to its respective anchor.

* * * * *